(12) United States Patent
Lu et al.

(10) Patent No.: US 10,324,781 B2
(45) Date of Patent: Jun. 18, 2019

(54) METHOD FOR MANAGING APPLICATION ON CARD

(71) Applicant: FEITIAN TECHNOLOGIES CO., LTD., Haidian District, Beijing (CN)

(72) Inventors: Zhou Lu, Beijing (CN); Huazhang Yu, Beijing (CN)

(73) Assignee: FEITIAN TECHNOLOGIES CO., LTD., Beijing (CN)

( * ) Notice: Subject to any disclaimer, the term of this patent is extended or adjusted under 35 U.S.C. 154(b) by 188 days.

(21) Appl. No.: 14/786,213

(22) PCT Filed: Apr. 23, 2014

(86) PCT No.: PCT/CN2014/076030
§ 371 (c)(1),
(2) Date: Oct. 22, 2015

(87) PCT Pub. No.: WO2014/173298
PCT Pub. Date: Oct. 30, 2014

(65) Prior Publication Data
US 2016/0085609 A1    Mar. 24, 2016

(30) Foreign Application Priority Data

Apr. 25, 2013 (CN) ........................ 2013 1 0146939
Sep. 5, 2013 (CN) ........................ 2013 1 0399702

(51) Int. Cl.
*G06F 11/00* (2006.01)
*G06F 11/07* (2006.01)
(Continued)

(52) U.S. Cl.
CPC ........ *G06F 11/079* (2013.01); *G06F 11/0736* (2013.01); *G06F 11/0751* (2013.01);
(Continued)

(58) Field of Classification Search
CPC .. G06F 11/0142; G06F 11/0763; G06F 21/51; G06F 21/74; G06F 21/77;
(Continued)

(56) References Cited

U.S. PATENT DOCUMENTS 6,816,882 B1 * 11/2004 Conner ................. G06F 21/121
709/203
7,340,748 B2    3/2008 Vandewalle et al.
(Continued)

FOREIGN PATENT DOCUMENTS

CN    101042736 A    9/2007
CN    102801705 A    11/2012
(Continued)

OTHER PUBLICATIONS

Edlund "Secure and Confidential Applications on UICC", 2009, Royal Institute of Technology, pp. 1-44.*
(Continued)

*Primary Examiner* — Bryce P Bonzo
*Assistant Examiner* — Jeison C Arcos
(74) *Attorney, Agent, or Firm* — Harness, Dickey & Pierce, P.L.C.

(57) ABSTRACT

The present invention belongs to the field of intelligent cards, and disclosed is a method for managing an application on a card. The method comprises: after receiving data sent by a running environment, a card content management module checking a card state; when the card state is not a first preset state or a second preset state, checking the received data; and when the received data meets a preset format, continuing to receive the data sent by the running environment to obtain a complete command, and performing a corresponding command to implement an association of applications on a card. The beneficial effects of the present invention are to provide a method for managing an appli-
(Continued)

cation on a card, so that loading, installation, update, personalization, and deletion of an application on the card can be implemented.

20 Claims, 16 Drawing Sheets

(51) Int. Cl.
    *G06F 21/50*     (2013.01)
    *G06F 21/74*     (2013.01)
    *G06F 21/77*     (2013.01)

(52) U.S. Cl.
    CPC .......... *G06F 11/0772* (2013.01); *G06F 21/50* (2013.01); *G06F 21/74* (2013.01); *G06F 21/77* (2013.01)

(58) Field of Classification Search
    CPC .... G06F 11/0772; G06F 11/079; G06F 11/30; G06F 11/3051; G06K 19/0725; G06K 7/10297
    See application file for complete search history.

(56) References Cited

U.S. PATENT DOCUMENTS

| | | | | |
|---|---|---|---|---|
| 8,355,042 B2* | 1/2013 | Lablans | ................ | G03B 37/00 348/36 |
| 2001/0011250 A1* | 8/2001 | Paltenghe | .......... | G06F 21/6209 705/41 |
| 2002/0020745 A1* | 2/2002 | Yap | ...................... | G06O 20/341 235/451 |
| 2004/0236624 A1* | 11/2004 | Di Luoffo | .......... | G06Q 30/0201 705/7.29 |
| 2004/0236680 A1* | 11/2004 | Luoffo | ................... | G06Q 20/10 705/39 |
| 2005/0102580 A1* | 5/2005 | House | ................. | G06F 11/2294 714/38.14 |
| 2005/0144552 A1* | 6/2005 | Kalthoff | ............ | G06F 17/30286 714/811 |
| 2005/0211759 A1* | 9/2005 | Breslin | ................ | G06Q 20/341 235/375 |
| 2012/0096185 A1* | 4/2012 | Naparstek | ............. | H04L 41/145 709/246 |
| 2014/0015638 A1* | 1/2014 | Cochran | ........... | G06K 19/0725 340/5.65 |

FOREIGN PATENT DOCUMENTS

| | | |
|---|---|---|
| CN | 103218560 A | 7/2013 |
| CN | 103473093 | 12/2013 |

OTHER PUBLICATIONS

International Search Report (English and Chinese) and Written Opinion of the ISA (Chinese) for PCT/CN2014/076030, ISA/CN, Beijing, dated Jul. 23, 2014.

* cited by examiner

METHOD FOR MANAGING APPLICATION ON CARD

CROSS REFERENCE OF RELATED APPLICATION

This application is a 371 U.S. National Phase of International Application PCT/CN2014/076030, filed on Apr. 23, 2014, which claims priority to Chinese patent applications, entitled "METHOD FOR IMPLEMENTING CARD DATA MANAGEMENT" with Application Number of 201310146939.4 and filed with the Chinese Patent Office on Apr. 25, 2013 and entitled "METHOD FOR MANAGING APPLICATION ON CARD" with Application Number of 201310399702.7 and filed with the Chinese Patent Office on Sep. 5, 2013, which are hereby incorporated by reference in its entirety.

FIELD

The present disclosure belongs to the field of intelligent cards, and more particularly, relates to a method for managing applications on a card.

BACKGROUND

With developments of the society, intelligent card gets much more attention for its advantages, such as mobility, mass storage, reliable and safe information recording. In order to be adapted for continuous extension of the intelligent card application field, the intelligent card is sought to be extended with more applications.

In addition, in order to provide more convenience to a user, besides content according to a card issuer, multiple applications can be installed on the intelligent card. Generally, the card issuer may not manage all of the card content, especially the card content which is not the card content of the card issuer. Therefore, there is a need for a mechanism by which a third party can act as a proxy to manage the card content after the third party passes pre-authentication, for example, the managing includes loading, installing, extraditing and deleting, etc.

In the process of inventing the present invention, the inventors found that there is no specific method for implementing the mechanism of taking a proxy for managing the card content.

SUMMARY

For overcoming the defects in the conventional technology, a method for managing applications on a card is provided according to the present disclosure.

A method for managing applications on a card is provided, which includes: executing the following steps after data sent by a running environment (RE) is received by a card content management module:

Step A, checking a card state, generating and returning that the card-state-not-supporting state code to the RE if the card state is a first preset state or a second preset state, and ending the process; otherwise executing Step B;

Step B, checking whether the received data conforms to a preset format; executing Step C if the received data conforms to a first preset format, executing Step D if the received data conforms to a second preset format, executing Step E if the received data conforms to a third preset format, executing Step F if the received data conforms to a fourth preset format, executing Step G if the received data conforms to a fifth preset format, executing Step H if the received data conforms to a sixth preset format, or executing Step I if the received data conforms to a seventh preset format; or returning a data error state code to the RE if the received data does not conform to the preset format, and ending the process;

Step C, continuing to receive the data sent by the RE to obtain a complete first command, parsing the first command to obtain a load file identification and a load file association security domain identification, creating a load file structure, filling the load file identification and load file association security domain identification into the created load file structure, generating and returning an operation success state code and an operation result to the RE if the operation is successful, and ending the process; or generating and returning a respective state code to the RE based on a reason of operation failure if the operation is unsuccessful, and ending the process;

Step D, continuing to receive the data sent by the RE to obtain a complete second command, parsing the second command to obtain a load file data block, obtaining and storing component data based on the load file data block, filling a storage address into the load file structure, generating and returning an operation success state code and an operation result to the RE if the operation is successful, and ending the process; or generating and returning a respective state code to the RE based on a reason of operation failure if the operation is unsuccessful, and ending the process;

Step E, continuing to receive the data sent by the RE to obtain a complete third command, parsing the third command to obtain an executable load file identification, an executable module identification, an application identification and an application right, searching for the load file structure based on the executable load file identification obtained by the parsing, searching for an executable module corresponding to the executable module identification obtained by the parsing in storage space corresponding to a storage address in the found load file structure, creating an application of the found executable module, identifying the created application with the application identification obtained by the parsing, assigning a right specified by the application right obtained by the parsing to the created application, setting the created association security domain of the created application to be the association security domain of the executable load file corresponding to the executable load file identification obtained by the parsing, generating and returning an operation success state code and an operation result to the RE if the operation is successful, and ending the process; or generating and returning a respective state code to the RE based on a reason of operation failure if the operation is unsuccessful, and ending the process;

Step F, continuing to receive the data sent by the RE to obtain a complete fourth command, parsing the fourth command to obtain an application identification and an application right, searching for an application corresponding to the application identification obtained by the parsing in the card, updating a state of the found application to be a selectable state and updating a right of the found application to be the right specified by the application right obtained by the parsing, generating and returning an operation success state code and an operation result to the RE if the operation is successful, and ending the process; or generating and returning a respective state code to the RE based on a reason of operation failure if the operation is unsuccessful, and ending the process;

Step G, continuing to receive the data sent by the RE to obtain a complete fifth command, parsing the fifth command, obtaining an security domain identification and application identification, searching for an application corresponding to the application identification obtained by the parsing and an application corresponding to the security domain identification obtained by the parsing in the card, updating an association security domain of the found application to be the application corresponding to the security domain identification obtained by the parsing, generating and returning an operation success state code and an operation result to the RE if the operation is successful, and ending the process; or generating and returning a respective state code to the RE based on a reason of operation failure if the operation is unsuccessful, and ending the process;

Step H, continuing to receive the data sent by the RE to obtain a complete sixth command, parsing the sixth command to obtain an application identification, searching for an application corresponding to the application identification obtained by the parsing in the card, setting the found application to be a personalized application, generating and returning an operation success state code and an operation result to the RE if the operation is successful, and ending the process; or generating and returning a respective state code to the RE based on a reason of operation failure if the operation is unsuccessful, and ending the process; and Step I, continuing to receive the data sent by the RE to obtain a complete seventh command, parsing the seventh command to obtain a data domain identification, searching for an executable load file and an application corresponding to the data domain identification obtained by the parsing in the card, deleting the found application and executable load file, deleting the found application and executable load file, generating and returning an operation success state code and a result to the RE if the operation is successful, and ending the process; or generating and returning a respective state code to the RE based on a reason of operation failure if the operation is unsuccessful, and ending the process.

The process of preparing for loading an application in response to the first command includes:

Step C1, determining whether a first data block of the first command is legitimate, checking whether an executable file corresponding to the first data block exists in the card; the operation condition being not met and the operation failing if the executable file corresponding to the first data block exists in the card; otherwise, executing Step C2; the data being error and the operation failing if the first data block is illegitimate;

Step C2, determining whether a second data block of the first command meets a preset requirement, setting an association security domain of a load file corresponding to the first data block to be the card content management module if the second data block of the first command meets a first preset requirement and executing Step C4; executing Step C3 if the second data block of the first command meets a second preset requirement; the operation failing if the second data block of the first command does not meet the preset requirement;

Step C3, checking whether an application corresponding to the second data block exists in the card, the operation condition being not met and the operation failing if the application corresponding to the second data block does not exist in the card; otherwise, checking whether the application corresponding to the second data block has a security domain right, if the application corresponding to the second data block has a security domain right, setting the association security domain of the load file corresponding to the first data block to be the application corresponding to the second data block and executing Step C4 if the application corresponding to the second data block has the security domain right; the operation failing if the application corresponding to the second data block has no security domain right;

Step C4, determining whether a third data block of the first command is legitimate, storing respective data in the third data block if the third data block of the first command is legitimate, executing Step C5; otherwise, data being error and the operation failing;

Step C5, processing a fourth data block of the first command and executing Step C6; and Step C6, determining whether a fifth data block of the first command is legitimate, creating a load file structure if the fifth data block of the first command is legitimate, filling the load file structure based on the first data block and the second data block, initializing the global block number in the card, the operation being successful; otherwise, data being error and the operation failing.

The process of loading an application in response to the second command includes:

Step D1, determining whether a fourth byte of the second command equals to a global block number in the card, executing Step D2 if the fourth byte of the second command equals to the global block number in the card; otherwise data being error and the operation failing;

Step D2, checking whether data authentication mode block information is included in the second command, verifying the data authentication mode block information if the data authentication mode block information is included in the second command; executing Step D3 if the verifying is successful; data being error and the operation failing if the verifying is unsuccessful; executing Step D3 if the data authentication mode block information is not included in the second command;

Step D3, obtaining and storing the component data based on the load file data block in the second command, filling the storage address into the load file structure, updating the global block number in the card to be the result of the current value plus 1, determining whether the load file data block is the last load file data block of the load file; executing Step D4 if the load file data block is the last load file data block of the load file; otherwise, the operation being successful;

Step D4, determining whether the load file data block hash value in the card has a value, performing a hash operation on all load file data blocks as a whole stored in the card if the load file data block hash the value in the card has value and determining whether an operation result equals to the load file data block hash value; executing Step D5 if the operation result equals to the load file data block hash value, otherwise the data being error and the operation failing; executing Step D5 if the load file data block hash value in the card has no value; and Step D5, storing and submitting an executable load file structure, and the operation being successful.

The process of installing an application in response to the third command includes:

Step E1, determining whether a first data block of the third command is legitimate, checking whether a load file structure corresponding to the first data block exists in the card; executing Step E2 if the load file structure corresponding to the first data block exists in the card, otherwise the operation condition being not met and the operation failing; data being error and the operation failing if the first data block is illegitimate;

Step E2, determining whether a second data block of the third command is legitimate; checking whether an executable module corresponding to the second data block exists in the storage space corresponding to the storage address in the load file structure; executing Step E3 if the executable module corresponding to the second data block is in the storage space corresponding to the storage address in the load file structure, otherwise the operation condition being not met and the operation failing; data being error and the operation failing if the second data block of the third command is illegitimate;

Step E3, determining whether a third data block of the third command is legitimate; checking whether an application corresponding to the third data block exists in the card; executing Step E4 if the application corresponding to the third data block exists in the card, otherwise the operation condition being not met and the operation failing; data being error and the operation failing if the third data block of the third command is illegitimate;

Step E4, determining whether a fourth data block of the third command is legitimate, determining whether the application corresponding to the third data block has a default selection right if the fourth data block of the third command is legitimate, executing Step E5 if the application corresponding to the third data block has the default selection right, otherwise executing Step E6; data being error and the operation failing if the fourth data block of the third command is illegitimate;

Step E5, determining whether a third byte of the third command equals to a preset value, data being error and the operation failing if the third byte of the third command equals to the preset value; determining whether the card content management module has a default selection right if the third byte of the third command does not equal to the preset value; executing Step E7 if the card content management module has the default selection right; otherwise the operation condition being not met and the operation failing;

Step E6, determining whether the third data block of the third command meets a preset condition, processing a fifth data block of the third command and executing Step E7 if the a first preset condition or a second preset condition is met; the operation condition being not met and the operation failing if the preset condition is not met;

Step E7, determining whether a sixth data block of the third command is legitimate, registering the application in response to the third command and executing Step E8 if the sixth data block of the third command is legitimate; otherwise data being error and the operation failing;

Step E8, determining whether a third byte of the third command equals to a preset value, setting a state of the application corresponding to the third data block in the third command to be installing and the operation being successful; otherwise, setting the state of the application corresponding to the third data block in the third command to be selectable and executing Step E9; and Step E9, determining whether the application corresponding to the third data block of the third command has a default selection right; setting the application corresponding to the third data block of the third command to be a default application and the operation being successful if the application corresponding to the third data block of the third command has the default selection right; otherwise, the operation being successful.

The process of setting a state of the application in response to the fourth command includes:

Step F1, determining whether both a first data block and a second data block of the fourth command are legitimate, executing Step F2 if both the first data block and the second data block of the fourth command are legitimate; otherwise, data being error and the operation failing;

Step F2, determining whether a third data block of the fourth command is legitimate; data being error and the operation failing if the third data block of the fourth command is illegitimate, checking whether an application corresponding to the third data block exists in the card if the third data block of the fourth command is legitimate; the operation condition being not met and the operation failing if the application corresponding to the third data block does not exist in the card, determining whether the state of the application corresponding to the third data block is INSTALLED if the application corresponding to the third data block exists in the card; the operation condition being not met and the operation failing if the state of the application corresponding to the third data block is not INSTALLED, executing Step F3 if the state of the application corresponding to the third data block is INSTALLED;

Step F3, determining whether a fourth data block of the fourth command is legitimate; executing Step F4 if the fourth data block of the fourth command is legitimate, otherwise data being error and the operation failing;

Step F4, determining whether a fifth data block of the fourth command is legitimate; executing Step F5 if the fifth data block of the fourth command is legitimate; otherwise data being error and the operation failing;

Step F5, determining whether a sixth data block of the fourth command is legitimate; setting the state of the application corresponding to the third data block to be selectable and executing Step F6 if the sixth data block of the fourth command is legitimate; otherwise data being error and the operation failing; and Step F6, determining whether the application corresponding to the third data block has a default selection right, the operation being successful if the application corresponding to the third data block has no default selection right, determining whether the card content management module has a default selection right if the application corresponding to the third data block has the default selection right; setting the application corresponding to the third data block to be a default application if the card content management module has a default selection right; the operation condition being not met and the operation failing if the card content management module has no default selection right.

The process of updating an association security domain of the application in response to the fifth command includes:

Step G1, determining whether a first data block of the fifth command is legitimate; the data being error and the operation failing if the first data block is illegitimate; checking whether an application corresponding to the first data block exists in the card if the first data block is legitimate; the operation condition being not met and the operation failing if the application corresponding to the first data block does not exist in the card; determining whether the application corresponding to the first data block is the card content management module if the application corresponding to the first data block exists in the card; the operation condition being not met and the operation failing if the application corresponding to the first data block is the card content management module; executing Step G2 if the application corresponding to the first data block is not the card content management module;

Step G2, determining whether a second data block of the fifth command is legitimate; the data being error and the operation failing if the second data block of the fifth command is illegitimate; determining whether the state of the application corresponding to the first data block is INSTALLED if the second data block of the fifth command is legitimate; the operation condition being not met and the operation failing if the state is not INSTALLED; executing Step G3 if the state is INSTALLED;

Step G3, determining whether a third data block of the fifth command is legitimate, data being error and the operation failing if the third data block is illegitimate; checking whether an application corresponding to the third data block exists in the card if the third data block is legitimate; the operation condition is not met and the operation failing if the application corresponding to the third data block does not exist in the card; executing Step G4 if the application corresponding to the third data block exists in the card;

Step G4, determining whether the application corresponding to the first data block has a security domain right; the operation condition being not met and the operation failing if the application has no security domain right; determining whether the state of the application corresponding to the first data block is LOCKED if the application has the security domain right; the operation condition being not met and the operation failing if the state is LOCKED; determining whether the state of the application corresponding to the first data block is Personalized if the state is not LOCKED; executing Step G5 if the state is PERSONALIZED; the operation condition being not met and the operation failing if the state is not PERSONALIZED;

Step G5, determine whether both of a fourth data block and a fifth data block of the fifth command are legitimate; executing Step G6 if both of the fourth data block and the fifth data block of the fifth command are legitimate; otherwise, data being error and the operation failing; and Step G6, determining whether a sixth data block of the fifth command is legitimate; data being error and the operation failing if the sixth data block of the fifth command is illegitimate; determining whether the application corresponding to the third data block has a security domain right if the sixth data block of the fifth command is legitimate; the operation condition being not met and the operation failing if the application corresponding to the third data block has the security domain right; setting the association security domain of the application corresponding to the third data block to be the application corresponding to the third data block and the operation being successful if the application corresponding to the third data block has no security domain right.

The process of personalizing an application in response to the sixth command includes:

Step H1, determining whether both of a first data block and a second data block of the sixth command are legitimate; executing Step H2 if both of the first data block and the second data block of the sixth command are legitimate, otherwise, data being error and the operation failing;

Step H2, determining whether a third data block of the sixth command is legitimate; data being error and the operation failing if the third data block of the sixth command is illegitimate, checking whether an application corresponding to the third data block exists in the card; the operation condition being not met and the operation failing if the application corresponding to the third data block does not exist in the card, determining whether an association security domain of the application corresponding to the third data block is the card content management module if the application corresponding to the third data block exists in the card; executing Step H3 if the association security domain of the application corresponding to the third data block is the card content management module; otherwise, the operation condition being not met and the operation failing; and Step H3, determining whether all of a fourth data block, a fifth data block and a sixth data block of the sixth command are all legitimate; setting the application corresponding to the third data block to be a personalized application, otherwise the operation condition being not met and the operation failing.

The process of deleting an application and an executable load file in response to the seventh command includes:

Step I1, determining whether a first data block of the seventh command is legitimate, executing Step I2 if the first data block of the seventh command is legitimate; otherwise data being error and the operation failing;

Step I2, determining whether a second data block of the seventh command is legitimate, data being error and the operation failing if the second data block of the seventh command is illegitimate; checking whether an application corresponding to the second data block exists in the card, executing Step I3 if the application corresponding to the second data block is in the card, otherwise executing Step I4;

Step I3, determining whether a fourth byte of the seventh command equals to a preset value, executing Step I4 if the fourth byte of the seventh command equals to the preset value, otherwise, executing Step I5;

Step I4, checking whether an executable load file corresponding to the second data block exists in the card; the operation condition being not met and the operation failing if the executable load file corresponding to the second data block does not exist in the card; determining whether the fourth byte of the seventh command equals to the preset value if the executable load file corresponding to the second data block exists in the card; deleting the application and executable load file corresponding to the second data block and the operation being successful if the fourth byte of the seventh command equals to the preset value; deleting the executable load file corresponding to the second data block and the operation being successful if the fourth byte of the seventh command does not equal to the preset value;

Step I5, checking whether the application corresponding to the second data block is another application or an association security domain of another executable load file, the operation condition being not met and the operation failing if the application corresponding to the second data block is another application or an association security domain of another executable load file; otherwise executing Step I6; and Step I6, determining whether the application corresponding to the second data block is the card content management module; the operation condition being not met and the operation failing if the application corresponding to the second data block is the card content management module; otherwise, deleting the application corresponding to the second data block and the operation being successful.

A method for implementing card data management is provided, which includes: executing the following Steps in a case that a first card data management module itself acts as the current first card data management module after APDU data of application protocol data unit is received by the first card data management module:

Step A, checking instruction code of the APDU data; executing Step D if the instruction code is effective value of 0xE8, executing Step B if the instruction code is effective value of 0xE6, or executing Step I if the instruction code is effective value of 0xE4;

Step B, checking a first parameter of the APDU data; executing Step C if the first parameter is 0x02, executing Step E if the first parameter is 0x04 or 0x0C, executing Step F if the first parameter is 0x08, executing Step G if the first parameter is 0x10, or executing Step H if the first parameter is 0x20;

Step C, receiving a data domain part of a pre-load command to obtain all content of the pre-load command, checking whether a card meets a pre-load condition based on the content of the pre-load command, newly building an executable file structure and setting respective data and executing Step J if the card meets the pre-load condition; otherwise executing Step J directly;

Step D, receiving a data domain part of a load command to obtain all content of the load command, checking whether the card meets a load condition based on the content of the load command, storing the content of the load command and executing Step J if the card meets the load condition; otherwise directly executing Step J;

Step E, receiving a data domain part of an install command to obtain all content of the install command, checking whether the card meets an install condition based on the content of the install command, creating an application and setting a respective state and executing Step J if the card meets the install condition; otherwise directly executing Step J;

Step F, receiving a data domain part of a selectable command to obtain all content of the selectable command, checking whether the card meets a selectable condition based on the content of the selectable command, setting a state of the respective application to be selectable and executing Step J if the card meets the selectable condition; otherwise directly executing Step J;

Step G, receiving a data domain part of an extradition command to obtain all content of the extradition command, determining whether the card meets an extradition condition based on the content of the extradition command, resetting a security domain associated with the respective application and executing Step J if the card meets the extradition condition; otherwise directly executing Step J;

Step H, receiving a data domain part of a personalized command to obtain all content of the personalized command, checking whether the card meets a personalized condition based on the content of the personalized command, sending data to the respective application and executing Step J if the card meets the personalized condition; otherwise directly executing Step J;

Step I, receiving the data domain part of a deleting command to obtain all content of the deleting command, checking whether the card meets a deleting condition based on the content of the deleting command, deleting respective data in the card which is specified in the deleting command and executing Step J if the card meets the deleting condition; otherwise directly executing Step J; and Step J, generating and returning the respective returned data and/or respective state code to the RE.

The advantages of the present disclosure are to provide a method for managing applications on a card, thereby implementing the loading, installing, updating, personalizing and deleting of applications on the card; additionally, it is convenient for managing data on the card, for which there are two aspects as follows:

1. the card issuer may care little about an unconcerned application; and 2. the third party can manage own application, and there is no need to manage the application by the card issuer.

BRIEF DESCRIPTION OF THE DRAWINGS

The drawings needed to be used in the description of embodiments or the conventional technology are described briefly as follows, so that technical solutions in the embodiments of the present disclosure or in the conventional technology may become clearer. It is obvious that the drawings in the following description only illustrate some embodiments of the present disclosure. For those skilled in the art, other drawings may be obtained based on these drawings without any creative work.

DETAILED DESCRIPTION OF THE EMBODIMENTS

Technical solutions in embodiments of the disclosure are described clearly and completely in conjunction with the drawings hereinafter. Apparently, the described embodiments are merely a part other than all of the embodiments according to the disclosure. Based on the described embodiments of the disclosure, other embodiments obtained by those of ordinary skill in the art without any creative work belong to the scope of the disclosure.

Embodiment 1

Figure 1:
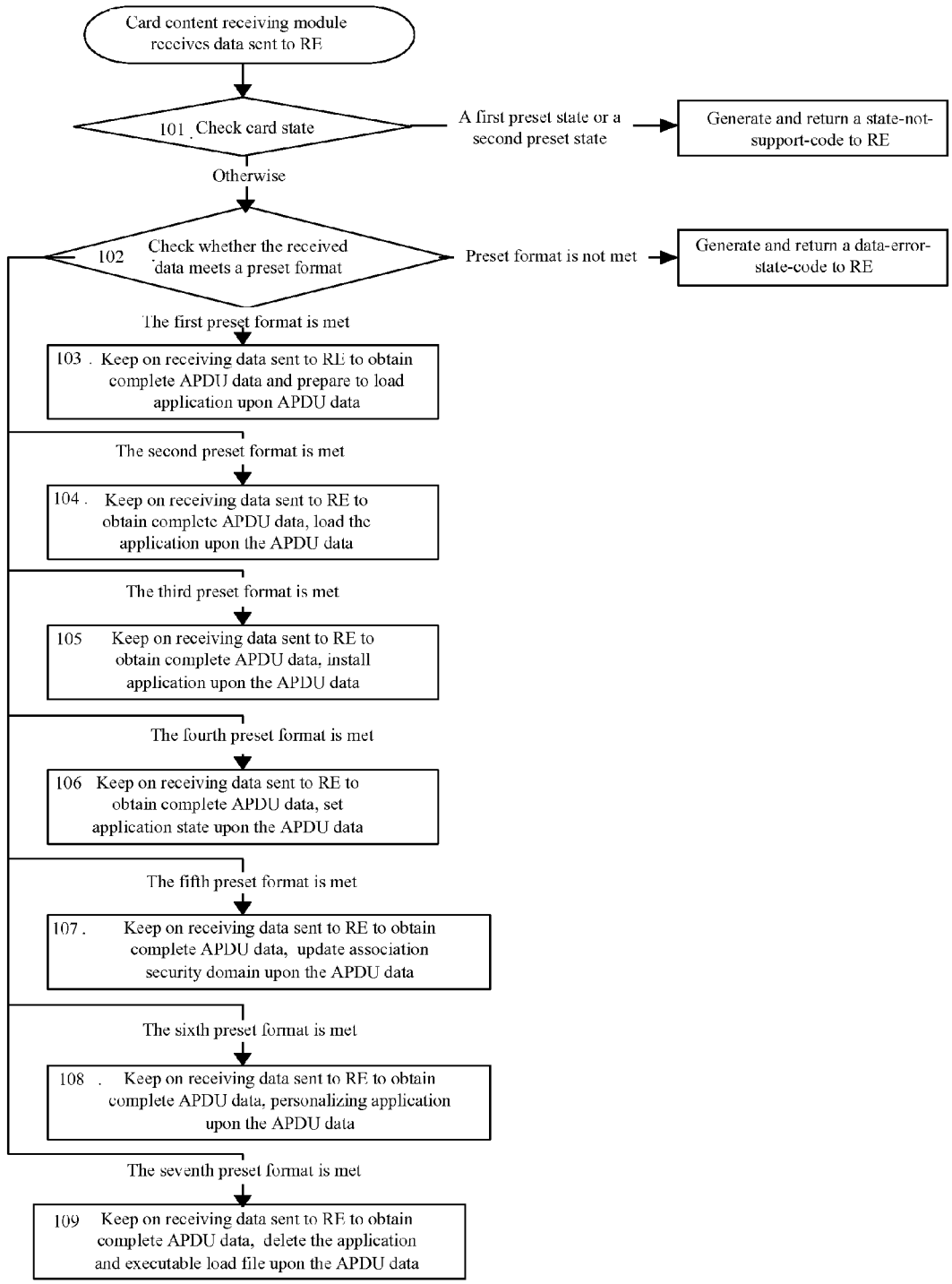
FIG. 1 is a flow chart of a method for managing applications on a card according to Embodiment 1 of the present disclosure.

A method for managing applications on a card is provided according to Embodiment 1 of the present disclosure. As shown in FIG. 1, the method includes executing the following Steps after data sent by a RE device is received by a card content management module. In the present disclosure, the card content management module is a special application in the card.

In Step 101, a card state is checked; if the card state is a first preset state or a second preset state, a card-state-not-supporting state code is generated and sent to the RE and the process ends; otherwise, Step 102 is executed.

Specifically, in Embodiment 1, the first preset state refers to TERMINATED, and the second preset state refers to CARD_LOCKED.

In Step 102, it is checked whether the received data conforms to a preset format; if the received data conforms to a first preset format, Step 103 is executed; if the received data conforms to a second preset format, Step 104 is executed; if the received data conforms to a third preset format, Step 105 is executed; if the received data conforms to a fourth preset format, Step 106 is executed; if the received data conforms to a fifth preset format, Step 107 is executed; if the received data conforms to a sixth preset format, Step 108 is executed; if the received data conforms to a seventh preset format, Step 109 is executed; or if the received data does not conform to the preset format, a data error state code is generated and sent back to the RE and the process ends.

Specifically, in Embodiment 1, Step 102 specifically includes Step B1 to Step B3.

In Step B1, it is checked whether the length of the received data is 5 bytes, if the received data is 5 bytes, Step B2 is executed; otherwise, the received data does not conform to a preset format, the data error state code is generated and returned to the RE and the process ends.

In Step B2, it is checked whether the first byte of the received data is 0x80 or 0x84, if the first byte of the received data is 0x80 or 0x84, Step B3 is executed; otherwise, the received data does not conform to the preset formats, the data error state code is generated and returned to the RE and the process ends.

In Step B3, the second byte of the received data is checked, if the second byte is 0xE6, Step B4 is executed; if the second byte is 0xE8, Step B5 is executed; if the second byte is 0xE4, Step B6 is executed; otherwise, the received data does not conform to the preset format, the data error state code is generated and returned to the RE and the process ends.

In Step B4, the third byte to the fifth byte of the received data are checked, if the third byte and the fourth byte are 0x02 and 0x00 respectively and the fifth byte is not less than 0x0A, the received data conforms to the first preset format and Step 103 is executed; if the third byte is 0x04 or 0x0C, the fourth byte is 0x00 and the fifth byte is not less than 0x18, the received data conforms to the third preset format, Step 105 is executed; if the third byte and the fourth byte are 0x08 and 0x00 respectively and the fifth byte is not less than 0x0C, the received data conforms to the fourth preset format and Step 106 is executed; if the third byte and the fourth byte are 0x10 and 0x00 respectively and the fifth byte is not less than 0x10, the received data conforms to the fifth preset format and Step 107 is executed; if the third byte and the fourth byte are 0x20 and 0x00 respectively and the fifth byte is not less than 0x0B, the received data conforms to the sixth preset format and Step 108 is executed; otherwise, the received data does not conform to the preset format, the data error state code is generated and returned to the RE and the process ends.

In Step B5, it is checked whether the third byte of the received data is 0x00 or 0x80, if the third byte of the received data is 0x00 or 0x80, the received data conforms to the second preset format and Step 104 is executed; otherwise, the received data does not conform to the preset format, the data error state code is generated and returned to the RE and the process ends.

In Step B6, if the third byte of the received data is 0x00, the received data conforms to the seventh preset format and Step 109 is executed; otherwise, the received data does not conform to the preset format, the data error state code is generated and returned to the RE and the process ends.

In Step 103, the data sent by RE is received continually to obtain complete APDU data, loading an application is prepared according to the APDU data.

Specifically, in Embodiment 1, the APDU data in Step 103 is a for_Load command.

The process of preparing for loading an application includes: parsing the for_Load command, obtaining a file load identification and a load file association security domain identification, creating load file structure, filling the obtained file load identification and the load file association security domain identification in the created load file structure, generating and returning an operation success state code and an operation result to the RE if the operation is successful, and ending the process; or generating and returning a respective state code based on a reason of operation failure to the RE if the operation is unsuccessful, and ending the process.

In Step 104, the data sent by RE is received continually to obtain complete APDU data and the application is loaded according to the APDU data.

Specifically, in Embodiment 1, the APDU data in Step 104 is a Load command.

The application being loading according to the APDU data specifically includes: parsing the Load command to obtain a file loading data block, obtaining component data and storing the component data according to the file loading data block, filling a storage address in the load file structure, generating and returning an operation success state code and an operation result to the RE if the operation is successful, and ending the process; or generating and returning a respective state code based on a reason of operation failure to the RE if the operation is unsuccessful, and ending the process.

In Step 105, the data sent by RE is received continually to obtain complete APDU data and the application is installed based on the APDU data.

Specifically, in Embodiment 1, the APDU data in Step 105 is a for_Install command.

The application being installed according to the APDU data specifically includes: parsing the for_Install command, obtaining an executable load file identification, an executable module identification, an application identification and an application right, searching for the load file structure according to the executable load file identification obtained by the parsing, searching for an executable module corresponding to the executable module identification obtained by the parsing in storage space corresponding to a stored address storage in the found load file structure, creating an application of the executable module founded by searching, identifying the created application with the application identification obtained by the parsing, assigning a right specified by the application right obtained by the parsing to the created application, setting the association security domain of the created application to be the association security domain of the executable file corresponding to the executable file identification obtained by the parsing, generating and returning an operation successes state operation code and a result to the RE if the operation is successful, and ending the process; or generating a respective state code based on a reason of operation failure if the operation is unsuccessful, and ending the process.

In Step 106, the data sent by RE is received continually to obtain complete APDU data and a state of the application is set based on the APDU data.

Specifically, in Embodiment 1, the APDU data in Step 106 is a for_Makeselectable command.

The state of the application state being set based on the APDU data specifically includes: paring the for_Makeselectable command, obtaining application identification and application right, searching for the application corresponding to the application identification, updating the state of the found application to be an optional state and updating the right of the found application to be the right specified application right obtained by the parsing, generating and returning the operation success code and a result to the RE if the operation is successful, and ending the process; or generating and returning a respective state code to the RE based on a reason of operation failure if the operation is unsuccessful, and ending the process.

In Step 107, the data sent by RE is received continually to obtain complete APDU data and an association security domain of the application is updated based on the APDU data.

In this case, the association security domain of the application includes services such as providing a key for the application.

Specifically, in Embodiment 1, the APDU data in Step 107 is a for_Extradition command.

The association security domain of the application being updated based on the APDU data specifically includes: parsing the for_Extradition command, obtaining security domain identification and application identification, searching for the application corresponding to the application identification obtained by the parsing and the application corresponding to the security domain identification obtained by the parsing, updating the found association security domain of the application corresponding to the application identification obtained by the parsing to be the application corresponding to the security domain identification obtained by the parsing, generating and returning an operation success state code and a result to the RE if the operation is successful, and ending the process; or generating and returning a respective state code based on a reason of operation failure to the RE if the operation is unsuccessful, and ending the process.

In Step 108, the data sent by RE is received continually to obtain complete APDU data and the application is personalized based on the APDU data.

Specifically, in Embodiment 1, the APDU data in Step 108 is a for_Personalized command.

The application being personalized based on the APDU data specifically includes: parsing the for_Personalized command to obtain the application identification, searching for the application corresponding to the application identification obtained by the parsing, setting the found application to be a personalized application, generating and returning an operation success state code and a result to the RE if the operation is successful, and ending the process; or generating and returning a respective state code based on a reason of operation failure to the RE if the operation is unsuccessful, and ending the process.

In Step 109, the data sent by RE is received continually to obtain complete APDU data, the application and the executable load file are deleted based on the APDU data.

Specifically, in Embodiment 1, the APDU data in Step 109 is a Delete command.

The application and the executable load file being deleted based on the APDU data specifically includes: parsing the Delete command, obtaining the data domain identification, searching for the application corresponding to the data domain identification obtained by the parsing and the executable load file in the card, deleting the found application and the executable file, generating and returning an operation success state code and a result to the RE if the operation is successful, and ending the process; or generating and returning a respective state code based on a reason of operation failure to the RE if the operation is unsuccessful, and ending the process.

Specifically, in Embodiment 1, the returned result is 0x00 and the reason of operation failure includes that operation condition is not met and data error; in a case that the reason of operation failure is that the operation condition is not met, a state code not meeting the operation condition is generated and sent to the RE; in a case that the reason of operation failure is that the data is error, a data error state identification is returned to the RE.

Embodiment 2

Figure 2:
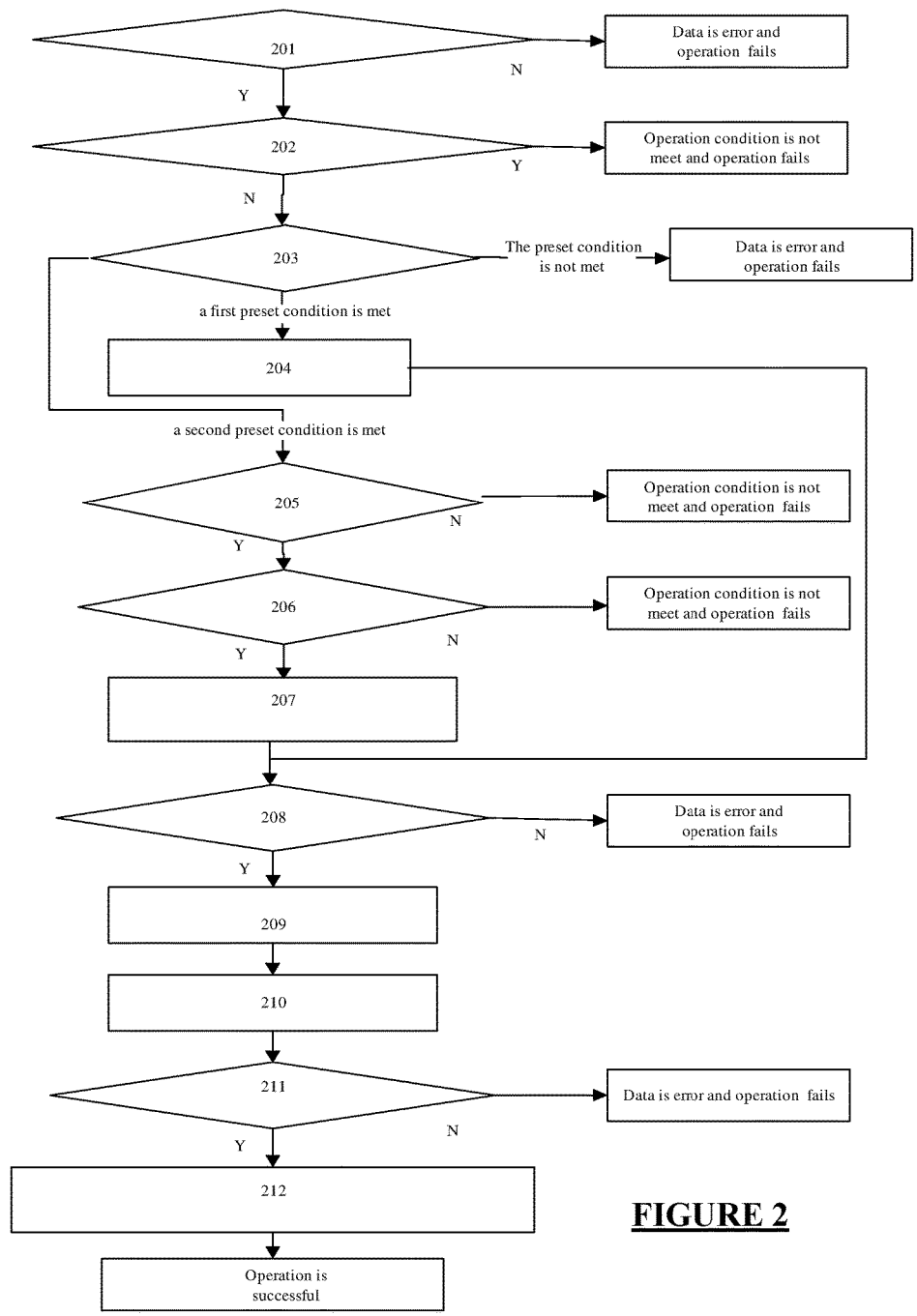
FIG. 2 is a flow chart of a specific method for preparing for loading an application according to Embodiment 2 of the present disclosure.

A specific method for preparing for loading an application in the method for managing the application on the card according to Embodiment 1 is provided according to Embodiment 2 of the present disclosure. The APDU data in Embodiment 2 is complete APDU data obtained in Step 103; the data domain of the APDU data can be considered to be made up of multiple data blocks, each data block is in a LV structure, i.e. a data length+a data; as shown in FIG. 2, the method includes Step 201 to Step 212.

In Step 201, it is determined whether a first data block of the APDU data is legitimate, Step 202 is executed if the first data block is legitimate; otherwise, data is error and the operation fails.

In Embodiment 2, the first data block is a load file identification length+a load file identification.

The process of determining whether a first data block of the APDU data is legitimate includes: determining whether the load file identification length of the first data block of the APDU data is in a preset range, checking each byte of the load file identification in the first data block of the APDU data if the load file identification length is in a preset range, the first data block is illegitimate if each byte is 0x00, the first data block is legitimate if not all of the bytes are 0x00; the first data block is illegitimate if the load file identification length is not in the preset range.

The preset range is from 0x05 to 0x10.

In Step 202, it is checked whether an executable file corresponding to the load file identification exists in the card, the operating condition is not met and the operation fails if the executable file exists in the card; otherwise, Step 203 is executed.

In Step 203, it is checked whether a second data block of the APDU data meets a preset requirement, Step 204 is executed if a first preset requirement is met; Step 205 is executed if a second preset requirement is met; data is error and the operation fails if the preset requirement is not met.

In Embodiment 2, the second data block is a load file association security domain identification length+a load file association security domain identification.

The process of checking whether a second data block of the APDU data meets a preset requirement includes: determining whether the load file association security domain identification length in the second data block of the APDU data is 0x00, where the second data block of the APDU data meets the first preset requirement if the load file association security domain identification length is 0x00; checking each byte of the load file association security domain identification in the second data block of the APDU data if the load file association security domain identification length is not 0x00; the second data block of the APDU data does not meet the preset requirement if each byte of the load file association security domain identification is 0x00, the second data block of the APDU data meets the second preset requirement if not all bytes are 0x00.

In Step 204, the association security domain of the load file is set to be a card content management module, and Step 208 is executed.

In this case, the load file is a load file corresponding to the load file identification of the first data block in the first block of the APDU data.

In Step 205, it is checked whether an application corresponding to the load file association security domain exists in the card, Step 206 is executed if the application corresponding to the load file association security domain exists in the card; otherwise the operation condition is not met and the operation fails.

In Step 206, it is checked whether the application corresponding to the load file association security domain has a security domain right; Step 207 is executed if the application has the security domain right; otherwise, the operation condition is not met and the operation fails.

Specifically, whether the application has a security domain right is determined through right attribution of the application, the right attribution of the application is one byte data, which includes b8 b7 b6 b5 b4 b3 b2 b1 in an order from a high bit to a low bit; checking whether the application corresponding to the load file association security domain has security domain right specifically is checking the b8 of right attribution of the application corresponding to the load file association security domain identification, the application corresponding to the load file association security domain identification has security domain right if b8 is 1; the application corresponding to the load file association security domain identification has no security domain right if b8 is not 1.

In Step 207, the association security domain of the load file is set to be an application corresponding to the load file association security domain identification.

In Step 208, it is determined whether a third data block of the APDU data is legitimate, Step 209 is executed if the third data block is legitimate; otherwise, data is error and the operation fails.

In Embodiment 2, the third data block is a load file data block hash value length+a load file data block hash value.

The process of determining whether a third data block of the APDU data is legitimate includes determining whether the load file data block hash value length of the third data block of the APDU data is 0x00, where the third data block of the APDU data is illegitimate if the load file data block hash value length of the third data block of the APDU data is 0x00; otherwise, the third data block of the APDU data is legitimate.

In Step 209, the load file data block hash value is stored.

In Step 210, a fourth data block of the APDU data is processed.

In Embodiment 2, the fourth data block is: a load parameter domain length+a load parameter domain, the load parameter domain is one TLV structure data block (Tn, Ln, Vn), and Vn is made up of three TLV structure data blocks (Tn', Ln', Vn'). In Embodiment 2, Step 210 specifically includes Step 210-1 to Step 210-7.

In Step 210-1, it is determined whether the load parameter domain length is 0x00, Step 211 is executed if the load parameter domain length is 0x00; otherwise, Step 210-2 is executed.

In Step 210-2, it is determined whether Tn is 0xEF, Step 210-3 is executed if Tn is 0xEF; otherwise, data is error and the operation fails.

In Step 210-3, 1 TLV structure data block of Vn is obtained, it is determined whether Tn' of the TLV structure data block is legitimate, Step 210-4 is executed if the Tn' of the TLV structure data block is legitimate; otherwise, data is error and the operation fails.

In Step 210-4, it is determined whether Ln' of the TLV structure block data is 0x02, Step 210-5 is executed if Ln' of the TLV structure block data is 0x02; otherwise, data is error and the operation fails.

In Step 210-5, Tn' of the TLV structure data block is checked, a non-volatile code space limit is obtained and stored according to Vn' of the TLV structure data block if Tn' is 0xC6 and Step 210-6 is executed, a volatile data space limit is obtained and stored according to Vn' of the TLV structure data block and Step 210-6 is executed if Tn' is 0xC7; a non-volatile data space limit is obtained and stored according to Vn' of the TLV structure data block if Tn' is 0xC8 and Step 210-6 is executed.

In Step 210-6, it is determined whether an unprocessed TLV structure data block exists, Step 210-3 is returned to if the unprocessed TLV structure data block exists; otherwise, Step 210-7 is executed.

In Step 210-7, it is determined whether non-volatile storage space and volatile storage space meet the above limit, Step 211 is executed if the non-volatile storage space and volatile storage space meet the above limit; otherwise, the operation condition is not met and the operation fails.

In Step 211, it is determined whether a fifth data block of the APDU data is legitimate, Step 212 is executed if the fifth data block of the APDU data is legitimate; otherwise, data is error and the operation fails.

In Embodiment 2, the fifth data block is a load token length+a load token.

The process of determining whether a fifth data block of APDU data is legitimate includes: determining whether the load token length in the fifth data block of the APDU is 0x00, where the fifth data block of APDU data is legitimate if the load token length in the fifth data block of the APDU is 0x00; otherwise, the data block of APDU data is illegitimate.

In Step 212, a load file structure is created, a load file identification and a load file association security domain identification are filled in the created load file structure, a global block number in the card is initialized and the operation is successful.

Embodiment 3

Figure 3:
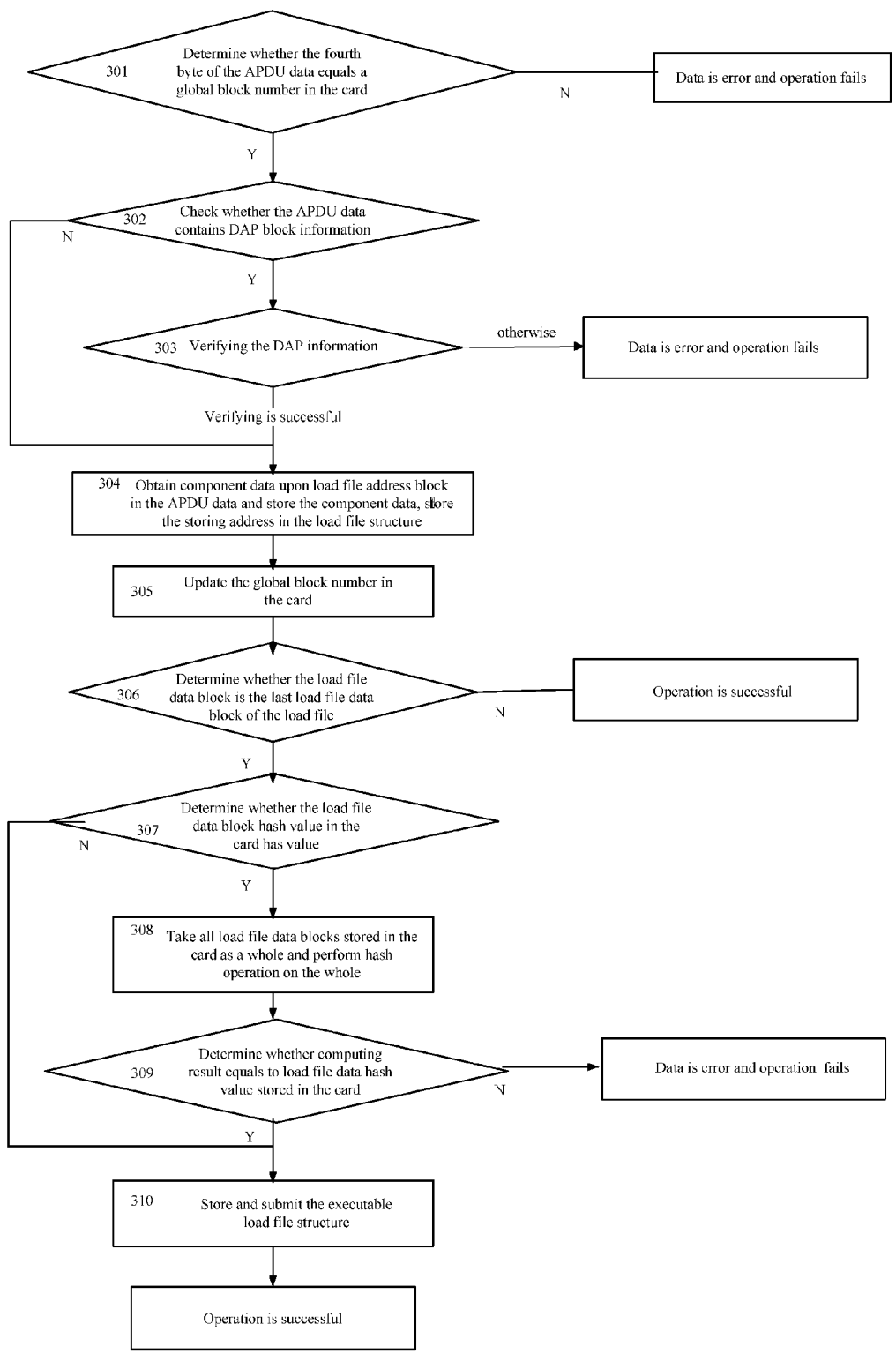
FIG. 3 is a flow chart of a specific method for loading an application according to Embodiment 3 of the present disclosure.

A method for loading an application in the method for managing applications on the card according to Embodiment 1 is provided according to Embodiment 3. As shown in FIG. 3, the method includes Step 301 to Step 310.

In Step 301, it is determined whether a fourth byte of the APDU data equals to the global block number inside the card, Step 302 is executed if the fourth byte equals to the global block number inside the card; otherwise data is error and the operation fails.

In Step 302, it is checked whether APDU data contains DAP (Data Authentication Pattern) block information, Step 303 is executed if the APDU data contains DAP block information; otherwise, Step 304 is executed.

In Step 303, the DAP block information is verified, Step 304 is executed if the verifying is successful, otherwise, data is error and the operation fails.

In Step 304, component data is obtained and stored according to the load file data block in the APDU data and a storage address filled in the load file structure.

Specifically, the load file is separated into multiple load file data blocks outside the card, each time one load file data block is sealed as one piece of APDU data and send the APDU data to the card; RE sends the APDU data received by the card and send the APDU data to the card content management module, the card content management module processes the load file data block inside every piece of APDU data by taking a component as an unit; the component includes: a Header component, a Directory component, an Applet component, an Import component, etc.

In Step 305, a global block number in the card is updated.

In Embodiment 3, the process of updating the global block number in the card includes adding 1 to the current value of the global block number in the card.

In Step 306, it is determined whether the load file data block is the last load file data block of the load file; Step 307 is executed if the load file data block is the last load file data block of the load file; otherwise, the operation is successful.

In Embodiment 3, the process of determining whether the load file data block is the last load file data block of the load file includes: determining whether the value of a third byte of the APDU data is 0x80, where the load file data block is the last load file data block of the load file if the value of the third byte of the APDU data is 0x80; otherwise, the load file data block is not the last load file block of the load file and the load file has another data block.

In Step 307, it is determined whether a load file data block hash value in the card has a value, Step 308 is executed if the load file data block hash value in the card has a value; otherwise, Step 310 is executed.

In Step 308, all load file data blocks stored in the card are taken as a whole and a Hash operation is performed on the whole.

In Step 309, it is determined whether an operation result equals to the load file data block hash value stored in the card, Step 310 is executed if the operation result equals to the load file data block hash value stored in the card; otherwise, data is error and the operation fails.

In Step 310, the executable load file structure stored and submitted and the operation is successful.

In Embodiment 3, the submitting is writing the data from a buffer to a permanent storage area.

Embodiment 4

Figure 4:
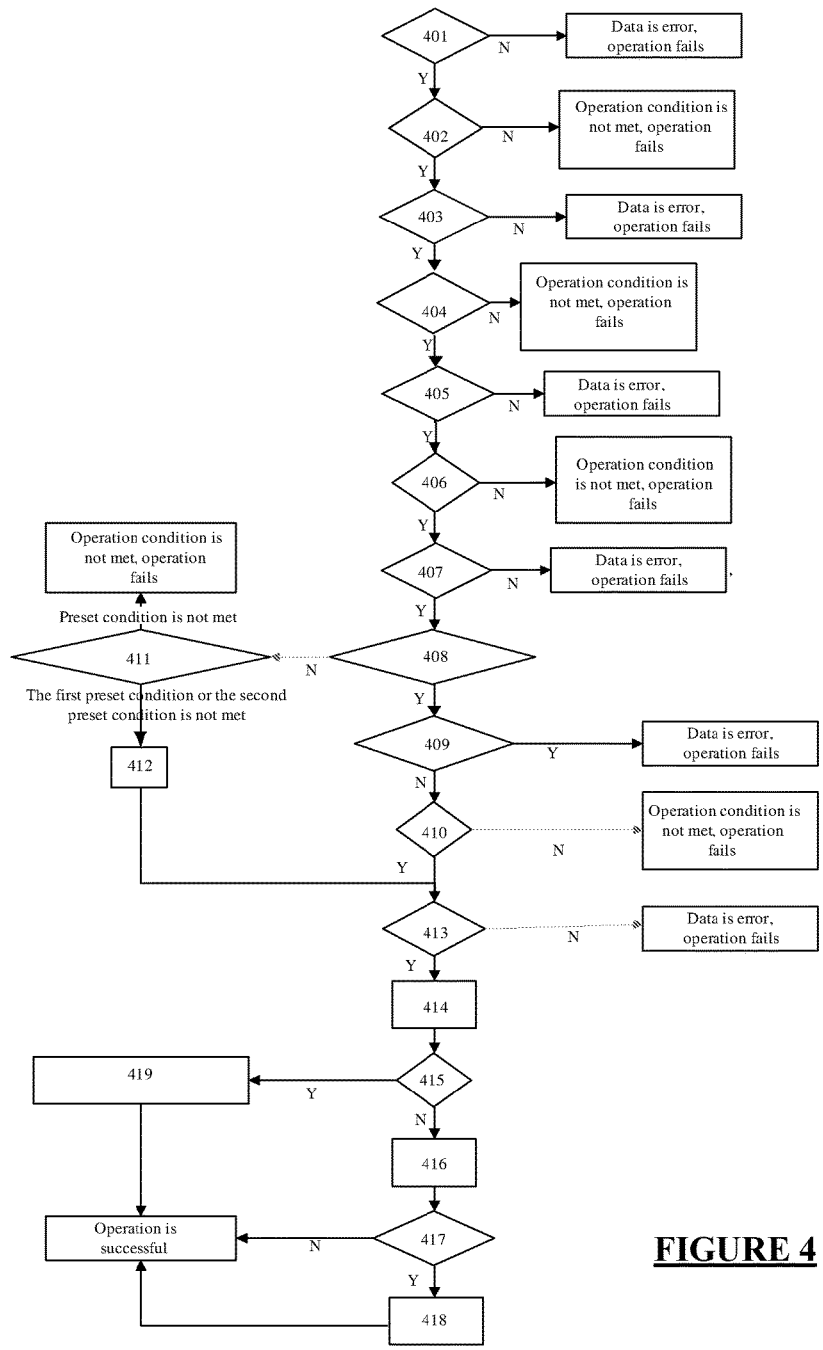
FIG. 4 is a flow chart of a specific method for installing an application according to Embodiment 4 of the present disclosure.

A specific method for installing application in the method for managing applications on the card according to Embodiment 1 is provided according to Embodiment 4 of the present disclosure. The data domain part of the APDU data in Embodiment 4 can be considered to be made up of multiple data blocks, each data block is in a LV structure, i.e. a data length+a data; as shown in FIG. 4, the method includes Step 401 to Step 419.

In Step 401, it is determined whether a first data block of the APDU data is legitimate, Step 402 is executed if the first data block is legitimate; otherwise, data is error and the operation fails.

In Embodiment 4, the first data block specifically includes an executable load file identification length+an executable load file identification.

The process of determining whether the first data block of the APDU data is legitimate includes: determining whether the executable load file identification length in the first data block of APDU data is in a preset range, where the first data block of the APDU data is legitimate if the length is in the preset range; otherwise, the first data block of the APDU data is illegitimate.

The preset range is from 0x05 to 0x10.

In Step 402, it is checked whether a load file structure corresponding to the executable load file identification exists in the card, Step 403 is executed if the load file structure exists in the card; otherwise, the operation condition is not met and the operation fails.

In Step 403, it is determined whether a second data block of the APDU data is legitimate, Step 404 is executed if the second data block is legitimate; otherwise, data is error and the operation fails.

In Embodiment 4, the second data block specifically includes an executable module identification length+an executable module identification.

The process of determining whether the second data block of the APDU data is legitimate includes: determining whether the executable module identification length in the second data block is in a preset range, where the second data block of the APDU data is legitimate if the length is in the preset range; otherwise, the second data block of the APDU data is illegitimate.

The preset range is from 0x05 to 0x10.

In Step 404, it is checked whether an executable module corresponding to the executable module identification exists in the storage apace corresponding to the storage address in the load file structure, Step 405 is executed if the executable module corresponding to the executable module identification exists in the storage space corresponding to the storage address in the load file structure; otherwise, the operation condition is not met and the operation fails.

In Step 405, it is determined whether a third data block of the APDU data is legitimate, Step 406 is executed if the third data block is legitimate; otherwise, data is error and the operation fails.

In Embodiment 4, the third data block specifically includes an application identification length+an application identification.

The process of determining whether the third data block of the APDU data is legitimate includes: determining whether the application identification length in the third data block of the APDU data is in a preset range, and checking each byte of the application identification in the third data block of the APDU data, where the third data block is illegitimate if each byte is 0x00, the third data block is legitimate if not all of the bytes are 0x00; the third data block is illegitimate if the application identification length in the third data block of the APDU data is not in the preset range.

The preset range is from 0x05 to 0x10.

In Step 406, it is checked whether an application corresponding to the application identification exists in the card, Step 407 is executed if the application corresponding to the application identification exists in the card and the operation fails if the operation condition is not met.

In Step 407, it is determined whether a fourth data block of the APDU data is legitimate, Step 408 is executed if the fourth data block is legitimate; otherwise, data is error and the operation fails.

In Embodiment 4, the fourth data block specifically includes an application right length+application right.

The process of determining whether the fourth data block of the APDU data is legitimate includes: determining whether the application right length in the fourth data block of the APDU data is 0x01, where the fourth data block of the APDU data is legitimate if the application right length is 0x01; otherwise the fourth data block of the APDU data is illegitimate.

In Step 408, it is determined whether the installed application this time has a default selection right, Step 409 is executed if the installed application this time has the default selection right; otherwise, Step 411 is executed.

In Embodiment 4, the application installed this time specifically is an application corresponding to the application identification in the third data block; the process of determining whether the application installed this time has a default selection right includes: determining whether the application right in the fourth data block of the APDU is 0x04, where the application installed this time has the default selection right if the application right in the fourth data block of APDU data is 0x04; otherwise, the application installed this time has no default selection right.

In Step 409, it is determined whether a third byte of the APDU data is a preset value, where the data is error and the operation fails if the third byte is the preset value; otherwise, Step 410 is executed.

In Embodiment 4, the preset value is 0x04.

In Step 410, it is determined whether the card content management module has a default selection right, Step 413 is executed if the card content management module has the default selection right; otherwise, the operation condition is not met and the operation fails.

In Embodiment 4, it is determined whether the card content management module has the default selection right depending on the right attribution of the card content management module, and the right attribution of the card content management module is one byte data, which includes b8 b7 b6 b5 b4 b3 b2 b1 in an order from high bit to low bit.

The process of determining whether the card content management module has a default selection right includes: determining whether b3 of the right attribution of the card content management module is 1, where the card content management module has the default selection right if b3 is 1; otherwise, the card content management module has no default selection right.

In Step 411, it is determined whether the application right meets a preset condition, Step 412 is executed if the application right meets a first preset condition or a second preset condition; the operation condition is not met and the operation fails if the application right does not meet the preset condition.

In Embodiment 4, the process of determining whether the application right meets the preset condition includes: checking the application right, where the application right meets the first preset condition if the first bit, the sixth bit and the seventh bit are 0 and the eighth bit is 1 from the low bit in the application right; the application right meets the second preset condition if not all of the first bit, the sixth bit and the seventh bit are 0 from the low bit in the application right; otherwise, the application right does not meet the preset condition.

In Step 412, an install parameter domain in a fifth data block of the APDU data is processed and Step 413 is executed.

In Embodiment 4, the fifth data block specifically includes an install parameter domain length+an install parameter domain, the install parameter domain is made up of data in a format of one or more TLV structure data blocks (Tn, Ln, Vn), and Vn is made up of zero or more TLV structure data blocks (Tn', Ln', Vn'). In Embodiment 4, Step 412 specifically includes Step 412-1 to Step 412-9.

In Step 412-1, it is determined whether the install parameter domain length is 0x00, Step 413 is executed if the install parameter domain length is 0x00; otherwise, Step 412-2 is executed.

In Step 412-2, one TLV structure data block of the install parameter is obtained, Tn of the TLV structure data block is checked, Step 412-3 is executed if Tn is 0xC9, or Step 412-4 is executed if Tn is 0xEF; otherwise, the data is error and the operation fails.

In Step 412-3, Vn of the TLV structure data block is stored and Step 412-9 is executed.

In Step 412-4, one TLV structure data block of Vn of the TLV structure data block is obtained, it is determined whether Tn' is legitimate, Step 412-5 is executed if Tn' is legitimate; otherwise, data is error and the operation fails.

In Step 412-5, it is determined whether Ln' is 0x02, Step 412-6 is executed if Ln' is 0x02; otherwise, data is error and the operation fails.

In Step 412-6, Tn' is checked, a volatile data space limit is obtained and stored based on Vn' if Tn' is 0xC7, Step 412-7 is executed, a non-volatile data space limit is obtained and stored based on Vn' if Tn' is 0xC8, and Step 412-7 is executed.

In Step 412-7, it is determined whether an unprocessed TLV structure data block exists in the TLV structure data block, Step 412-4 is executed if the unprocessed TLV structure data block exists in the TLV structure data block; otherwise Step 412-8 is executed.

In Step 412-8, it is determined whether the non-volatile storage space and the volatile storage space meets the above limit, Step 412-9 is executed if the non-volatile storage space and the volatile storage space meets the above limit; otherwise the operation condition is not met and the operation fails.

In Step 412-9, it is determined whether an unprocessed TLV structure data block exists in the install parameter domain, Step 412-2 is executed if the unprocessed TLV structure data block exists in the install parameter domain; otherwise, Step 413 is executed.

In Step 413, it is determined whether a sixth data block of the APDU data is legitimate, Step 414 is executed if the sixth data block is legitimate, otherwise, data is error and the operation fails.

In Embodiment 4, the sixth data block specifically includes an install token length+an install token.

The process of determining whether the sixth data block of the APDU data is legitimate includes: determining whether the install token length in the sixth data block of the APDU data is 0x00, where the sixth data block is legitimate if the install token length in the sixth data block of the APDU data is 0x00; otherwise, the sixth data block of the APDU data is illegitimate.

In Step 414, an application is registered based on the application identification in the data domain of the APDU data.

In Embodiment 4, Step 414 specifically includes: creating and storing an example of the executable module corresponding to the executable module identification in the APDU data, uniquely associating the example with the application identification in the APDU data, setting a state of the example to be an initial value, setting a right of the example based on the application right in the APDU data, setting an association security domain of the example to be the association security domain of the executable load file corresponding to the executable load file identification in the APDU data.

In Step 415, it is determined whether the third byte of the APDU data equals to a preset value, Step 419 is executed if the third byte equals to the preset value, otherwise, Step 416 is executed.

In Embodiment 4, the preset value is 0x04.

In Step 416, a state of the application installed this time is set to be SELECTABLE (selectable).

In Embodiment 4, Step 416 specifically is setting the state attribute of the application installed this time to be 0x07.

In Step 417, it is determined whether the application installed this time has a default selection right, Step 418 is executed if the application has the default selection right; otherwise, the operation is successful.

In Step 418, the application installed this time is set to be a default application and the operation is successful.

In Step 419, a state of the application installed this time is set to be INSTALLED (installed) and the operation is successful.

In Embodiment 4, Step 419 is setting the state attribute of the application installed this time to be 0x03.

Embodiment 5

Figure 5:
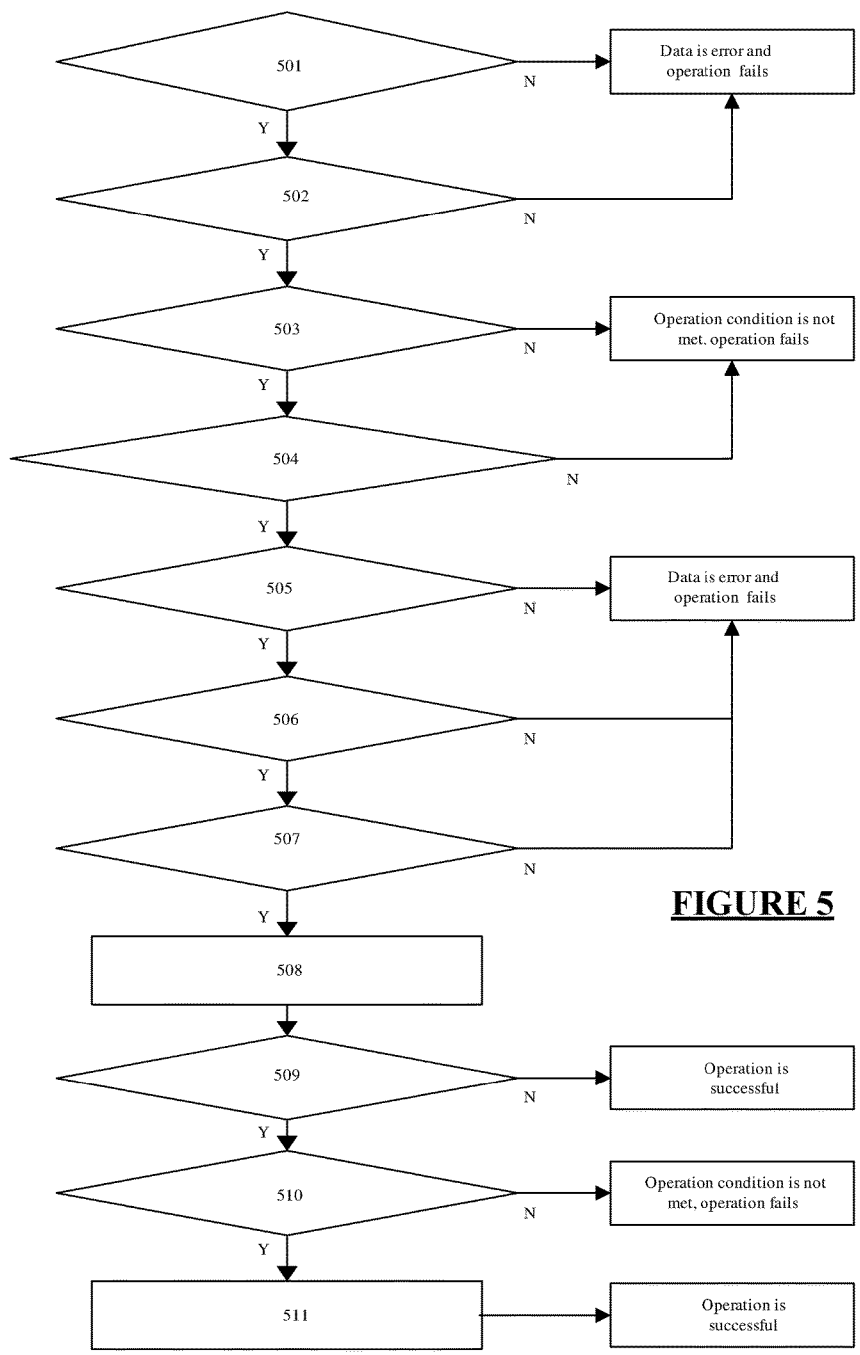
FIG. 5 is a flow chart of a specific method for setting a state of an application according to Embodiment 5 of the present disclosure.

A specific method for setting application state in the method for managing applications on the card according to Embodiment 1 is provided according to Embodiment 5 of the present disclosure. The data domain of the APDU data can be considered to be made up of multiple data blocks; each data block is in a LV structure, i.e. a data length+a data; as shown in FIG. 5, the method includes Step 501 to Step 511.

In Step 501, it is determined whether both a first data block and a second data block of the APDU data are legitimate, Step 502 is executed if both the first data block and the second data block are legitimate; otherwise, data is error and the operation fails.

In Embodiment 5, the process of determining whether the first data block of the APDU data is legitimate includes: determining whether the first data block of the APDU data is 0x00, where the first data block of the APDU data is legitimate if the first data block is 0x00; otherwise, the first data block of the APDU data is illegitimate.

The process of determining whether the second data block of the APDU data is legitimate includes: determining whether the second data block of the APDU data is 0x00, where the second data block of the APDU data is legitimate if the second data block is 0x00; otherwise, the second data block of the APDU data is illegitimate.

In Step 502, it is determined whether a third data block of the APDU data is legitimate, Step 503 is executed if the third data block is legitimate; otherwise, data is error and the operation fails.

In Embodiment 5, the third data block specifically includes an application identification length+an application identification.

The process of determining whether the third data block of the APDU data is legitimate includes: determining whether the application identification length in the third data block of the APDU data is in a preset range, where the third data block of the APDU data is legitimate if the application identification length is in the preset range; otherwise, the third data block of the APDU data is illegitimate.

The preset range is from 0x05 to 0x10.

In Step 503, it is checked whether an application corresponding to the application identification exists in the card, Step 504 is executed if the application corresponding to the application identification exists in the card; otherwise the operation condition is not met and the operation fails.

In Step 504, it is determined whether a state of the application corresponding to the application identification is INSTALLED, Step 505 is executed if the state is INSTALLED; otherwise, the operation condition is not met and the operation fails.

In Step 505, it is determined whether a fourth data block of the APDU data is legitimate, Step 506 is executed if the fourth data block is legitimate; otherwise, data is error and the operation fails.

In Embodiment 5, the fourth data block specifically includes an application right length+an application right.

The process of determining whether the fourth data block of the APDU data is legitimate includes: determining whether the application right length in the fourth data block of the APDU data is 0x01, where the fourth data block is legitimate of the APDU data is legitimate if the application right length is 0x01; otherwise, the fourth data block of the APDU data is illegitimate.

In Step 506, it is determined whether the fifth data block of the APDU data is legitimate, Step 507 is executed if the fifth data block is legitimate; otherwise, data is error and the operation fails.

In Embodiment 5, the fifth data block includes a parameter domain length+a parameter domain.

The process of determining whether the fifth data block of the APDU data is legitimate includes: determining whether the parameter domain length of the fifth data block of the APDU data is 0x00, where the fifth data block of the APDU data is legitimate if the parameter domain length is 0x00; otherwise, the fifth data block of the APDU data is illegitimate.

In Step 507, it is determined whether the sixth data block of the APDU data is legitimate, Step 508 is executed if the sixth data block is legitimate; otherwise, data is error and the operation fails.

In Embodiment 5, the sixth data block specifically includes a selectable token length+a selectable token.

The process of determining whether the sixth data block of the APDU data is legitimate includes: determining whether the selectable token length in the sixth data block of the APDU data is 0x00, where the sixth data block of the APDU data is legitimate if the selectable token length is 0x00; otherwise, the sixth data block of the APDU data is illegitimate.

In Step 508, a state of the application corresponding to the application identification is set to be SELECTABLE.

In Embodiment 5, Step 508 specifically is setting the state attribute of the application corresponding to the application identification to be 0x07.

In Step 509, it is determined whether the application corresponding to the application identification has a default selection right, Step 510 is executed if the application has the default selection right; otherwise, the operation is successful.

In Step 510, it is determined whether the card content management module has a default selection right, Step 511 is executed if the card content management module has the default selection right; otherwise, the operation condition is not met and the operation fails.

In Embodiment 5, it is determined whether the card content management module has a default selection right depending on the right attribute of the card content management module, and the right attribute of the card content management module is 1 byte data, which includes b8 b7 b6 b5 b4 b3 b2 b1 from a high bit to a low bit.

The process of determining whether the card content management module has a default selection right includes: determining whether b3 of the right attribute of the card content management module is 1, where the card content management module has the default selection right if b3 is 1; otherwise, the card content management module has no default selection right.

In Step 511, the default application is set to be an application corresponding to the application identification, and the operation is successful.

Embodiment 6

Figure 6:
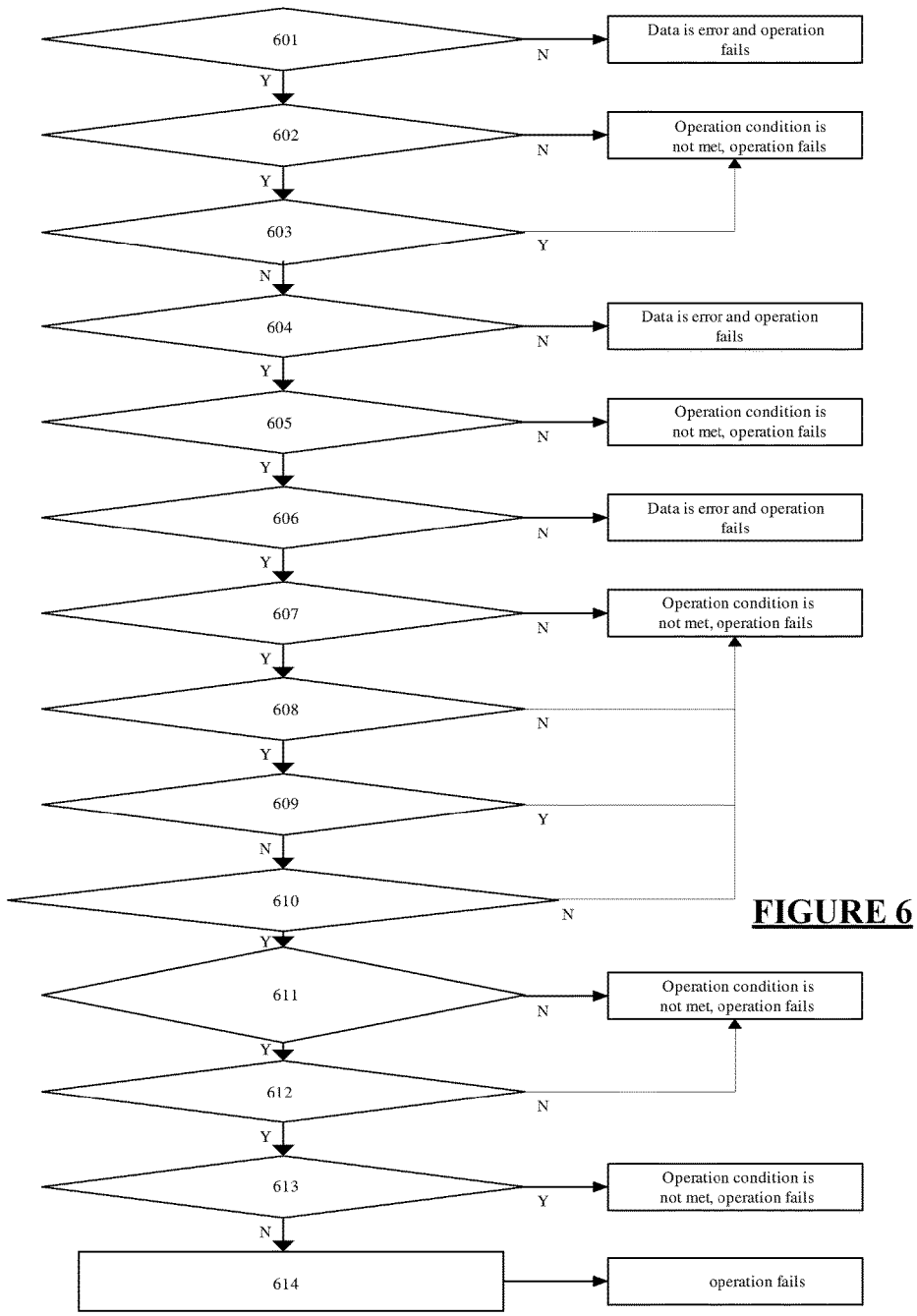
FIG. 6 is a flow chart of a specific method for updating an association security domain of an application according to Embodiment 6 of the present disclosure.

A specific method for updating association security domain of an application in the method for managing applications on the card according to Embodiment 1 is provided according to Embodiment 6 of the present disclosure. The data domain of the APDU data can be considered to be made up of multiple data blocks; each data block is in a LV structure, i.e. a data length+a data; as shown in FIG. 6, the method includes Step 601 to Step 614.

In Step 601, it is determined whether a first data block of the APDU data is legitimate, Step 602 is executed if the first data block of the APDU data is legitimate; otherwise, data is error and the operation fails.

In Embodiment 6, the first data block specifically includes a security domain identification length+a security domain identification.

The process of determining whether the first data block of the APDU data is legitimate includes: determining whether the security domain identification length in the first data block of the APDU data is in a preset range, where the first data block of the APDU data is legitimate if the security domain length in the first data block of the APDU data is in the preset range; otherwise, the first data block of the APDU data is illegitimate.

The preset range is from 0x05 to 0x10.

In Step 602, it is checked whether an application corresponding to the security domain identification exists in the card, Step 603 is executed if the application corresponding to the security domain identification exists in the card; otherwise, the operation condition is not met and the operation fails.

In Step 603, it is determined whether the application corresponding to the security domain identification is the card content management module, the operation condition is not met and the operation fails if the application corresponding to the security domain identification is the card content management module; otherwise, Step 604 is executed.

In Step 604, it is determined whether a second data block of the APDU data is legitimate, Step 605 is executed if the second data block of the APDU data is legitimate; otherwise, data is error and the operation fails.

In Embodiment 6, the process of determining whether the second data block of the APDU data is legitimate includes: determining whether the second data block of the APDU data is 0x00, where the second data block of the APDU data is legitimate if the second data block of the APDU data is 0x00; otherwise, the second data block of the APDU data is illegitimate.

In Step 605, it is determined whether a state of the application corresponding to the security domain identification is INSTALLED, Step 606 is executed if the state of the application corresponding to the security domain is INSTALLED, otherwise, the operation condition is not met and the operation fails.

In Step 606, it is determined whether the third data block of the APDU data is legitimate, Step 607 is executed if the third data block of the APDU data is legitimate; otherwise, data is error and the operation fails.

In Embodiment 6, the third data block specifically includes an application identification length+an application identification.

The process of determining whether the third data block of the APDU data is legitimate includes: determining whether the application identification length of the third data block of the APDU data is in a preset range, where the third data block of the APDU data is legitimate if the application identification length of the third data block of the APDU data is in the preset range; otherwise, the third data block of the APDU data is illegitimate.

The preset range is from 0x05 to 0x10.

In Step 607, it is checked whether an application corresponding to the application identification exists in the card, Step 608 is executed if the application corresponding to the application identification exists in the card; otherwise, data is error and the operation fails.

In Step 608, it is determined whether the application corresponding to the security domain identification has a security domain right, Step 609 is executed if the application corresponding to the security domain identification has the security domain right; otherwise, the operation condition is not met and the operation fails.

In Embodiment 6, Step 608 specifically includes: determining whether the most significant bit of the right attribute of the application corresponding to the security domain identification is 1, where the application corresponding to the security domain identification has the security domain right if the most significant bit of the right attribute of the application corresponding to the security domain identification is 1; otherwise, the application corresponding to the security domain identification has no security domain right.

In Step 609, it is determined whether a state of the application corresponding to the security domain identification is LOCKED (locked), the operation condition is not met and the operation fails if the state of the application corresponding to the security domain identification is LOCKED; otherwise, Step 610 is executed.

In Step 610, it is determined whether a state of the application corresponding to the security domain identification is PERSONALIZED (personalized), Step 611 is executed if the state of the application corresponding to the security domain identification is PERSONALIZED; otherwise, the operation condition is not met and the operation fails.

In Step 611, it is determined whether both a fourth data block and a fifth data block of the APDU data is legitimate, Step 612 is executed if both the fourth data block and the fifth data block of the APDU data is legitimate; otherwise, data is error and the operation fails.

In Embodiment 6, the process of determining whether the fourth data block of the APDU data is legitimate includes: determining whether the fourth data block of the APDU data is 0x00, where the fourth data block of the APDU data is legitimate if the fourth data block of the APDU data is 0x00; otherwise, the fourth data block of the APDU data is illegitimate.

The process of determining whether the fifth data block of the APDU data is legitimate includes: determining whether the fifth data block of the APDU data is 0x00, where the fifth data block of the APDU data is legitimate if the fifth data block of the APDU data is 0x00; otherwise, the fifth data block of the APDU data is illegitimate.

In Step 612, it is determined whether a sixth data block of the APDU data is legitimate, Step 613 is executed if the sixth data block of the APDU data is legitimate; otherwise, data is error and the operation fails.

In Embodiment 6, the sixth data block specifically includes an extradition Token length+an extradition Token.

The process of determining whether the sixth data block of the APDU data is legitimate includes: determining whether the extradition token length of the sixth data block of the APDU data is 0x00, where the sixth data block of the APDU data is legitimate if the extradition token length of the sixth data block of the APDU data is 0x00; otherwise, the sixth data block of the APDU data is illegitimate.

In Step 613, it is determined whether the application corresponding to the application identification has a security domain right, the operation condition is not met and the operation fails if the application corresponding to the application identification has the security domain right; otherwise, Step 614 is executed.

In Embodiment 6, Step 613 specifically includes: determining whether the most significant bit of the right attribute of the application corresponding to the application identification is 1, where the application corresponding to the application identification has the security domain right if the most significant bit of right attribute of the application corresponding to the application identification is 1; otherwise, the application corresponding to the application identification has no security domain right.

In Step 614, the association security domain of the application corresponding to the application identification is set to be the application corresponding to the security domain identification; and the operation is successful.

Embodiment 7

Figure 7:
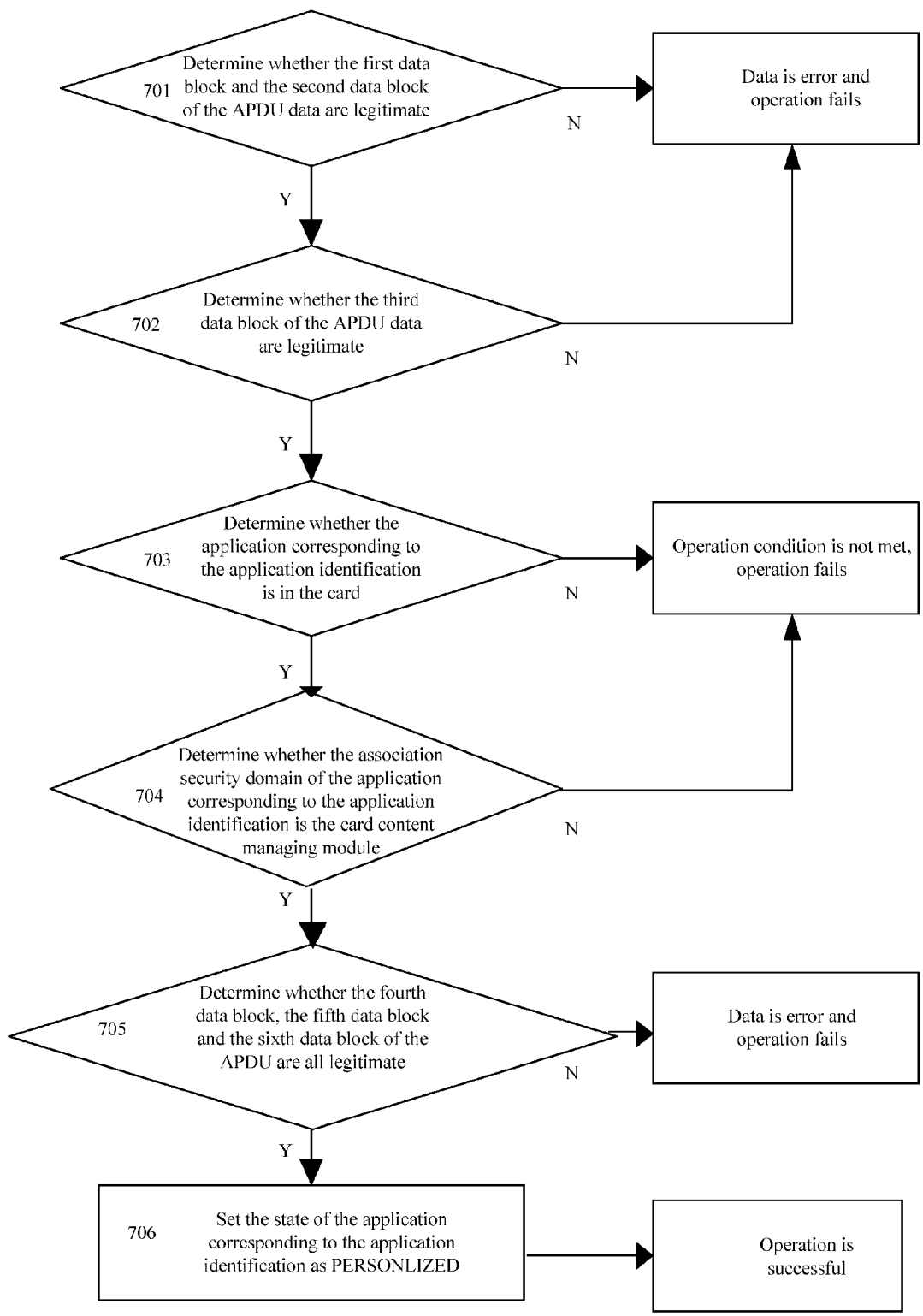
FIG. 7 is a flow chart of a specific method for personalizing an application according to Embodiment 7 of the present disclosure.

A specific method for personalizing an application in the method for managing applications on the card according to Embodiment 1 is provided according to Embodiment 7 of the present disclosure; the data domain part of the APDU data in the present embodiment can be considered to be made up of multiple data blocks; each data block is in a LV structure, i.e. a data length+a data; as shown in FIG. 7, the method includes Step 701 to Step 706.

In Step 701, it is determined whether both a first data block and a second data block of the APDU data are legitimate, Step 702 is executed if both the first data block and the second data block of the APDU data are legitimate; otherwise, data is error and the operation fails.

In Embodiment 7, the process of determining whether the first data block of the APDU data is legitimate includes: determining whether the first data block of the APDU data is 0x00, where the first data block of the APDU data is legitimate if the first data block of the APDU data is 0x00; otherwise, the first data block of the APDU data is illegitimate.

The process of determining whether the second data block of the APDU data is legitimate includes: determining whether the second data block of the APDU data is 0x00, where the second data block of the APDU data is legitimate if the second data block of the APDU data is 0x00; otherwise, the second data block of the APDU data is illegitimate.

In Step 702, it is determined whether the third data block of the APDU data is legitimate, Step 703 is executed if the third data block of the APDU data is legitimate; otherwise, data is error and the operation fails.

In Embodiment 7, the third data block specifically includes an application identification length+an application identification.

The process of determining whether the third data block of the APDU data is legitimate includes: determining whether the application identification length of the third data block of the APDU data is in a preset range, where the third data block of the APDU data is legitimate if the application identification length of the third data block of the APDU data is in the preset range; otherwise, the third data block of the APDU data is illegitimate.

The preset range is from 0x05 to 0x10.

In Step 703, it is checked whether an application corresponding to the application identification exists in the card, Step 704 is executed if the application corresponding to the application identification exists in the card; otherwise, the operation condition is not met and the operation fails.

In Step 704, it is determined whether the association security domain of the application corresponding to the application identification is the card content management module, Step 705 is executed if the association security domain of the application corresponding to the application identification is the card content management module; otherwise, the operation condition is not met and the operation fails.

In Step 705, it is determined whether all of the fourth data block, the fifth data block and the sixth data block of the APDU data are legitimate, Step 706 is executed if all of the fourth data block, the fifth data block and the sixth data block of the APDU data are legitimate; otherwise data is error and the operation fails.

In Embodiment 7, the process of determining whether the fourth data block of the APDU data is legitimate includes: determining whether the fourth data block of the APDU data is 0x00, where the fourth data block of the APDU data is legitimate if the fourth data block of the APDU data is 0x00; otherwise, the fourth data block of the APDU data is illegitimate.

The process of determining whether the fifth data block of the APDU data is legitimate includes: determining whether the fifth data block of the APDU data is 0x00, where the fifth data block of the APDU data is legitimate if the fifth data block of the APDU data is 0x00; otherwise, the fifth data block of the APDU data is illegitimate.

The process of determining whether the sixth data block of the APDU data is legitimate includes: determining whether the sixth data block of the APDU data is 0x00, where the fifth data block of the APDU data is legitimate if the sixth data block of the APDU data is 0x00; otherwise, the sixth data block of the APDU data is illegitimate.

In Step 706, a state of the application corresponding to the application identification is set to be PERSONLIZED, and the operation is successful.

Embodiment 8

Figure 8:
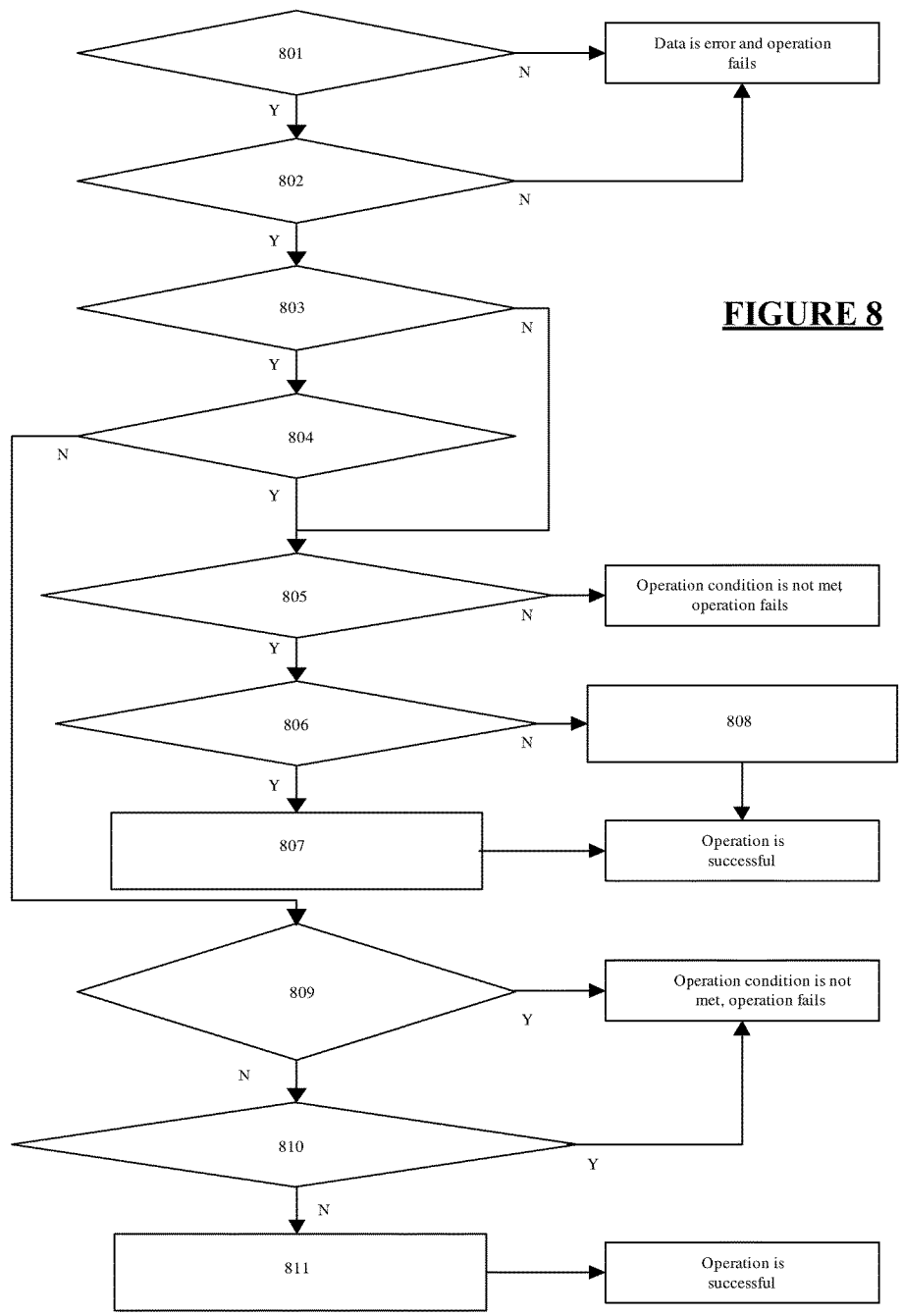
FIG. 8 is a flow chart of a specific method for deleting an application and an executable load file according to Embodiment 8 of the present disclosure.

A specific method for deleting an application and executable load file in the method for managing applications on the card according to Embodiment 1 is provided according to Embodiment 8 of the present disclosure. The data domain part of the APDU data in Embodiment 8 can be considered to be made up of multiple data blocks, each data block is in a LV structure, i.e. a data length+a data; as shown in FIG. 8, the method includes Step 801 to Step 811.

In Step 801, it is determined whether a first data block of the APDU data is legitimate, Step 802 is executed if the first data block of the APDU data is legitimate; otherwise, data is error and the operation fails.

In Embodiment 8, the process of determining whether the first data block of the APDU data is legitimate includes: determining whether the first data block of the APDU data is 0x4f, where the first data block of the APDU data is legitimate if the first data block of the APDU data is 0x4f; otherwise, the first data block of the APDU data is illegitimate.

In Step 802, it is determined whether a second data block of the APDU data is legitimate, Step 803 is executed if the second data block of the APDU data is legitimate; otherwise data is error and the operation fails.

In Embodiment 8, the second data block specifically includes a data domain identification length+a data domain identification.

The process of determining whether the second data block of the APDU data is legitimate includes: determining whether the data domain identification length of the second data block of the APDU data is in a preset range, where the second data block of the APDU data is legitimate if the data domain identification length of the second data block of the APDU data is in the preset range; otherwise, the second data block of the APDU data is illegitimate.

The preset range is from 0x05 to 0x10.

In Step 803, it is checked whether an application corresponding to the data domain identification exists in the card, Step 804 is executed if the application corresponding to the data domain identification exists in the card; otherwise, Step 805 is executed.

In Step 804, it is determined whether a fourth byte of the APDU data equals to a preset value, Step 805 is executed if the fourth byte of the APDU data equals to the preset value; otherwise, Step 809 is executed.

In Embodiment 8, the preset value is 0x80.

In Step 805, it is checked whether an executable load file corresponding to the data domain identification exists in the card, Step 806 is executed if the executable load file corresponding to the data domain identification exists in the card; otherwise, the operation condition is not met and the operation fails.

In Step 806, it is determined whether a fourth byte of the APDU data equals to a preset value, Step 807 is executed if the fourth byte of the APDU data equals to the preset value; otherwise, Step 808 is executed.

In Embodiment 8, the preset value is 0x80.

In Step 807, the application corresponding to the data domain identification and the executable load file corresponding to the data domain identification is deleted, and the operation is successful.

In Step 808, the executable load file corresponding to the data domain identification is deleted, and the operation is successful.

In Step 809, it is checked whether the application corresponding to the data domain identification is another application or an association security domain of another executable load file; the operation condition is not met and the operation fails if the application corresponding to the data domain identification is the another application or the association security domain of the another executable load file; otherwise, Step 810 is executed.

In Step 810, it is determined whether the application corresponding to the data domain identification is the card content management module, the operation condition is not met and the operation fails if the application corresponding to the data domain identification is the card content management module; otherwise, Step 811 is executed.

In Step 811, the application corresponding to the data domain identification is deleted and the operation is successful.

Embodiment 9

It should be noted that, the smart card is called "card" briefly in Embodiment 9.

Figure 9:
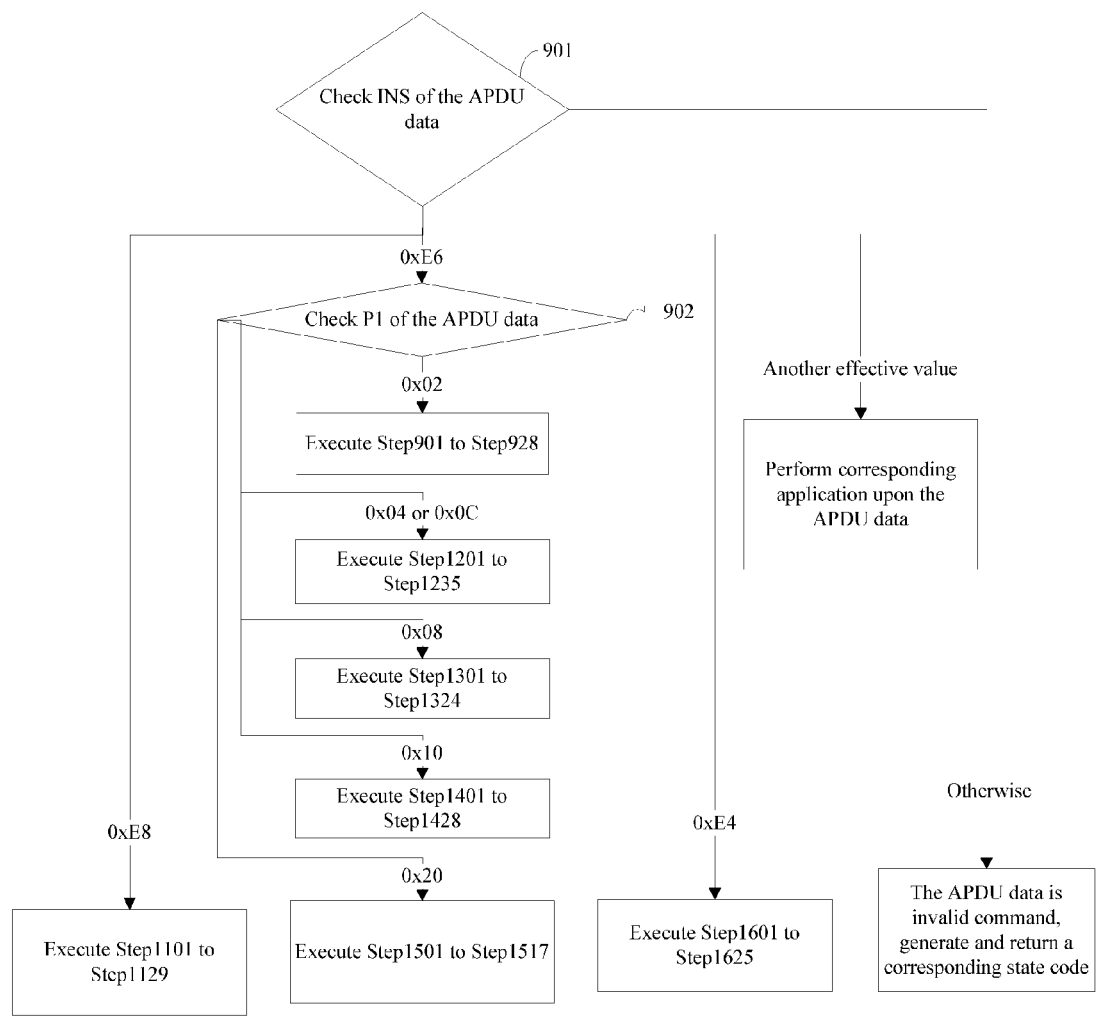
FIG. 9 is a flow chart of a method for implementing card data management according to the present disclosure.

A method for implementing card data management is provided according to Embodiment 9 of the present disclosure. As shown in FIG. 9, the method includes: executing the following Steps in a case that a first card data management module itself acts as the current first card data management module after APDU (Application Protocol Data Unit) data sent by a RE is received by the first card data management module.

In Step 901, INS (instruction code) of the APDU data is checked, Step 1101-Step 1129 are executed if the INS of the APDU data is 0xE8; Step 902 is executed if the INS of the APDU data is 0xE6; Step 1601 to Step 1625 are executed if the INS of the APDU data is 0xE4; if the INS of the APDU data is other effective value, the APDU data is another effective command of non-content management; a respective operation is performed based on the APDU data; otherwise, the APDU data is an ineffective command and a respective state code is generated and returned.

Specifically, the other effective value includes: 0xA4, 0x78, 0x7A, 0x82, 0x50, 0xE2, 0xFO, 0xD8, 0xF2 and 0xCA.

In Step 902, P1 (a first parameter) of the APDU data is checked, Step 1001 to Step 1028 are executed if P1 is 0x02; Step 1201 to Step 1125 are executed if P1 is 0x04 or 0x0C; Step 1301 to Step 1324 are executed if P1 is 0x08, Step 1401 to Step 1428 are executed if P1 is 0x10; Step 1501 to Step 1517 are executed if P1 is 0x20; otherwise, the APDU data is an ineffective command and a respective state code is generated and returned.

In the present disclosure, the first card data management module is a special application in the card, which is a proxy of an application provider on the card.

Figure 10:
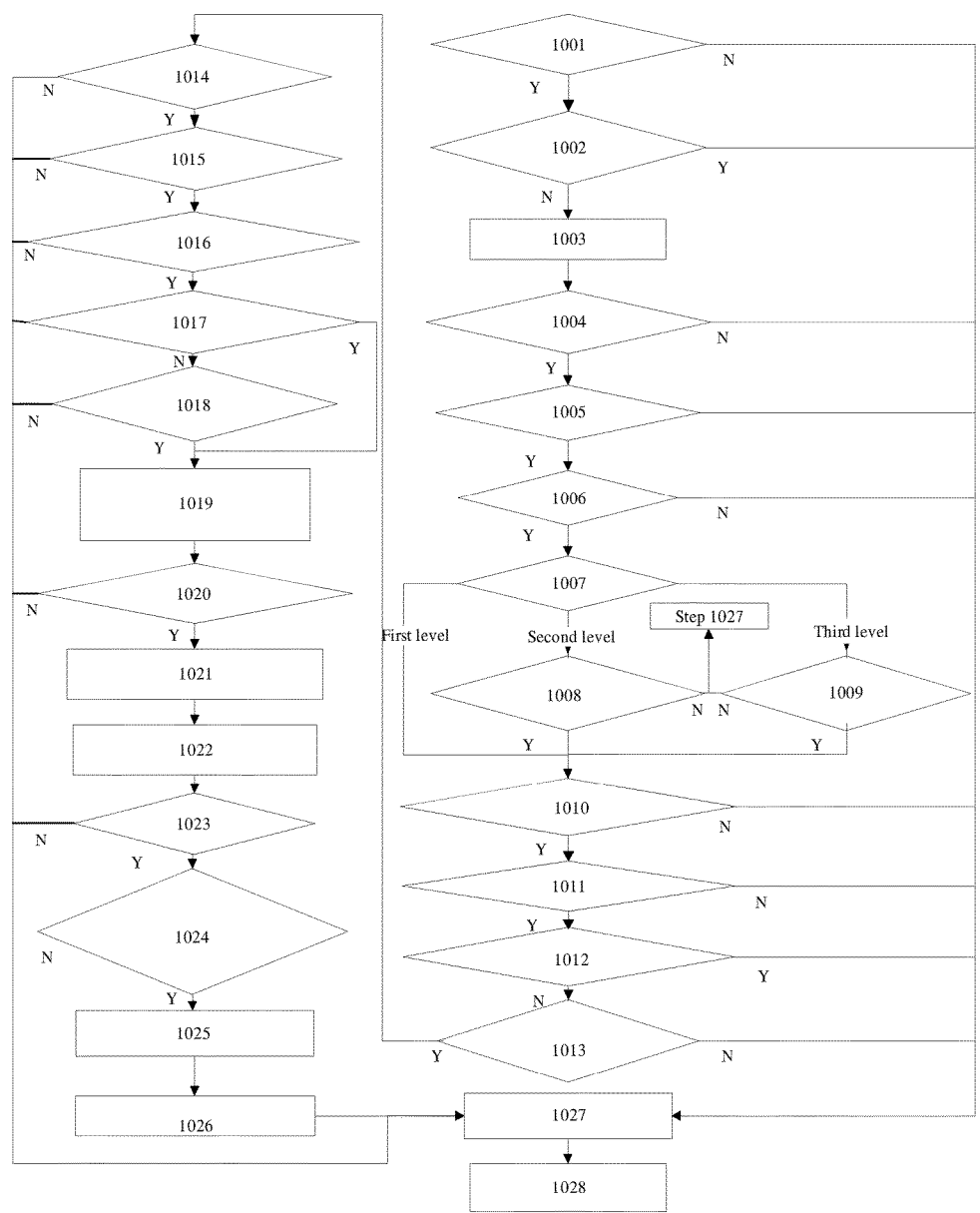
FIG. 10 is a specific flow chart of Step 1001 to Step 1028.

Preferably, as shown in FIG. 10, Step 1001 to Step 1028 are described as follows:

In Step 1001, it is determined whether the APDU data is a command head of a legitimate pre-load command, Step 1002 is executed if the APDU data is the command head of the legitimate pre-load command; otherwise, Step 1027 is executed.

Specifically, in a case that the CLA (instruction type) of the APDU data is 0x80 or 0x84, P2 (a second parameter) is 0x00 and Lc (data domain length) is no less than 0x0A, the APDU data is the command head of the legitimate pre-load command.

In Step 1002, it is determined whether the current state of the card is TERMINATED or CARD_LOCKED, Step 1027 is executed if the current state of the card is TERMINATED or CARD_LOCKED; otherwise, Step 1003 is executed.

Specifically, the state of the card is determined based on the state attribute of the card, the state attribute of the card is one byte data, which includes b8 b7 b6 b5 b4 b3 b2 b1 in an order from high bit to low bit, the state of the card includes OP_READY, INITIALIZED, SECURED, CARD_LOCKED and TERMINATED as shown in the following table:

| b8 | b7 | b6 | b5 | b4 | b3 | b2 | b1 | Meaning |
|----|----|----|----|----|----|----|----|---------|
| 0  | 0  | 0  | 0  | 0  | 0  | 0  | 1  | OP_READY |
| 0  | 0  | 0  | 0  | 0  | 1  | 1  | 1  | INITIALIZED |
| 0  | 0  | 0  | 0  | 1  | 1  | 1  | 1  | SECURED |
| 0  | 1  | 1  | 1  | 1  | 1  | 1  | 1  | CARD_LOCKED |
| 1  | 1  | 1  | 1  | 1  | 1  | 1  | 1  | TERMINATED |

Further, the position of Step 1001 and Step 1002 can be exchanged as follows: firstly, determining the current state of the card is TERMINATED or CARD_LOCKED, executing Step 1027 if the current state of the card is TERMINATED or CARD_LOCKED; otherwise, determining whether the APDU data is the command head of the legitimate pre-load command, executing Step 1003 if the APDU data is the command head of the legitimate pre-load command; otherwise, executing Step 1027.

In Step 1003, the data domain part of the pre-load command is received to obtain the complete pre-load command.

In Step 1004, it is determined whether the state of the current first card data management module is PERSONALIZED, Step 1005 is executed if the current first card data management module is PERSONALIZED; otherwise, Step 1027 is executed.

Specifically, the first card data management module determines the state of the current first card data management module based on the current state attribute of the first card data management module, the state attribute of the first card data management module is one byte data, which includes b8 b7 b6 b5 b4 b3 b2 b1 in an order from high bit to low bit, and the state of the first card data management module includes INSTALLED, SELECTABLE, PERSONALIZED and LOCKED, as shown in the following table:

| b8 | b7 | b6 | b5 | b4 | b3 | b2 | b1 | Meaning |
|----|----|----|----|----|----|----|----|---------|
| 0  | 0  | 0  | 0  | 0  | 0  | 1  | 1  | INSTALLED |
| 0  | 0  | 0  | 0  | 0  | 1  | 1  | 1  | SELECTABLE |
| 0  | 0  | 0  | 0  | 1  | 1  | 1  | 1  | PERSONALIZED |
| 1  | 0  | 0  | 0  | X  | X  | 1  | 1  | LOCKED |

In Step 1005, it is determined whether the current first data management module has a proxy right, Step 1006 is executed if the current first data management module has the proxy right; otherwise, Step 1027 is executed.

Specifically, the first card data management module determines whether the current first card data management module has the proxy right based on the right attribute of the current first card data management module, and the right attribute of the first card data management module is one byte data, which includes b8 b7 b6 b5 b4 b3 b2 b1 in an order from high bit to low bit. In a case that both of b8 and b6 are 1, the first card data management module has the proxy right, In Step 1006, it is determined whether the card meets a security condition, Step 1007 is executed if the card meets security condition; otherwise, Step 1027 is executed.

Specifically, the first card data management module determines whether the card meets the security condition by checking the security flag of the card; the card meets the security condition if the security flag is set; the card does not meet the security condition if the security identification is not set; in a case that a legitimate command in which the value of the INS byte is 0x50 and a legitimate command in which the value of the INS byte is 0x82 are executed correctly by the card, the security flag is set.

In Step 1007, the security level of the card is checked, Step 1010 is executed if the security level of the card is at a first level; Step 1008 is executed if the security level of the card is at a second level; or Step 1009 is executed if the security level of the card is at a third level.

Specifically, the security level of the card is determined based on the legitimate command which is that the value of the INS byte is 0x50 and a legitimate command which is that the value of the INS byte is 0x82 described above.

Specifically, if the security level of the card is at the first level, the pre-load command is message plain data; if the security level of the card is at the second level, the pre-load command is combination of message plain data and message authentication code (MAC); if the security level of the card is at the third level, the pre-load command is combination of message cipher data and message authentication code.

In Step 1008, it is determined whether the pre-load command is complete based on the message plain text and MAC in the pre-load command, Step 1010 is executed if the pre-load command is complete; otherwise, Step 1027 is executed.

In this case, the process of determining whether the pre-load command is complete based on the message plain text and MAC in the pre-load command includes: decrypting the MAC using a preset session key to obtain a decrypting result, and computing the message plain data according to a preset hash function to obtain a computing result at the same time; determining whether the decrypting result is identical to the computing result, where the pre-load command is complete if the decrypting result is identical to the computing result; otherwise, the pre-load command is not complete.

In Step 1009, it is determined whether the pre-load command is complete based on the message cipher data and MAC in the pre-load command, Step 1010 is executed if the pre-load command is complete; otherwise, Step 1027 is executed.

In this case, the process of determining whether the pre-load command is complete based on the message cipher data and MAC in the pre-load command includes: decrypting the message cipher data to obtain message plain data, decrypting MAC using the preset session key to obtain a decrypting result, and computing the message plain data according to the preset hash function to obtain a computing result at the same time; determining whether the decrypting result is identical to the computing result, where the pre-load command is complete if the decrypting result is identical to the computing result; otherwise, the pre-load command is not complete.

In Step 1010, it is determined whether the load file identification length in the pre-load command is in the preset range, Step 1011 is executed if the load file identification length in the pre-load command is in the preset range; otherwise, Step 1027 is executed.

Specifically, the preset range is from 0x05 to 0x10.

In Step 1011, it is determined whether the load file identification in the pre-load command is legitimate, Step 1012 is executed if the load file identification in the pre-load command is legitimate; otherwise, Step 1027 is executed.

Specifically, the load file identification is illegitimate if each byte of the load file identification is 0x00; otherwise, the load file identification is legitimate.

In Step 1012, it is checked whether a load file corresponding to the load file identification exists in the card, Step 1027 is executed if the load file corresponding to the load file identification exists in the card; otherwise, Step 1013 is executed.

In Step 1013, it is determined whether a security domain identification length in the pre-load command is in a preset range, Step 1014 is executed if the security domain identification length in the pre-load command is in the preset range; otherwise, Step 1027 is executed.

Specifically, the preset range is from 0x05 to 0x10.

In Step 1014, it is determined whether the security domain identification in the pre-load command is legitimate, Step 1015 is executed if the security domain identification in the pre-load command is legitimate; otherwise, Step 1027 is executed.

Specifically, the security domain identification is illegitimate if each byte of the security domain identification is 0x00; otherwise, the security domain identification is legitimate.

In Step 1015, it is checked whether an application corresponding to the security domain identification in the pre-load command exists in the card, Step 1016 is executed if the application corresponding to the security domain identification in the pre-load command exists in the card; otherwise, Step 1027 is executed.

In Step 1016, it is determined whether the application corresponding to the security domain identification in the pre-load command has a security domain right, Step 1017 is executed if the application corresponding to the security domain identification in the pre-load command has the security domain right; otherwise, Step 1027 is executed.

Specifically, it is determined whether the application corresponding to the security domain identification in the pre-load command has security domain right based on the right attribute of the application; the right attribute of the application is one byte data, which includes b8 b7 b6 b5 b4 b3 b2 b1 in an order from high bit to low bit; the application has a security domain right in a case that b8 is 1.

In Step 1017, it is determined whether the application corresponding to the security domain identification in the pre-load command is the current first card data management module, Step 1019 is executed if the application is the current first card data management module; otherwise, Step 1018 is executed.

In Step 1018, it is determined whether the state of the application corresponding to the security domain identification in the pre-load command is PERSONALIZED, Step 1019 is executed if the state is PERSONALIZED; otherwise, Step 1027 is executed.

In Step 1019, the association security domain of the load file corresponding to the load file identification in the pre-load command is set to be the application corresponding to the security domain identification in the pre-load command.

In Step 1020, it is determined whether the load file data block hash value length in the pre-load command is a preset value, Step 1021 is executed if the load file data block hash value length in the pre-load command is the preset value; otherwise, Step 1027 is executed.

Preferably, the preset value is 0x14 in Embodiment 9.

In Step 1021, the load file data block hash value length in the pre-load command is stored and a hash value authentication flag is set.

In Step 1022, a load parameter domain in the pre-load command is processed.

Specifically, the load parameter domain is TLV structure, which is made up of multiple data in format of tag+length+value; different operations are executed based on different tags, for which no more detail is given here.

In Step 1023, it is determined whether the load token length in the pre-load command is 0x80, Step 1024 is executed if the load token length in the pre-load command is 0x80; otherwise, STEP 1027 is executed.

In Step 1024, the data required for computing a load token is sent to a second card data management module, a computing result returned by the second card data management module is received, it is determined whether the computing result is identical to the load token in the pre-load command, Step 1025 is executed if the computing result is identical to the load token in the pre-load command; otherwise, Step 1027 is executed.

In this case, the second card data management module is a special application in the card.

Specifically, the P1, P2, effective data length, load file identification length, load file identification, security domain identification length, security domain identification, load file data block hash value length, load file data block hash value, load parameter domain length and load parameter domain in the pre-load command are sent to the second card data management module; the process that the card issuer authenticates and loads the token is not described in details herein.

In Step 1025, a load file structure is created newly and the global block number is initialized.

Specifically, the global block number is initialized to be 0; the process of newly creating a load file structure includes: creating an object of an executable load file structure in buffer, setting each attribute value of the object to be a default value, the attribute value of the object includes storage addresses of respective load file data block in the buffer and respective attributes of the executable load file; the attribute of the executable load file includes an association security domain identification of the executable load file, etc. which is not described in details herein.

In Step 1026, the returned data is set to be 0x00 and Step 1027 is executed.

In Step 1027, a respective state code is generated.

Specifically, the respective state code includes a state code of identification success and a state code of identification error; in this case, different error types corresponded to different state codes.

In Step 1028, the set returned data and/or generated state code is returned.

Figure 11:
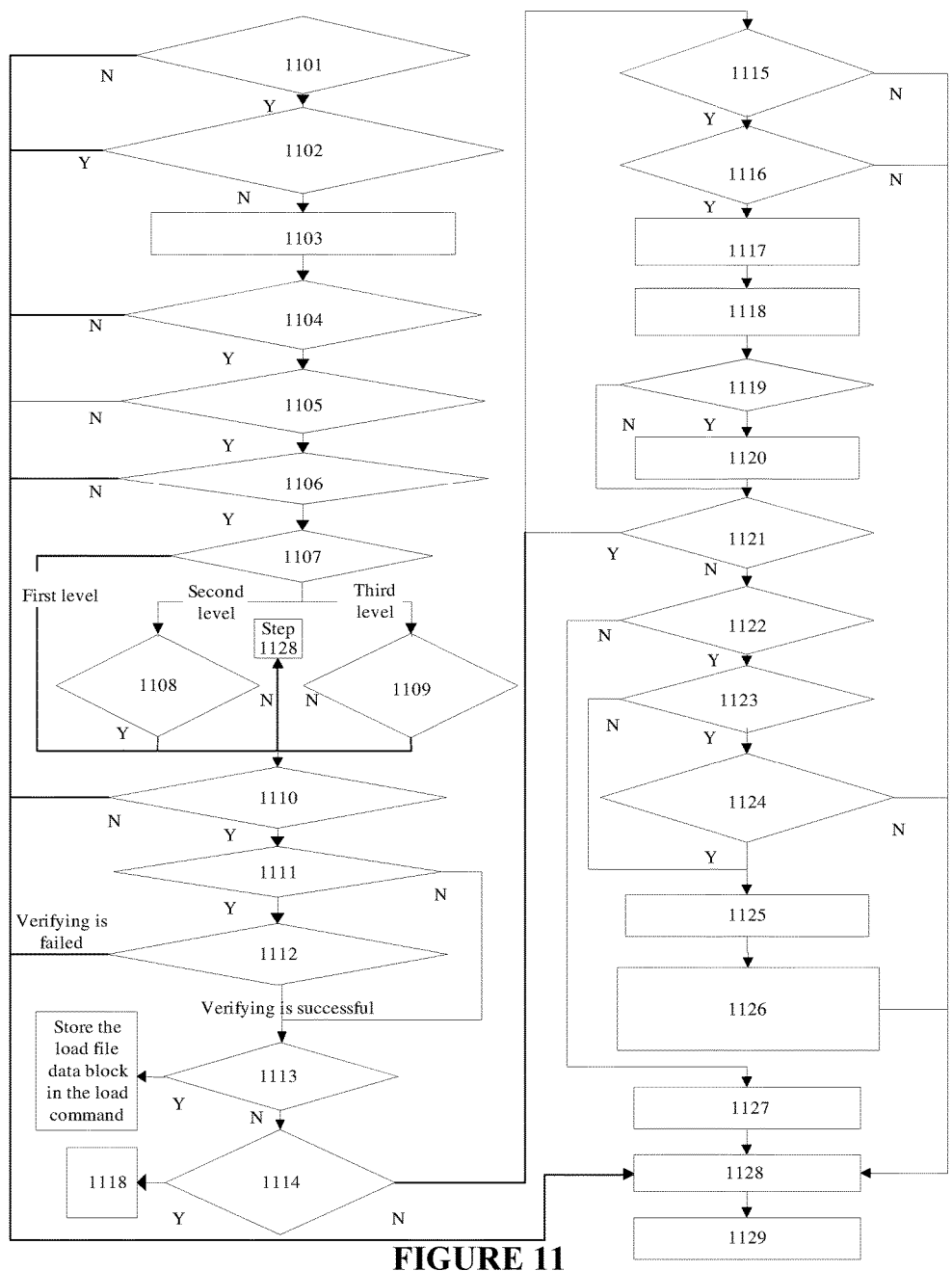
FIG. 11 is a specific flow chart of Step 1101 to Step 1129.

Preferably, as shown in FIG. 11, Step 1101 to Step 1129 are described as follows.

In Step 1101, it is determined whether the APDU data is a legitimate command head of the load command, Step 1102 is executed if APDU data is the legitimate command head of the load command; otherwise, Step 1128 is executed.

Specifically, in a case that the CLA of APDU data is 0x80 or 0x84, P1 is 0x00 or 0x80 and P2 is between 0x00-0xFF, the APDU data is legitimate.

In Step 1102, it is determined whether the current state of the card is TERMINATED or CARD_LOCKED, Step 1128 is executed if the current state of the card is TERMINATED or CARD_LOCKED; otherwise, Step 1103 is executed.

In Step 1103, the data domain part of the load command is received to obtain a complete load command.

In Step 1104, it is determined whether the state of the current first card data management module is PERSONALIZED, Step 1105 is executed if the state of the current first card data management module is PERSONALIZED; otherwise, Step 1128 is executed.

In Step 1105, it is determined whether the current first card data management module has a proxy right, Step 1106 is executed if the current first card data management module has the proxy right; otherwise, Step 1128 is executed.

In Step 1106, it is determined whether the card meets a security condition, Step 1107 is executed if the card meets security condition; otherwise, Step 1128 is executed.

In Step 1107, the security level of the card is checked, Step 1110 is executed if the security level is at the first level; Step 1108 is executed if the security level is at the second level; or Step 1109 is executed if the security level is at the third level.

Specifically, if the security level of the card is at the first level, the load command is message plain data; if the security level of the card is at the second level, the load command is combination of message plain data and message authentication code; if the security level of the card is at the third level, the load command is combination of message cipher data and message authentication code.

In Step 1108, it is determined whether the load command is complete based on the message plain data and MAC in the load command, Step 1110 is executed if the load command is complete; otherwise, Step 1128 is executed.

In this case, the process of determining whether the load command is complete based on the message plain data and MAC in the load command includes: decrypting the MAC by using a preset session key to obtain a decrypting result, and computing the message plain data according to a preset hash function to obtain a computing result at the same time; determining whether the decrypting result is identical to the computing result, where the load command is complete if the decrypting result is identical to the computing result; otherwise the load command is not complete.

In Step 1109, the is determined whether the load command is complete based on the message cipher data and MAC in the load command, Step 1110 is executed if the load command is complete; otherwise, Step 1128 is executed.

In this case, the process of determining whether the load command is complete based on the message cipher data and MAC in the load command includes: decrypting the MAC by using a preset session key to obtain a decrypting result, and computing the message plain data according to a preset hash function to obtain a computing result at the same time; determining whether the decrypting result is identical to the computing result, where the load command is complete if the decrypting result is identical to the computing result; otherwise, the load command is not complete.

In Step 1110, it is determined whether P2 in the load command equals to the global block number, Step 1111 is executed if P2 in the load command equals to the global block number; otherwise, Step 1128 is executed.

In Step 1111, it is determined whether the global block number is 0, Step 1112 is executed if the global block number is 0, otherwise, Step 1113 is executed.

In Step 1112, the DAP (Data Authentication Pattern) module information in the load command is verified, Step 1113 is executed if the verifying is successful; Step 1128 is executed if the verifying is unsuccessful.

Specifically, the load file is separated into multiple load file data blocks outside of the card; each load command contains a load file data block; P2 of command equals to the global block number; in a case that the global block number is 0, the load command further contains DAP block information; the DAP block information contains load file data block signature value; the first card data management module verifies the load file data block signature value of the DAP block information based on the application provider DAP computing key stored by the first card data management module.

In Step 1113, it is determined whether a hash value verification flag exists in the card, the load file data block in the load command is stored and Step 1114 is executed if the hash value verification flag exists in the card; otherwise, Step 1114 is executed directly;

In Step 1114, it is determined whether a stored component which is not submitted exists in the executable load file structure, Step 1118 is executed if the stored component which is not submitted exists in the executable load file structure; otherwise, Step 1115 is executed.

Specifically, the loaded load file data block is processed by taking a component as an unit to obtain the executable load file structure, the component includes: a Header component, a Directory component, an Applet component, an Import component, etc.

In Step 1115, it is checked whether the load command contains a component number and a component size, Step 1116 is executed if the load command contains the component number and the component size; otherwise, Step 1128 is executed.

In Step 1116, the component number is read, it is determined whether the component number is legitimate, Step 1117 is executed if the component number is legitimate; otherwise, Step 1128 is executed.

Specifically, except for the component number which is read at the first time, if the component number is successive with the component number read last time, the component number is legitimate; otherwise, the component number is illegitimate.

In Step 1117, a respective size of space is allocated based on the size of the component.

In Step 1118, the load file data block in the load command is started to be processed.

In Step 1119, it is determined whether the current component is processed completely, Step 320 is executed if the current component is processed completely; otherwise, Step 1121 is executed.

Specifically, the process of determining whether the current component is processed completely includes: determining whether the size of the processed data in the current component is identical to the size of the current component.

In Step 1120, the process result of the current component is submitted and Step 1121 is executed.

In Step 1121, it is determined whether unprocessed load file data block data exists, Step 1115 is executed if the unprocessed load file data block data exists; otherwise, Step 1122 is executed.

In Step 1122, self-increment is performed by the global block number, it is determined whether P1 of the load command is 0x80, Step 1123 is executed if P1 of the load command is 0x80; otherwise, Step 1127 is executed.

Specifically, the global number is increased by 1.

In Step 1123, it is determined whether a hash value verification flag exists in the card, Step 1124 is executed if the hash value verification flag exists in the card; otherwise, Step 1125 is executed.

In Step 1124, a hash operation is performed on the stored load file data block, it is determined whether an operation result equals to the load file data block hash value, Step 1125 is executed if the operation result equals to the load file data block hash value; otherwise, Step 1128 is executed.

In Step 1125, the executable load file structure is submitted.

In Step 1126, the data required for computing a receipt is sent to the second card data management module, the receipt returned by the second card data management module is received, the returned data is set as the receipt, and Step 1128 is executed.

Specifically, the length, load file identification, length of security domain identification, security domain identification in the load file identification corresponding to the load file data block in the load command are sent to the card provider module.

In Step 1127, the returned data is set to be 0x00 and Step 1128 is executed.

In Step 1128, a respective state code is generated.

Specifically, the respective state code includes a state code of identification success and a state code of identification error; in this case, different error types correspond to different state codes.

In Step 1129, the set returned data and/or generated state code is returned.

Figure 12:
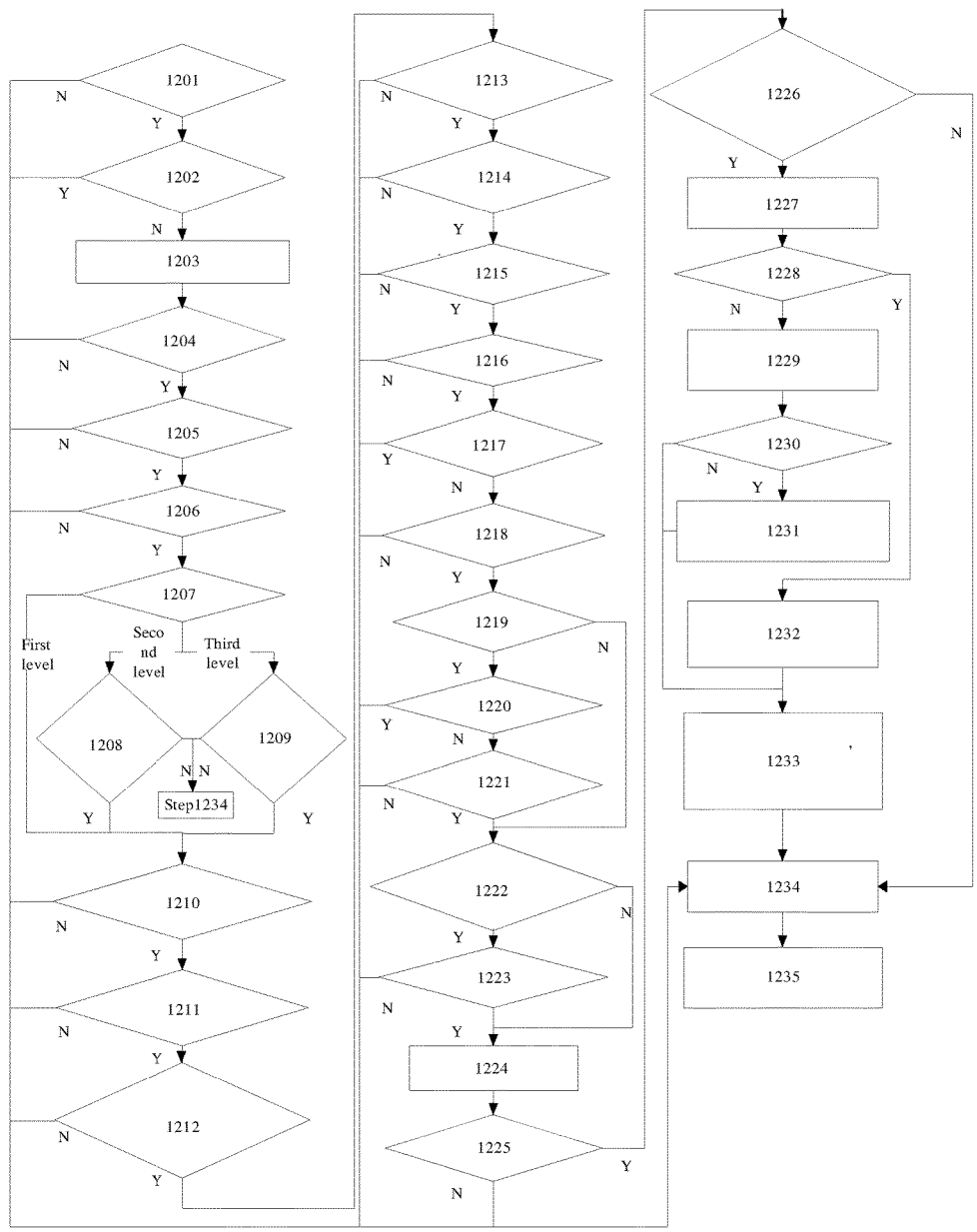
FIG. 12 is a specific flow chart of Step 1201 to Step 1235.

Specifically, referring to FIG. 12, Step 1201 to Step 1235 are described as follows.

In Step 1201, it is determined whether the APDU data is a legitimate command head of the install command, Step 1202 is executed if the APDU data is the legitimate command head of install command; otherwise, Step 1234 is executed.

Specifically, in a case that the CLA of the APDU data is 0x80 or 0x84, P2 is 0x00 and Lc is not less than 0x18, the APDU data is the legitimate command head of the install command.

In Step 1202, it is determined whether the current state of the card is TERMINATED or CARD_LOCKED, Step 1234 is executed if the current state of the card is TERMINATED or CARD_LOCKED; otherwise, Step 1203 is executed.

In Step 1203, the data domain part of the install command is received to obtain a complete install command.

In Step 1204, it is determined whether the state of the current first card data management module is PERSONALIED, Step 1205 is executed if the state of the current first card data management module is PERSONALIED; otherwise, Step 1234 is executed.

In Step 1205, it is determined whether the current first card data management module has a proxy right, Step 1206 is executed if the current first card data management module has the proxy right; otherwise, Step 1234 is executed.

In Step 1206, it is determined whether the card meets a security condition, Step 1207 is executed if the card meets the security condition; otherwise, Step 1234 is executed.

In Step 1207, the security level of the card is checked, Step 1210 is executed if the security level of the card is at the first level; Step 1208 is executed if the security level is at the second level; or Step 1209 is executed if the security level is at the third level;

Specifically, if the security level of the card is at the first level, the install command is message plain data; if the security level of the card is at the second level, the install command is combination of message plain data and message authentication code; if the security level of the card is at the third level, the install command is combination of message cipher data and message authentication code.

In Step 1208, it is determined whether the install command is complete based on the message plain data and MAC in the install command, Step 1210 is executed if the install command is complete; otherwise, Step 1234 is executed.

In this case, the process of determining whether the install command is complete based on the message plain data and MAC in the install command includes: decrypting the MAC by using a preset session key to obtain a decrypting result, and computing the message plain data according to a preset hash function to obtain a computing result at the same time; determining whether the decrypting result is identical to the computing result, where the load command is complete if the decrypting result is identical to the computing result; otherwise the load command is not complete.

In Step 1209, it is determined whether the install command is complete based on the message cipher data and MAC in the install command, Step 1210 is executed if the install command is complete; otherwise, Step 1234 is executed.

In this case, the process of determining whether the install command is complete based on the message cipher data and MAC in the install command includes: decrypting the message cipher data to obtain message plain data, decrypting the MAC by a preset session key to obtain a decrypting result, and computing the message plain data according to a preset hash function to obtain a computing result at the same time; determining whether the decrypting result is identical to the computing result, where the install command is complete if the decrypting result is identical to the computing result; otherwise, the install command is not complete.

In Step 1210, it is determined whether the executable load file identification length in the install command is in the preset range, Step 1211 is executed if the executable load file identification length in the install command is in the preset range; otherwise, Step 1234 is executed.

Specifically, the preset range is from 0x05 to 0x10.

In Step 1211, it is determined whether the executable load file corresponding to the executable load file identification in the install command exists in the card, Step 1212 is executed if the executable load file corresponding to the executable load file identification in the install command exists in the card; otherwise, Step 1234 is executed.

In Step 1212, it is determined whether the security domain associated with the executable load file corresponding to the executable load file identification in the install command is the current first card data management module, Step 1213 is executed if the security domain of the executable load file corresponding to the executable load file identification in the install command is the current first card data management module; otherwise, Step 1234 is executed.

In Step 1213, it is determined whether the executable module identification length in the install command is in a preset range, Step 1214 is executed if the executable module identification length in the install command is in the preset range, otherwise, Step 1234 is executed.

Specifically, the preset range is from 0x05 to 0x10.

In Step 1214, it is determined whether an executable module corresponding to the executable module identification in the install command exists in the card, Step 1215 is executed if the executable module corresponding to the executable module identification in the install command exists in the card; otherwise, Step 1234 is executed In Step 1215, it is determined whether the application identification length in the install command is in a preset range, Step 1216 is executed if the application identification length in the install command is in the preset range; otherwise, Step 1234 is executed Specifically, the preset range is from 0x05 to 0x10.

In Step 1216, it is determined whether the application identification in the install command is legitimate, Step 1217 is executed if the application identification in the install command is legitimate; otherwise, Step 1234 is executed.

Specifically, when each byte of the application identification is 0x00, the application identification is not legitimate; otherwise, the application identification is legitimate;

In Step 1217, it is determined whether the application corresponding to the application identification in the install command exists in the card, Step 1234 is executed if the application corresponding to the application identification in the install command exists in the card; otherwise, Step 1218 is executed.

In Step 1218, it is determined whether the application right length in the install command is 0x01, Step 1219 is executed if the application right length in the install command is 0x01; otherwise, Step 1234 is executed.

In Step 1219, it is determined whether the application right in the install command is 0x04, Step 1220 is executed if the application right in the install command is 0x04, otherwise, Step 1222 is executed.

In Step 1220, it is determined whether P1 of the install command is 0x04, Step 1234 is executed if P1 of the install command is 0x04; otherwise, Step 1221 is executed.

In Step 1221, it is determined whether the second card data management module has a default selection right, Step 1222 is executed if the second card data management module has the default selection right; otherwise, Step 1234 is executed.

Specifically, it is determined whether the second card data management module has the default selection right based on the right attribute of the second card data module management module; the right attribute of the second card data management module is one byte data, which includes b8 b7 b6 b5 b4 b3 b2 b1 in an order from high bit to low bit; in a case that b3 is 1, the second card data management module has the default selection right.

In Step 1222, it is determined whether all of the first bit, the sixth bit and the seventh bit from the low bit of the application right of the install command are 0, Step 1223 is executed if all of the first bit, the sixth bit and the seventh bit from the low bit of the application right of the install command are 0; otherwise, Step 1224 is executed.

In Step 1223, it is determined whether the most significant bit of the application right of the install command is 1, Step 1224 is executed if the most significant bit of the application right of the install command is 1; otherwise, Step 1234 is executed.

In Step 1224, the install parameter domain in the install command is processed

In Step 1225, it is determined whether the install token length in the install command is 0x80; Step 1226 is executed if the install token length in the install command is 0x80; otherwise, Step 1234 is executed.

In Step 1226, the data required for computing installing token is sent to the second card data management module, the computing result returned by the second card data management module is received, it is determined whether the computing result is identical to the installing token in the install command, Step 1227 is executed if the computing result is identical to the installing token in the install command; otherwise, Step 1234 is executed.

Specifically, the P1, P2, effective data length, executable load file identification length, executable load file identification, executable module identification length, executable module identification, application identification length, application identification, application right length, application right, install parameter domain length and install parameter domain in the install command are sent to the second card data management module.

In Step 1227, an application is registered based on the data in the data domain of the install command.

In Step 1228, it is determined whether P1 in the install command is 0x04; Step 1232 is executed if P1 in the install command is 0x04; otherwise, Step 1229 is executed.

In Step 1229, the state of the application corresponding to the application identification in the install command is set to be SELECTABLE.

Specifically, Step 1229 includes setting the value of the state attribute of the application corresponding to the application identification in the install command to be 0x07.

In Step 1230, it is determined whether the application right in the install command is 0x04, Step 1231 is executed if the application right in the install command is 0x04; otherwise, Step 1233 is executed.

In Step 1231, the application corresponding to the application identification in the install command is set to be a default application, and Step 1233 is executed.

In Step 1232, the state of the application corresponding to the application identification in the install command is set to be INSTALLED, and Step 1233 is executed.

Specifically, Step 1232 includes setting the value of the state attribute of the application corresponding to the application identification in the obtained command to be 0x03.

In Step 1233, the data required for computing receipt is sent to the second card data management module, the receipt returned by the second card data management module is received, the returned data is set as the receipt, and Step 1234 is executed.

Specifically, the executable load file identification length, the executable load file identification, the application identification length and the application identification in the install command are sent to the second card data management module.

In Step 1234, a respective state code is generated.

Specifically, the respective state code includes a state code of identification success and a state code of identification error; different types of error correspond to different state codes.

In Step 1235, the set returned data and/or generated state code is returned.

Figure 13:
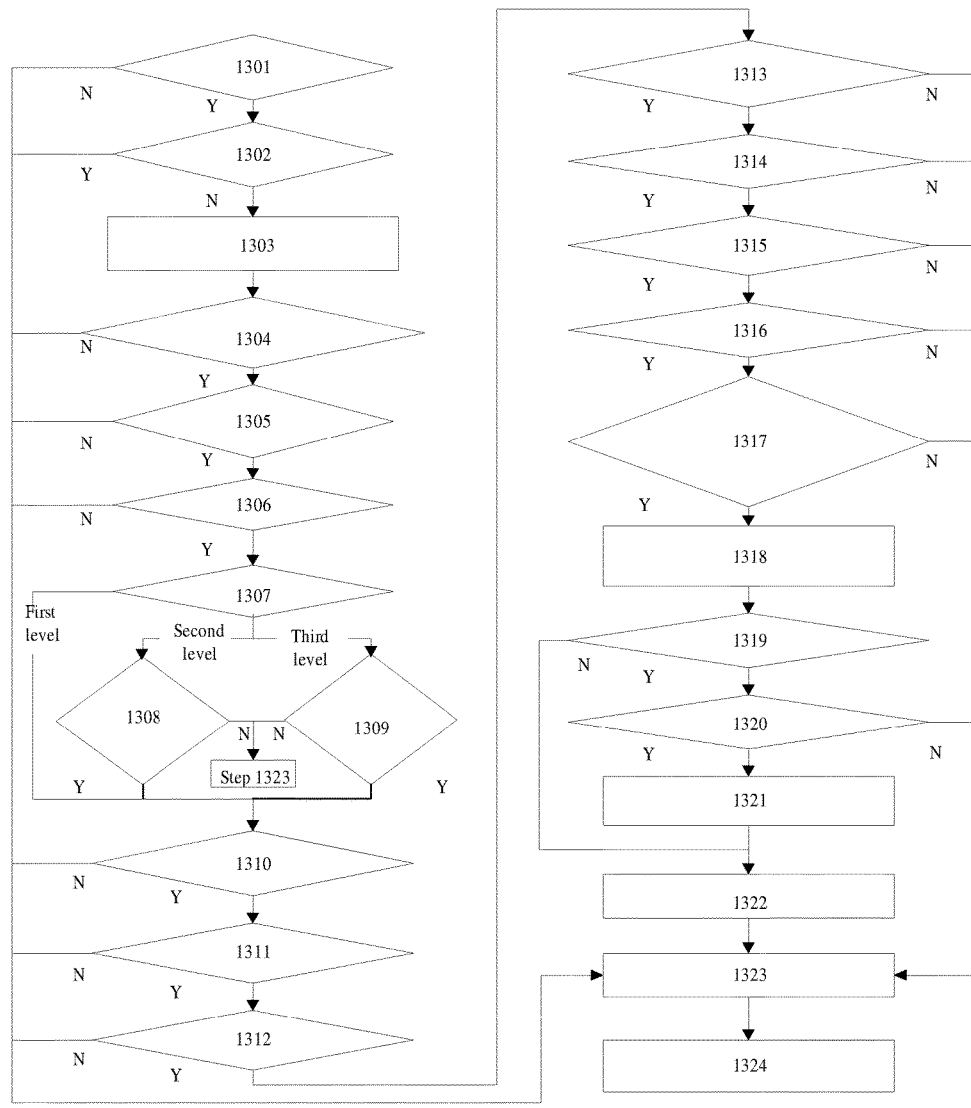
FIG. 13 is a specific flow chart of Step 1301 to Step 1324.
Figure 14:
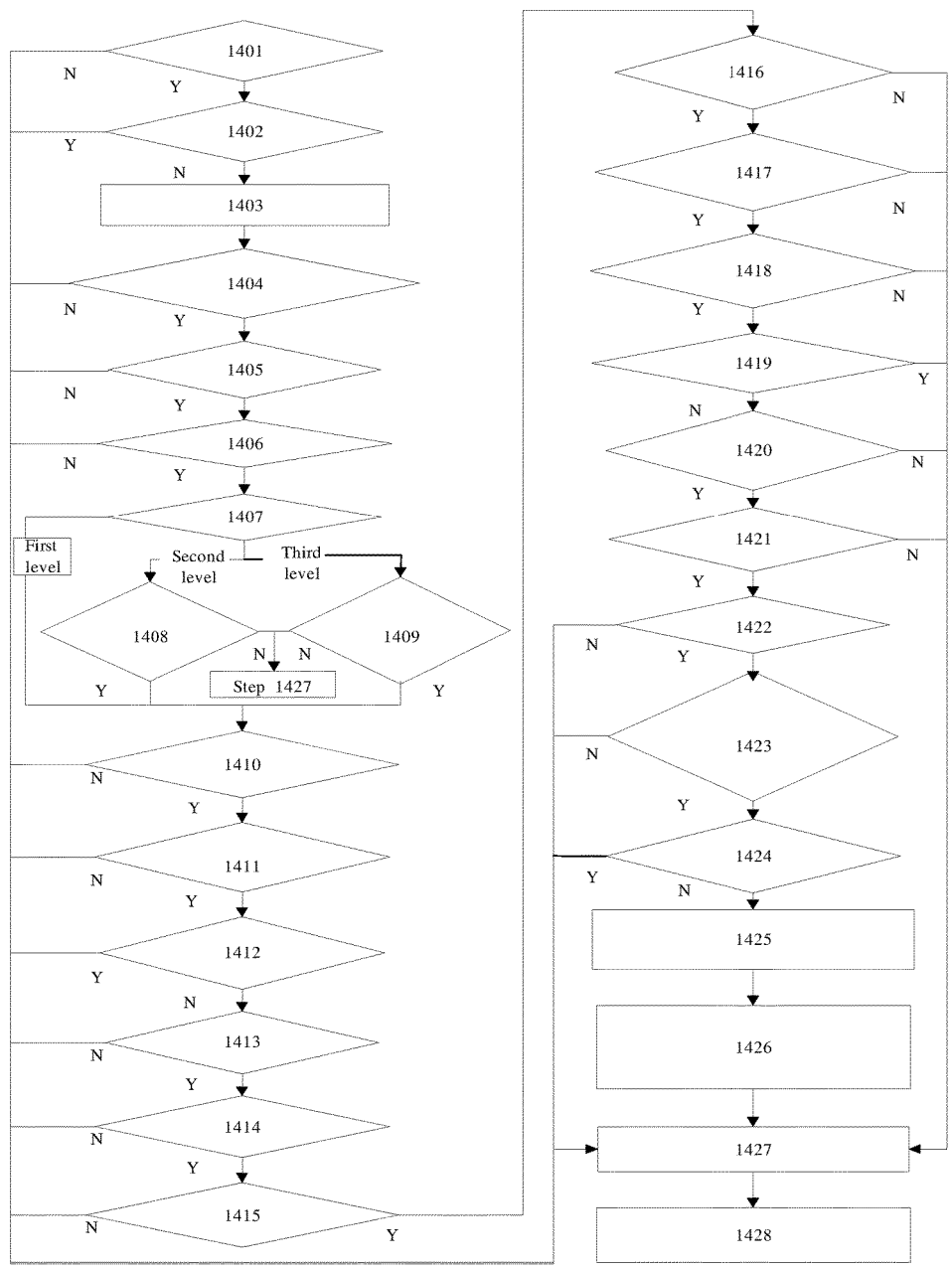
FIG. 14 is a specific flow chart of Step 1401 to Step 1428.

Preferably, as shown in FIG. 13, Step 1301 to Step 1324 are described as follows.

In Step 1301, it is determined whether the APDU data is a legitimate command head of the selectable command, Step 1302 is executed if the APDU data is the legitimate command head of the selectable command; otherwise, Step 1323 is executed.

Specifically, in a case that the CLA of the APDU data is 0x80 or 0x84, P2 is 0x00 and Lc is no less than 0x0C, the APDU data is the legitimate command head of the selectable command.

In Step 1302, it is determined whether the current state of the card is TERMANATED or CARD_LOCKED, Step 1323 is executed if the current state of the card is TERMANATED or CARD_LOCKED; otherwise, Step 1303 is executed.

In Step 1303, a data domain part of the selectable command is received to obtain a complete selectable command.

In Step 1304, it is determined whether the current first card data management module is PERSONALIZED, Step 1305 is executed if the current first card data management module is PERSONALIZED; otherwise, Step 1323 is executed.

In Step 1305, it is determined whether the current first card data management module has a proxy right, Step 1306 is executed if the current first card data management module has the proxy right; otherwise, Step 1323 is executed.

In Step 1306, it is determined whether the card meets a security condition, Step 1307 is executed if the card meets the security condition; otherwise, Step 1323 is executed.

In Step 1307, the security level of the card is checked, Step 1310 is executed if the security level is at the first level; Step 1308 is executed if the security level is at the second level; or Step 1309 is executed if the security level is at the third level.

Specifically, if the security level of the card is at the first level, the selectable command is message plain data; if the security level of the card is at the second level, the selectable command is combination of message plain data and message authentication code; if the security level of the card is at the third level, the selectable command is combination of message cipher data and message authentication code.

In Step 1308, it is determined whether the selectable command is complete based on the message plain data and MAC in the selectable command, Step 1310 is executed if the selectable command is complete; otherwise, Step 1323 is executed.

The process of determining whether the selectable command is complete based on the message plain data and MAC in the selectable command includes: decrypting the MAC by using a preset session key to obtain a decrypting result, computing the message plain data to obtain a computing result by using a preset hash function at the same time and determining whether the decrypting result is identical to the computing result, where the selectable command is complete if the decrypting result is identical to the computing result; otherwise, the selectable command is not complete.

In Step 1309, it is determined whether the selectable command is complete based on the message cipher data and MAC in the selectable command, Step 1310 is executed if the selectable command is complete; otherwise, Step 1323 is executed.

The process of determining whether the selectable command is complete based on the message cipher data and MAC in the selectable command includes: decrypting the message cipher data to obtain message plain data, decrypting the MAC by using a preset session key to obtain a decrypting result, computing the message plain data to obtain a computing result by using a preset hash function at the same time and determining whether the decrypting result is identical to the computing result, where the selectable command is complete if the decrypting result is identical to the computing result; otherwise, the selectable command is not complete.

In Step 1310, it is determined whether the first two byte data in the data domain of the selectable command are 0, Step 1311 is executed if both the first two byte data are 0x00; otherwise, Step 1323 is executed.

In Step 1311, it is determined whether the application identification length in the selectable command is in a preset range, Step 1312 is executed if the application identification length in the selectable command is in the preset range; otherwise, Step 1323 is executed.

Specifically, the preset range is from 0x05 to 0x10.

In Step 1312, it is determined whether an application corresponding to the application identification in the selectable command exists in the card, Step 1313 is executed if the application corresponding to the application identification in the selectable command exists in the card; otherwise, Step 1323 is executed.

In Step 1313, it is determined whether the state of the application corresponding to the application identification in the selectable command is INSTALLED, Step 1314 is executed if the state of the application corresponding to the application identification in the selectable command is INSTALLED; otherwise, Step 1323 is executed.

In Step 1314, it is determined whether the application right length in the selectable command is 0x00, Step 1315 is executed if the application right length in the selectable command is 0x00; otherwise, Step 1323 is executed.

In Step 1315, it is determined whether the byte data behind the application right in the selectable command is 0x00, Step 1316 is executed if the byte data behind the application right in the selectable command is 0x00; otherwise, Step 1323 is executed.

In Step 1316, it is determined whether the install token length in the selectable command is 0x80, Step 1317 is executed if the install token length in the selectable command is 0x80; otherwise, Step 1323 is executed.

In Step 1317, the data required for computing the install token is sent to the second card data management module, the computing result returned by the second card data management module is received, it is determined whether the computing result is identical to the install token in the selectable command, Step 1318 is executed if the computing result is identical to the install token in the selectable command; otherwise, Step 1323 is executed.

Specifically, the P1, P2, effective data length, executable load file identification length, 0x00, 0x00, application identification length, application identification, application right length, application right and 0x00 in the selectable command are sent to the second card data management module.

In Step 1318, the state of the application corresponding to the application identification in the selectable command is set to be SELECTABLE.

Specifically, Step 1318 includes setting the value of the state attribute of the application corresponding to the application identification in the selectable command to be 0x07.

In Step 1319, it is determined whether P1 in the selectable command is 0x04, Step 1320 is executed if P1 is 0x04; otherwise, Step 1322 is executed.

In Step 1320, it is determined whether the second card data management module has a default selection right, Step 1321 is executed if the second card data management module has the default selection right; otherwise, Step 1323 is executed.

In Step 1321, the application corresponding to the application identification in the selectable command is set to be a default application and Step 1322 is executed.

In Step 1322, the returned data is set to be 0x00 and Step 1323 is executed.

In Step 1323, a respective state code is generated.

Specifically, the respective state code includes a state code of identification success and a state code of identification error; in this case, different error types correspond to different state codes.

In Step 1324, the set returned data and/or generated state code is returned.

Preferably, as shown in FIG. 4, Step 1401 to Step 1428 are described as follows.

In Step 1401, it is determined whether the APDU data is a legitimate command head of the extradition command, Step 1402 is executed if the APDU data is the legitimate command head of extradition command; otherwise, Step 1427 is executed.

Specifically, in a case that a CLA of the APDU data is 0x80 or 0x84, P2 is 0x00 and Lc is no less than 0x10, the APDU data is the legitimate command head of the extradition command.

In Step 1402, it is determined whether the current state of the card is TERMANATED or CARD_LOCKED, Step 1427 is executed if the current state of the card is TERMANATED or CARD_LOCKED; otherwise, Step 1403 is executed.

In Step 1403, the data domain part of the extradition command is received to obtain a complete extradition command.

In Step 1404, it is determined whether the state of the current first card data management module is PERSONALIZED, Step 1405 is executed if the state of the current first card data management module is PERSONALIZED; otherwise, Step 1427 is executed.

In Step 1405, it is determined whether the current first card data management module has a proxy right, Step 1406 is executed if the current first card data management module has the proxy right; otherwise, Step 1427 is executed.

In Step 1406, it is determined whether the card meets a security condition, Step 1407 is executed if the card meets the security condition; otherwise, Step 1427 is executed.

In Step 1407, the security level of the card is checked, Step 1410 is executed if the security level is at the first level; Step 1408 is executed if the security level is at the second level; or Step 1409 is executed if the security level is at the third level.

Specifically, if the security level of the card is at the first level, the extradition command is message plain data; if the security level of the card is at the second level, the extradition command is combination of message plain data and message authentication code; if the security level of the card is at the third level, the extradition command is combination of message cipher data and message authentication code.

In Step 1408, it is determined whether the extradition command is complete based on the message plain data and MAC in the extradition command, Step 1410 is executed if the extradition command is complete; otherwise, Step 1427 is executed.

The process of determining whether the extradition command is complete based on the message plain data and MAC in the extradition command includes: decrypting the MAC by using a preset session key to obtain a decrypting result, and computing the message plain data according to a preset hash function to obtain a computing result at the same time; determining whether the decrypting result is identical to the computing result, where the extradition command is complete if the decrypting result is identical to the computing result; otherwise the extradition command is not complete.

In Step 1409, it is determined whether the extradition command is complete based on the message cipher data and MAC in the extradition command; Step 1410 is executed if the extradition command is complete; otherwise, Step 1427 is executed.

In this case, the process of determining whether the extradition command is complete based on the message cipher data and MAC in the selectable command includes: decrypting the message cipher data to obtain message plain data, decrypting the MAC by using a preset session key to obtain a decrypting result, computing the message plain data to obtain a computing result by using a preset hash function at the same time and determining whether the decrypting result is identical to the computing result, where the extradition command is complete if the decrypting result is identical to the computing result; otherwise, the extradition command is not complete.

In Step 1410, it is determined whether the security domain identification length in the extradition command is in a preset range, Step 1411 is executed if the security domain identification length in the extradition command is in the preset range, otherwise, Step 1427 is executed.

Specifically, the preset range is from 0x05 to 0x10.

In Step 1411, it is determined whether the application corresponding to the security domain identification in the extradition command exists in the card, Step 1412 is executed if the application corresponding to the security domain identification in the extradition command exists in the card; otherwise, Step 1427 is executed.

In Step 1412, it is determined the application corresponding to the security domain identification in the extradition command is current card provider module, Step 1427 is executed if the application corresponding to the security domain identification in the extradition command is current card provider module; otherwise, Step 1413 is executed.

In Step 1413, it is determined whether one byte data behind the security domain identification in the extradition command is 0x00, Step 1414 is executed if the one byte data behind the security domain identification in the extradition command is 0x00; otherwise, Step 1427 is executed.

In Step 1414, it is determined whether the state of the application corresponding to the security domain identification in the extradition command is INSTALLED; Step 1415 is executed if the state of the application corresponding to the security domain identification in the extradition command is INSTALLED; otherwise, Step 1427 is executed.

In Step 1415, it is determined whether the application identification length in the extradition command is in a preset range, Step 1416 is executed if the application identification length in the extradition command is in the preset range, otherwise, Step 1427 is executed.

Specifically, the preset range is from 0x05 to 0x10.

In Step 1416, it is determined whether the application corresponding to the application identification in the extradition command exists in the card, Step 1417 is executed if the application corresponding to the application identification in the extradition command exists in the card; otherwise, Step 1427 is executed.

In Step 1417, it is determined whether the security domain associated with the application corresponding to the application identification in the extradition command is the current first card data management module, Step 1418 is executed if the security domain is the current card data management module; otherwise, Step 1427 is executed.

In Step 1418, it is determined whether the application corresponding to the security domain identification in the extradition command has a security domain right, Step 1419 is executed if the application corresponding to the security domain identification in the extradition command has the security domain right; otherwise, Step 1427 is executed.

In Step 1419, it is determined whether the state of the application corresponding to the security domain identification in the extradition command is LOCKED, Step 1427 is executed if the state of the application is LOCKED; otherwise, Step 1420 is executed.

In Step 1420, it is determined whether the state of the application corresponding to the security domain identification in the extradition command is PERSONALIZED, Step 1421 is executed if the state of the application is PERSONALIZED; otherwise, Step 1427 is executed.

In Step 1421, it is determined whether two byte data behind the application identification in the extradition command are 0x00, Step 1422 is executed if two byte data behind the application identification in the extradition command are 0x00; otherwise, Step 1427 is executed.

In Step 1422, it is determined whether the extradition token length in the extradition command is 0x80, Step 1423 is executed if the extradition token length in the extradition command is 0x80; otherwise, Step 1427 is executed.

In Step 1423, the data required for computing an extradition token is sent to the second card data management module, a computing result returned by the second card data management module is received, it is determined whether the computing result is identical to the extradition token in the extradition command, Step 1424 is executed if the computing result is identical to the extradition token in the extradition command; otherwise, Step 1427 is executed.

Specifically, the P1, P2, effective data length, effective data length, security domain identification length, security domain identification, 0x00, application identification length, 0x00 and 0x00 in the extradition command are sent to the second card data management module.

In Step 1424, it is determined whether the application corresponding to the application identification in the extradition command has a security domain right, Step 1427 is executed if the application corresponding to the application identification in the extradition command has the security domain right; otherwise, Step 1425 is executed.

In Step 1425, the security domain associated with the application corresponding to the application identification in the extradition command is modified to be the application corresponding to the security domain identification in the extradition command.

In Step 1426, the data required for computing a receipt is sent to the second card data management module, the receipt returned by the second card data management module is received, the returned data is set as the receipt and Step 1427 is executed.

Specifically, the application identification length, application identification, original security domain identification length, new security domain length and new security domain identification of the current extradition application are sent to the second card data management module; the original security domain identification is a security domain identification of the security domain associated with the current extradition application before the extradition; and the new security domain identification is a security domain identification of the security domain to-be associated with the current extradition application after the extradition.

In Step 1427, a respective state code is generated.

Specifically, the respective state code includes a state code of identification success and a state code of identification error; different error types correspond to different state codes.

In Step 1428, the set returned data and/or generated state code is returned.

Figure 15:
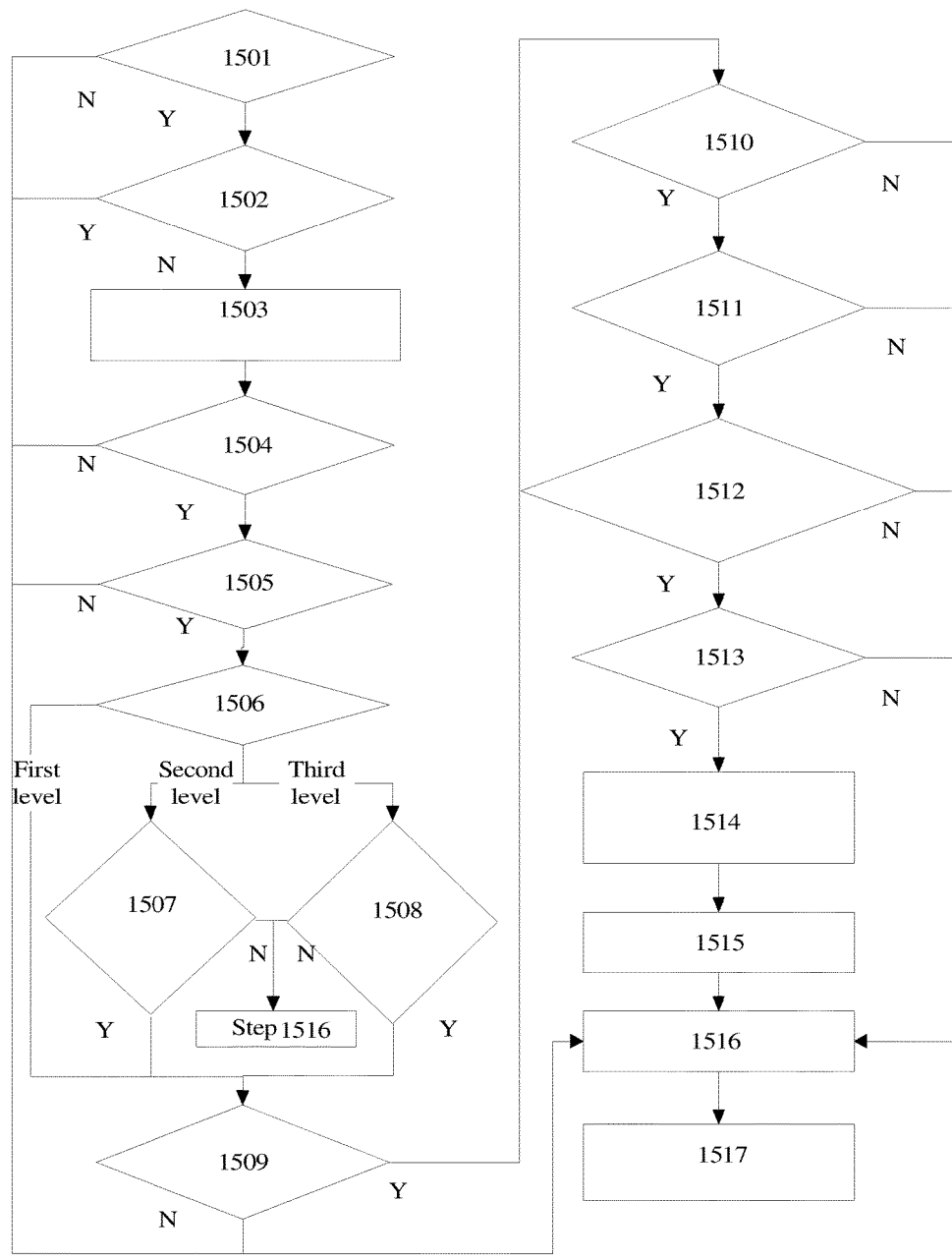
FIG. 15 is a specific flow chart of Step 1501 to Step 1517.

Preferably, shown in FIG. 15, Step 1501 to Step 1517 are described as follows:

In Step 1501, it is determined whether the APDU data is a legitimate command head of the personalized command, Step 1502 is executed if the APDU data is the legitimate command head of the personalized command; otherwise, Step 1516 is executed.

Specifically, in a case that the CLA of the APDU data is 0x80 or 0x84, P2 is 0x00 and Lc is no less than 0x0B, the APDU data is the legitimate command head of personalized command.

In Step 1502, it is determined whether the current state is TERMANATED or CARD_LOCKED, Step 1516 is executed if the current state is TERMANATED or CARD_LOCKED; otherwise, Step 1503 is executed.

In Step 1503, a data domain part of the personalized command is received to obtain a complete personalized command.

In Step 1504, it is determined whether the state of the current first card data management module is PERSONALIZED, Step 1505 is executed if the state of the current first card data management module is PERSONALIZED; otherwise, Step 1516 is executed.

In Step 1505, it is determined whether the card meets a security condition, Step 1506 is executed if the card meets the security condition; otherwise, Step 1516 is executed.

In Step 1506, the security level of the card is checked, if the security level is at the first level, Step 1509 is executed; Step 1507 is executed if the security level is at the second level; or Step 1508 is executed if the security level is at the third level.

Specifically, if the security level of the card is at the first level, the personalized command is message plain data; if the security level of the card is at the second level, the personalized command is combination of message plain data and message authentication code; if the security level of the card is at the third level, the personalized command is combination of message cipher data and message authentication code.

In Step 1507, it is determined whether the personalized command is complete based on the message plain data and MAC in the personalized command, Step 1509 is executed if the personalized command is complete; otherwise, Step 1516 is executed.

The process of determining whether the personalized command is complete based on the message plain data and MAC includes: decrypting MAC by using preset session key to obtain a decrypting result, computing the message plain data according to a preset hash function to obtain a computing result, determining whether the decrypting result is identical to the computing result, where the personalized command is complete if the decrypting result is identical to the computing result; otherwise the personalized command is not complete.

In Step 1508, it is determined whether the personalized command is complete based on the message cipher data and MAC in the personalized command, Step 1509 is executed if the personalized command is complete; otherwise, Step 1516 is executed.

The process of determining whether the personalized command is complete based on the message cipher data and MAC in the personalized command includes: decrypting the message cipher data to obtain message plain data, decrypting MAC by using the preset session key to obtain a decrypting result, computing the message plain data according to the preset hash function to obtain a computing result, determining whether the decrypting result is identical to the computing result, where the personalized command is complete if the decrypting result is identical to the computing result; otherwise the personalized command is not complete.

In Step 1509, it is determined whether the first two byte data front the data domain in the personalized command are 0x00, Step 1510 is executed if the first two byte data front the data domain in the personalized command are 0x00; otherwise, Step 1516 is executed.

In Step 1510, it is determined whether the application identification length in the personalized command is in a preset range, Step 1511 is executed if the application identification length in the personalized command is in the preset range, otherwise, Step 1516 is executed.

Specifically, the preset range is from 0x05 to 0x10.

In Step 1511, it is determined whether an application corresponding to the application identification exists in the personalized command, Step 1512 is executed if the application corresponding to the application identification exists in the personalized command; otherwise, Step 1516 is executed.

In Step 1512, it is determined whether the security domain associated with the application corresponding to the application identification in the personalized command is the current first card data management module, Step 1513 is executed if the security domain associated with the application corresponding to the application identification in the personalized command is the current first card data management module, otherwise, Step 1516 is executed.

In Step 1513, it is determined whether all of the last three byte data in the personalized command are 0x00; Step 1514 is executed if all of the last three byte data in the personalized command are 0x00; otherwise, Step 1516 is executed.

In Step 1514, the state of the application corresponding to the application identification in the personalized command is set to be PERSONLIZED.

In Step 1515, the returned data is set to be 0x00.

In Step 1516, a respective state code is generated.

Specifically, the respective state code includes a state code of identification success and a state code of identification error; different error types correspond to different state codes.

In Step 1517, the set returned data and/or generated state code is returned.

Figure 16:
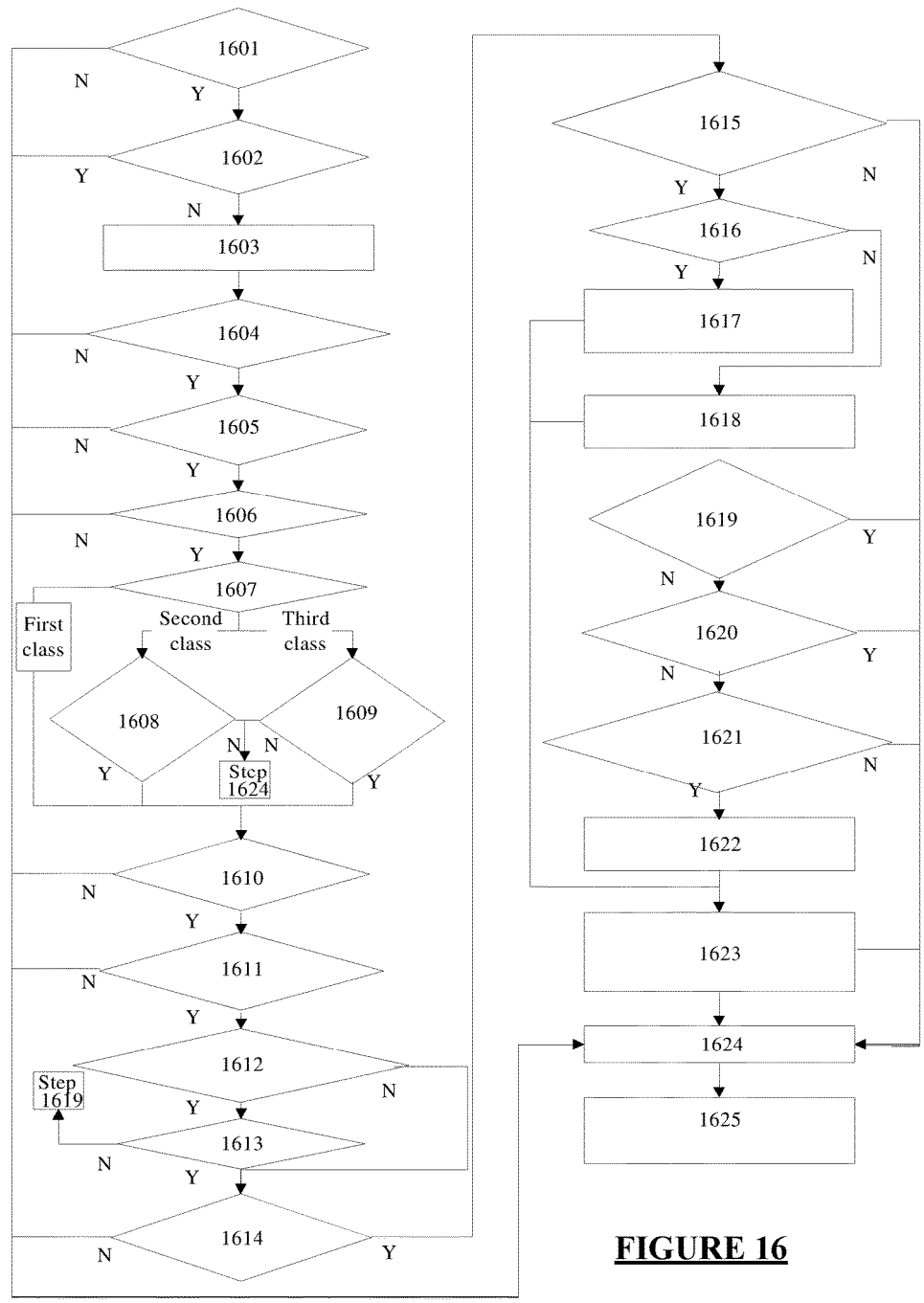
FIG. 16 is a specific flow chart of Step 1601 to Step 1625.

Preferably, as shown in FIG. 16, Step 1601 to Step 1625 are described as follows.

In Step 1601, it is determined whether the APDU data is a legitimate command head of a Delete command, Step 1602 is executed if the APDU data is the legitimate command head of Delete command; otherwise, Step 1624 is executed.

Specifically, in a case that the CLA of the APDU data is 0x80 or 0x84 and P1 is 0x00, the APDU data is the legitimated command head of Delete command.

In Step 1602, it is determined whether the current state of the card is TERMANATED or CARD_LOCKED, Step 1624 is executed if the current state of the card is TERMANATED or CARD_LOCKED; otherwise, Step 1603 is executed.

In Step 1603, the data domain part of the Delete command is received to obtain a complete Delete command.

In Step 1604, it is determined whether the state of the current first card data management module is PERSONALIED, Step 1605 is executed if the state of the current first card data management module is PERSONALIED; otherwise, Step 1624 is executed.

In Step 1605, it is determined whether the current first card data management module has a proxy right, Step 1606 is executed if the current first card data management module has the proxy right; otherwise, Step 1624 is executed.

In Step 1606, it is determined whether the card meets a security condition, Step 1607 is executed if the card meets the security condition; otherwise, Step 1624 is executed.

In Step 1607, the security level of the card is checked; Step 1610 is executed if the security level is at the first level, Step 1608 is executed if the security level is at the second level, or Step 1609 is executed if the security level is at the third level.

Specifically, if the security level of the card is at the first level, the Delete command is message plain data, if the security level is at the second level, the Delete command is combination of message plain data and message authentication code, if the security level is at the third level, the Delete command is combination of message cipher data and message authentication code.

In Step 1608, it is determined whether the Delete command is complete based on the message plain data and MAC in the Delete command, Step 1610 is executed if the Delete command is complete; otherwise, Step 1624 is executed.

The process of determining whether the Delete command is complete based on the message plain data and MAC in the Delete command includes: decrypting MAC by a preset session key to obtain a decrypting result, computing the message plain data according to a preset hash function to obtain a computing result, determining whether the decrypting result is identical to the computing result, where the Delete command is complete if the decrypting result is identical to the computing result, otherwise, the Delete command is not complete.

In Step 1609, it is determined whether the Delete command is complete based on the message cipher data and MAC in the Delete command, Step 1610 is executed if the Delete command is complete; otherwise, Step 1624 is executed.

The process of determining whether the Delete command is complete based on the message cipher data and MAC in the Delete command includes: decrypting the message cipher data to obtain message plain data, decrypting MAC by using a preset session key to obtain a decrypting result, computing the message plain data according to a preset hash function to obtain a computing result, determining whether the decrypting result is identical to the computing result, where the Delete command is complete if the decrypting result is identical to the computing result; otherwise the Delete command is not complete.

In Step 1610, it is determined whether the first byte data in the data domain of the Delete command is 0x4f, Step 1611 is executed if the first byte data is 0x4f; otherwise, Step 1624 is executed.

In Step 1611, it is determined whether the data domain identification length in the Delete command is in a preset range, Step 1612 is executed if the data domain identification length in the Delete command is in the preset range; otherwise, Step 1624 is executed.

Specifically, the preset range is from 0x05 to 0x10.

In Step 1612, it is determined whether an application corresponding to the data domain identification in the Delete command exists in the card, Step 1613 is executed if the application corresponding to the data domain identification in the Delete command exists in the card; otherwise, Step 1614 is executed.

In Step 1613, it is determined whether P2 in the Delete command is 0x80, Step 1614 is executed if P2 in the Delete command is 0x80; otherwise, Step 1619 is executed.

In Step 1614, it is determined whether an executable file corresponding to the data domain identification in the Delete command exists in the card, Step 1615 is executed if the executable file corresponding to the data domain identification in the Delete command exists in the card, otherwise, Step 1624 is executed.

In Step 1615, it is determined whether the security domain associated with the executable file corresponding to the data domain identification in the Delete command is the current first card data management module, Step 1616 is executed if the security domain associated with the executable file corresponding to the data domain identification in the Delete command is the current first card data management module; otherwise, Step 1624 is executed.

In Step 1616, it is determined whether P2 in the Delete command is 0x80, Step 1617 is executed if P2 in the Delete command is 0x80; otherwise, Step 1618 is executed.

In Step 1617, the executable file corresponding to the data domain identification in the Delete command and all applications corresponding to the executable file are deleted, and Step 1623 is executed.

In Step 1618, the executable file corresponding to the data domain identification in the Delete command are deleted, and Step 1623 is executed.

In Step 1619, it is determined whether the application corresponding to the data domain identification in the Delete command is another application or the security domain associated with another executable file, Step 1624 is executed if the application corresponding to the data domain identification in the Delete command is another application or the security domain associated with another executable file, otherwise, Step 1620 is executed.

In Step 1620, it is determined whether the application corresponding to the data domain identification in the Delete command is the current first card data management module, Step 1624 is executed if the application is the current first card data management module, otherwise, Step 1621 is executed.

In Step 1621, it is determined whether the security domain associated with the application corresponding to the data domain identification in the Delete command is the current first card data management module, Step 1622 is executed if the security domain is the current first card data management module; otherwise, Step 1624 is executed.

In Step 1622, the application corresponding to the data domain identification in the Delete command is deleted.

In Step 1623, the data required for computing a receipt is sent to the second card data management module and the receipt returned by the second card data management module is received, the returned data is set as the receipt and Step 1624 is executed.

Specifically, the data domain identification length in the Delete command and the data domain identification are sent to the second card data management module.

In Step 1624, a respective state code is generated.

Specifically, the respective state code includes a state code of identification success and a state code of identification error; different error types correspond to different state codes.

In Step 1625, the set returned data and/or generated state code is returned.

The described embodiments are only preferred embodiments of the disclosure and the embodiments are not intended to limit the disclosure. Any alteration or change easily obtained by those skilled in the art based on the disclosure should fall in the scope of protection of the disclosure.

The invention claimed is:

1. A method for managing applications on a card, comprising: executing the following Steps after data sent by a running environment (RE) are received by a card content management module set in the card:

Step A, checking a card state, generating and returning a card-state-not-supporting state code to the RE if the card state is a first preset state or a second preset state, and ending the process; otherwise executing Step B;

Step B, checking whether the received data conforms to a preset format; executing Step C if the received data conforms to a first preset format, executing Step D if the received data conforms to a second preset format, executing Step E if the received data conforms to a third preset format, executing Step F if the received data conforms to a fourth preset format, executing Step G if the received data conforms to a fifth preset format, executing Step H if the received data conforms to a sixth preset format, or executing Step I if the received data conforms to a seventh preset format; or returning a data error state code to the RE if the received data does not conform to the preset format, and ending the process;

Step C, continuing to receive the data sent by the RE to obtain a complete first command, parsing the first command to obtain a load file identification and a load file association security domain identification, creating a load file structure, filling the load file identification and load file association security domain identification into the created load file structure, generating and returning an operation success state code and an operation result to the RE if the operation is successful, and ending the process; or generating and returning a respective state code to the RE based on a reason of operation failure if the operation is unsuccessful, and ending the process;

Step D, continuing to receive the data sent by the RE to obtain a complete second command, parsing the second command to obtain a load file data block, obtaining and storing component data based on the load file data block, filling a storage address into the load file structure, generating and returning an operation success state code and an operation result to the RE if the operation is successful, and ending the process; or generating and returning a respective state code to the RE based on a reason of operation failure if the operation is unsuccessful, and ending the process;

Step E, continuing to receive the data sent by the RE to obtain a complete third command, parsing the third command to obtain an executable load file identification, an executable module identification, an application identification and an application right, searching for the load file structure based on the executable load file identification obtained by the parsing, searching for an executable module corresponding to the executable module identification obtained by the parsing in storage space corresponding to a storage address in the found load file structure, creating an application of the found executable module, identifying the created application with the application identification obtained by the parsing, assigning a right specified by the application right obtained by the parsing to the created application, setting the association security domain of the created application to be the association security domain of the executable load file corresponding to the executable load file identification obtained by the parsing, generating and returning an operation success state code and an operation result to the RE if the operation is successful, and ending the process; or generating and returning a respective state code to the RE based on a reason of operation failure if the operation is unsuccessful, and ending the process;

Step F, continuing to receive the data sent by the RE to obtain a complete fourth command, parsing the fourth command to obtain an application identification and an application right, searching for an application corresponding to the application identification obtained by the parsing in the card, updating a state of the found application to be a selectable state and updating a right of the found application to be the right specified by the application right obtained by the parsing, generating and returning an operation success state code and an operation result to the RE if the operation is successful, and ending the process; or generating and returning a respective state code to the RE based on a reason of operation failure if the operation is unsuccessful, and ending the process;

Step G, continuing to receive the data sent by the RE to obtain a complete fifth command, parsing the fifth command, obtaining an security domain identification and an application identification, searching for an application corresponding to the application identification obtained by the parsing and an application corresponding to the security domain identification obtained by the parsing in the card, updating an association security domain of the found application to be the application corresponding to the security domain identification obtained by the parsing, generating and returning an operation success state code and an operation result to the RE if the operation is successful, and ending the process; or generating and returning a respective state code to the RE based on a reason of operation failure if the operation is unsuccessful, and ending the process;

Step H, continuing to receive the data sent by the RE to obtain a complete sixth command, parsing the sixth command to obtain an application identification, searching for an application corresponding to the application identification obtained by the parsing in the card, setting the found application to be a personalized application, generating and returning an operation success state code and an operation result to the RE if the operation is successful, and ending the process; or generating and returning a respective state code to the RE based on a reason of operation failure if the operation is unsuccessful, and ending the process; and Step I, continuing to receive the data sent by the RE to obtain a complete seventh command, parsing the seventh command to obtain a data domain identification, searching for an executable load file and an application corresponding to the data domain identification obtained by the parsing in the card, deleting the found application and executable load file, deleting the found application and executable load file, generating and returning an operation success state code and an operation result to the RE if the operation is successful, and ending the process; or generating and returning a respective state code to the RE based on a reason of operation failure if the operation is unsuccessful, and ending the process.

2. The method of claim 1, wherein the Step B comprises:
Step B1, checking whether the length of the received data is five bytes, wherein Step B2 is executed if the length of the received data is five bytes; otherwise the received data does not conform to a preset format, a data error state code is generated and returned to the RE, and the process ends;

Step B2, checking whether a first byte of the received data is 0x80 or 0x84, wherein Step B3 is executed if the first byte of the received data is 0x80 or 0x84; otherwise the received data does not conform to the preset format, the data error state code is generated and returned to the RE, and the process ends;

Step B3, checking a second byte of the received data, wherein Step B4 is executed if the second byte is 0xE6, Step B5 is executed if the second byte is 0xE8, or Step B6 is executed if the second byte is 0xE4; otherwise the received data does not conform to the preset format, the data error state code is generated and returned to the RE, and the process ends;

Step B4, checking a third byte to a fifth byte of the received data, wherein the received data conforms to a first preset format if the third byte and a fourth byte are 0x02 and 0x00 respectively and the fifth byte is no less than 0x0A, and Step C is executed; the received data conforms to a third preset format if the third byte is 0x04 or 0x0C, the fourth byte is 0x00 and the fifth byte is no less than 0x18, and Step E is executed; the received data conforms to a fourth preset format if the third byte and the fourth byte are 0x08 and 0x00 respectively and the fifth byte is no less than 0x0C, and Step F is executed; the received data conforms to a fifth preset format if the third byte and the fourth byte are 0x10 and 0x00 respectively and the fifth byte is no less than 0x10, and Step G is executed; the received data conforms to a sixth preset format if the third byte and the fourth byte are 0x20 and 0x00 respectively and the fifth byte is no less than 0x0B, and Step H is executed; otherwise the received data does not conform to the preset format, the data error state code is generated and returned to the RE, and the process ends;

Step B5, checking whether the third byte of the received data is 0x00 or 0x80, wherein the received data conforms to a second preset format if the third byte of the received data is 0x00 or 0x80, and Step D is executed; otherwise the received data does not conform to the preset format, the data error state code is generated and returned to the RE, and the process ends; and Step B6, checking whether the third byte of the received data is 0x00, wherein the received data conforms to a seventh preset format if the third byte of the received data is 0x00, and Step I is executed; otherwise the received data does not conform to the preset format, the data error state code is generated and returned to the RE, and the process ends.

3. The method of claim 1, wherein the process of preparing for loading an application in response to the first command comprises:
Step C1, determining whether a first data block of the first command is legitimate, checking whether an executable file corresponding to the first data block exists in the card, the operation condition being not met and the operation failing if the executable file corresponding to the first data block exists in the card, otherwise, executing Step C2; data being error and the operation failing if the first data block is illegitimate;

Step C2, determining whether a second data block of the first command meets a preset requirement, setting an association security domain of a load file corresponding to the first data block to be the card content management module if the second data block of the first command meets a first preset requirement and executing Step C4; executing Step C3 if the second data block of the first command meets a second preset requirement; the operation failing if the second data block of the first command does not meet the preset requirement;

Step C3, checking whether an application corresponding to the second data block exists in the card, the operation condition being not met and the operation failing if the application corresponding to the second data block does not exist in the card; otherwise, checking whether the application corresponding to the second data block has a security domain right, setting the association security domain of the load file corresponding to the first data block to be the application corresponding to the second data block and executing Step C4 if the application corresponding to the second data block has the security domain right; the operation failing if the application corresponding to the second data block has no security domain right;

Step C4, determining whether a third data block of the first command is legitimate, storing respective data in the third data block if the third data block of the first command is legitimate, executing Step C5; otherwise, data being error and the operation failing;

Step C5, processing a fourth data block of the first command and executing Step C6; and Step C6, determining whether a fifth data block of the first command is legitimate, creating a load file structure if the fifth data block of the first command is legitimate, filling the load file structure based on the first data block and the second data block, initializing the global block number in the card, the operation being successful; otherwise, data being error and the operation failing.

4. The method of claim 3, wherein the first data block of the first command comprises: a load file identification length and a load file identification; the process of determining whether a first data block of the first command is legitimate comprises: determining whether the load file identification length is in a preset range and not all bytes of the load file identification are 0x00, wherein the first data block of the first command is legitimate if the load file identification length is in the preset range and not all bytes of the load file identification are 0x00; otherwise, the first data block of the first command is illegitimate; the executable file corresponding to the first data block comprises: the executable file corresponding to the load file identification; the load file corresponding to the first data block comprises the load file corresponding to the load file identification;

the second data block of the first command comprises: a load file association security domain identification length and a load file association security domain identification; the process of determining whether a second data block of the first command meets a preset requirement comprises: determining whether the load file association security domain identification length is 0x00, wherein the second data block of the first command meets the first preset requirement if the load file association security domain identification length is 0x00; otherwise, the load file association security domain identification is checked; if each byte of the load file association security domain identification is 0x00, the second data block of the first command does not meet the preset requirement; if not all bytes of the load file association security domain identification are 0x00, the second data block of the first command meets the second preset requirement; the application corresponding to the second data block comprises the application corresponding to the load file association security domain;

the third data block of the first command comprises: a load file data hash value length and a load file data block hash value; the process of determining whether a third data block of the first command is legitimate comprises: determining whether the load file data block hash value length is 0x00, wherein the third data block of the first command is illegitimate if the load file data block hash value length is 0x00; otherwise, the third data block of the first command is legitimate; the process of storing respective data in the third data block specifically comprises: storing the load file data block hash value;

the fourth data block of the first command comprises: a load parameter domain; the process of processing a fourth data block of the first command comprises: processing the load parameter domain; and the fifth data block of the first command comprises: a load token length and a load token; the process of determining whether a fifth data block of the first command is legitimate comprises: determining whether the load token length is 0x00, wherein the fifth data block of the first command is legitimate if the load token length is 0x00; otherwise the fifth data block of the first command is illegitimate, wherein the preset range is from 0x05 to 0x10.

5. The method of claim 1, wherein the process of loading an application in response to the second command comprises:

Step D1, determining whether a fourth byte of the second command equals to a global block number in the card, executing Step D2 if the fourth byte of the second command equals to the global block number in the card; otherwise, data being error and the operation failing;

Step D2, checking whether data authentication mode block information is comprised in the second command, verifying the data authentication mode block information if the data authentication mode block information is comprised in the second command; executing Step D3 if the verifying is successful; data being error and the operation failing if the verifying is unsuccessful; executing Step D3 if the data authentication mode block information is not comprised in the second command;

Step D3, obtaining and storing the component data based on the load file data block in the second command, filling the storage address into the load file structure, updating the global block number in the card to be the result of the current value plus 1, determining whether the load file data block is the last load file data block of the load file, executing Step D4 if the load file data block is the last load file data block of the load file; otherwise, the operation being successful;

Step D4, determining whether the load file data block hash value in the card has a value, performing a hash operation on all load file data blocks as a whole stored in the card if the load file data block hash value in the card has the value and determining whether an operation result equals to the load file data block hash value, executing Step D5 if the operation result equals to the load file data block hash value; otherwise, the data being error and the operation failing; executing Step D5 if the load file data block hash value in the card has no value; and Step D5, storing and submitting an executable load file structure, and the operation being successful.

6. The method of claim 1, wherein the process of installing an application in response to the third command comprises:

Step E1, determining whether a first data block of the third command is legitimate, checking whether a load file structure corresponding to the first data block exists in the card, executing Step E2 if the load file structure corresponding to the first data block exists in the card; otherwise, the operation condition being not met and the operation failing; data being error and the operation failing if the first data block is illegitimate;

Step E2, determining whether a second data block of the third command is legitimate; checking whether an executable module corresponding to the second data block exists in the storage space corresponding to the storage address in the load file structure, executing Step E3 if the executable module corresponding to the second data block exists in the storage space corresponding to the storage address in the load file structure, otherwise, the operation condition being not met and the operation failing; data being error and the operation failing if the second data block of the third command is illegitimate;

Step E3, determining whether a third data block of the third command is legitimate; checking whether an application corresponding to the third data block exists in the card, executing Step E4 if the application corresponding to the third data block exists in the card, otherwise, the operation condition being not met and the operation failing; data being error and the operation failing if the third data block of the third command is illegitimate;

Step E4, determining whether a fourth data block of the third command is legitimate, determining whether the application corresponding to the third data block has a default selection right if the fourth data block of the third command is legitimate, executing Step E5 if the application corresponding to the third data block has the default selection right, otherwise, executing Step E6; data being error and the operation failing if the fourth data block of the third command is illegitimate;

Step E5, determining whether a third byte of the third command equals to a preset value, data being error and the operation failing if the third byte of the third command equals to the preset value; determining whether the card content management module has a default selection right if the third byte of the third command does not equal to the preset value; executing Step E7 if the card content management module has the default selection right; otherwise, operation condition being not met and the operation failing;

Step E6, determining whether the third data block of the third command meets a preset condition, processing a fifth data block of the third command and executing Step E7 if the a first preset condition or a second preset condition is met; the operation condition being not met and the operation failing if the preset condition is not met;

Step E7, determining whether a sixth data block of the third command is legitimate, registering the application in response to the third command and executing Step E8 if the sixth data block of the third command is legitimate; otherwise, data being error and the operation failing;

Step E8, determining whether a third byte of the third command equals to a preset value, setting a state of the application corresponding to the third data block in the third command to be INSTALLED and the operation being successful; otherwise, setting the state of the application corresponding to the third data block in the third command to be selectable and executing Step E9; and Step E9, determining whether the application corresponding to the third data block of the third command has a default selection right; setting the application corresponding to the third data block of the third command to be a default application and the operation being successful if the application corresponding to the third data block of the third command has the default selection right; otherwise, the operation being successful.

7. The method of claim 1, wherein the process of setting a state of the application in response to the fourth command comprises:

Step F1, determining whether both a first data block and a second data block of the fourth command are legitimate, executing Step F2 if both the first data block and the second data block of the fourth command are legitimate; otherwise, data being error and the operation failing;

Step F2, determining whether a third data block of the fourth command is legitimate; data being error and the operation failing if the third data block of the fourth command is illegitimate, checking whether an application corresponding to the third data block exists in the card if the third data block of the fourth command is legitimate; the operation condition being not met and the operation failing if the application corresponding to the third data block does not exist in the card, determining whether the state of the application corresponding to the third data block is INSTALLED if the application corresponding to the third data block exists in the card; the operation condition being not met and the operation failing if the state of the application corresponding to the third data block is not INSTALLED, executing Step F3 if the state of the application corresponding to the third data block is INSTALLED;

Step F3, determining whether a fourth data block of the fourth command is legitimate; executing Step F4 if the fourth data block of the fourth command is legitimate, otherwise data being error and the operation failing;

Step F4, determining whether a fifth data block of the fourth command is legitimate; executing Step F5 if the fifth data block of the fourth command is legitimate; otherwise data being error and the operation failing;

Step F5, determining whether a sixth data block of the fourth command is legitimate; setting the state of the application corresponding to the third data block to be selectable and executing Step F6 if the sixth data block of the fourth command is legitimate; otherwise, data being error and the operation failing; and Step F6, determining whether the application corresponding to the third data block has a default selection right, the operation being successful if the application corresponding to the third data block has no default selection right, determining whether the card content management module has a default selection right if the application corresponding to the third data block has the default selection right; setting the application corresponding to the third data block to be a default application if the card content management module has a default selection right; the operation condition being not met and the operation failing if the card content management module has no default selection right.

8. The method of claim 1, wherein the process of personalizing an application in response to the sixth command comprises:

Step H1, determining whether both of a first data block and a second data block of the sixth command are legitimate; executing Step H2 if both of the first data block and the second data block of the sixth command are legitimate, otherwise, data being error and the operation failing;

Step H2, determining whether a third data block of the sixth command is legitimate; data being error and the operation failing if the third data block of the sixth command is illegitimate, checking whether an application corresponding to the third data block exists in the card; the operation condition being not met and the operation failing if the application corresponding to the third data block does not exist in the card, determining whether an association security domain of the application corresponding to the third data block is the card content management module if the application corresponding to the third data block exists in the card; executing Step H3 if the association security domain of the application corresponding to the third data block is the card content management module; otherwise, the operation condition being not met and the operation failing; and Step H3, determining whether all of a fourth data block, a fifth data block and a sixth data block of the sixth command are legitimate; setting the application corresponding to the third data block to be a personalized application, otherwise the operation condition being not met and the operation failing.

9. The method of claim 1, wherein the process of deleting an application and an executable load file in response to the seventh command comprises:

Step I1, determining whether a first data block of the seventh command is legitimate, executing Step I2 if the first data block of the seventh command is legitimate; otherwise, data being error and the operation failing;

Step I2, determining whether a second data block of the seventh command is legitimate, data being error and the operation failing if the second data block of the seventh command is illegitimate; checking whether an application corresponding to the second data block exists in the card, executing Step I3 if the application corresponding to the second data block is in the card, otherwise, executing Step I4;

Step I3, determining whether a fourth byte of the seventh command equals to a preset value, executing Step I4 if the fourth byte of the seventh command equals to the preset value, otherwise executing Step I5;

Step I4, checking whether an executable load file corresponding to the second data block exists in the card, the operation condition being not met and the operation failing if the executable load file corresponding to the second data block does not exist in the card; determining whether the fourth byte of the seventh command equals to the preset value if the executable load file corresponding to the second data block exists in the card; deleting the application and the executable load file corresponding to the second data block and the operation being successful if the fourth byte of the seventh command equals to the preset value; deleting the executable load file corresponding to the second data block and the operation being successful if the fourth byte of the seventh command does not equal to the preset value;

Step I5, checking whether the application corresponding to the second data block is another application or an association security domain of another executable load file, the operation condition being not met and the operation failing if the application corresponding to the second data block is another application or an association security domain of another executable load file; otherwise executing Step I6; and Step I6, determining whether the application corresponding to the second data block is the card content management module, the operation condition being not met and the operation failing if the application corresponding to the second data block is the card content management module; otherwise, deleting the application corresponding to the second data block and the operation being successful.

10. A method for implementing card data management, comprising: executing the following Steps in a case that a first card data management module set in the card itself acts as the current first card data management module after application protocol data unit APDU data sent by a RE is received by the first card data management module:

Step A, checking instruction code of the APDU data; executing Step D if the instruction code is an effective value of 0xE8, executing Step B if the instruction code is an effective value of 0xE6, or executing Step I if the instruction code is an effective value of 0xE4;

Step B, checking a first parameter of the APDU data; executing Step C if the first parameter is 0x02, executing Step E if the first parameter is 0x04 or 0x0C, executing Step F if the first parameter is 0x08, executing Step G if the first parameter is 0x10, or executing Step H if the first parameter is 0x20;

Step C, receiving a data domain part of a pre-load command to obtain all content of the pre-load command, checking whether a card meets a pre-load condition based on the content of the pre-load command, newly building an executable file structure and setting respective data and executing Step J if the card meets the pre-load condition; otherwise, executing Step J directly;

Step D, receiving a data domain part of a load command to obtain all content of the load command, checking whether the card meets a load condition based on the content of the load command, storing the content of the load command; and executing Step J if the card meets the load condition; otherwise directly executing Step J;

Step E, receiving a data domain part of an install command to obtain all content of the install command, checking whether the card meets an install condition based on the content of the install command, creating an application and setting a respective state and executing Step J if the card meets the install condition; otherwise directly executing Step J;

Step F, receiving a data domain part of a selectable command to obtain all content of the selectable command, checking whether the card meets a selectable condition based on the content of the selectable command, setting a state of the respective application to be selectable and executing Step J if the card meets the selectable condition; otherwise directly executing Step J;

Step G, receiving a data domain part of an extradition command to obtain all content of the extradition command, determining whether the card meets an extradition condition based on the content of the extradition command, resetting a security domain associated with the respective application and executing Step J if the card meets the extradition condition; otherwise directly executing Step J;

Step H, receiving a data domain part of a personalized command to obtain all content of the personalized command, checking whether the card meets a personalized condition based on the content of the personalized command, sending data to the respective application and executing Step J if the card meets the personalized condition; otherwise directly executing Step J;

Step I, receiving the data domain part of a deleting command to obtain all content of the deleting command, checking whether the card meets a deleting condition based on the content of the deleting command, deleting respective data in the card which is specified in the deleting command and executing Step J if the card meets the deleting condition; otherwise directly executing Step J; and Step J, generating and returning the respective returned data and/or respective state code to the RE.

11. The method of claim 10, wherein before Step C, Step D, Step E, Step F, Step G, Step H and Step I, the method further comprises:

determining whether the APDU data has a legitimate command head, checking the current state of the card if the APDU data has the legitimate command head; executing Step J if the current state is terminated or locked; executing the next step in turn if the current state of the card is neither terminated or locked; otherwise executing Step J; or checking the current state of the card, executing Step J if the current state of the card is terminated or locked; determining whether the APDU data has a legitimate command head if the current state is neither terminated nor locked, executing the next step in turn if the APDU data has the legitimate command head; otherwise executing Step J.

12. The method of claim 11, wherein the Step C comprises:

Step c1, receiving the data domain part of the pre-load command to obtain all content of the pre-load command; checking the state of the current first card data management module; determining that the current first card data management module has a proxy right if the state of the current first card data management module is personalized, executing Step c2 if the current first card data management module has the proxy right; otherwise, executing Step c4; executing Step c4 if the state of the current first card data management module is not personalized;

Step c2, determining whether the card meets a security condition, checking a security level of the card if the card meets the security condition; executing Step c3 if the security level of the card is at a first level; determining whether the pre-load command is complete if the security level of the card is at a second level or a third level; executing Step c3 if the pre-load command is complete; executing Step c4 if the pre-load command is not complete; otherwise, executing Step c4;

Step c3, checking a format of the pre-load command, setting the association security domain of the load file corresponding to the load file identification in the pre-load command to be an application corresponding to the security domain identification in the pre-load command if the format is correct, storing the load file data block hash value in the pre-load command and setting a hash value authentication identification; processing the load parameter domain in the pre-load command, newly building a load file structure, initializing a global block number, setting the returned data to be 0x00 and executing Step c4; executing Step c4 if the format is incorrect; and Step c4, generating a respective state code and returning the set returned data and/or generated state code.

13. The method of claim 12, wherein the Step c3 comprises:

Step c3-1, determining whether a load file identification length in the pre-load command is in a preset range; checking whether the load file identification in the pre-load command is legitimate if the load file identification length in the pre-load command is in the preset range; executing Step c3-2 if the pre-load file identification in the pre-load command is legitimate; executing Step c4 if the pre-load file identification in the pre-load command is illegitimate; executing Step c4 if the load file identification length in the pre-load command is not in the preset range;

Step c3-2, checking whether a load file corresponding to the load file identification in the pre-load command exists in the card; executing Step c4 if the load file exists in the card; determining whether a security domain identification length in the pre-load command is in a preset range if the load file corresponding to the load file identification in the pre-load command does not exist in the card; executing Step c3-3 if the security domain identification length is in the preset range; executing Step c4 if the security domain identification length is not in the preset range;

Step c3-3, determining whether the security domain identification in the pre-load command is legitimate, checking whether an application corresponding to the security domain identification in the pre-load command exists in the card if the security domain identification in the pre-load command is legitimate, executing Step c3-4 if the application exists in the card, executing Step c4 if the application corresponding to the security domain identification does not exist in the pre-load command in the card; executing Step c4 if the security domain identification in the pre-load command is illegitimate;

Step c3-4, determining whether an application corresponding to the security domain identification in the pre-load command has a security domain right; determining whether the application corresponding to the security domain identification in the pre-load command is the current first card data management module if the application corresponding to the security domain identification in the pre-load command has the security domain right; executing Step c3-6 if the application corresponding to the security domain identification in the pre-load command is the current first card data management module; executing Step c3-5 if the application corresponding to the security domain identification in the pre-load command is not the current first card data management module; executing Step c4 if the application corresponding to the security domain identification in the pre-load command has no security domain right;

Step c3-5, determining whether a state of the application corresponding to the security domain identification in the pre-load command is personalized; executing Step c3-6 if the state is personalized; executing Step c4 if the state is not personalized;

Step c3-6, setting an association security domain of the load file corresponding to the load file identification in the pre-load command to be the application corresponding to the security domain identification in the pre-load command, determining whether the load file data block hash value length in the pre-load command is a preset value, storing the load file data block hash value in the pre-load command and setting a hash value authentication flag, processing the load parameter domain in the pre-load command, executing Step c3-7, if the load file data block hash value length in the pre-load command is the preset value; otherwise, executing Step c4; and Step c3-7, determining whether a load token length in the pre-load command is 0x80, sending data required for computing the load token to a second card data management module set in the card if the load token length in the pre-load command is 0x80; receiving a computing result returned by the second card data management module; determining whether the computing result is identical to the load token in the pre-load command; newly building a load file structure initializing a global block number, setting returned data to be 0x00 and executing Step c4, if the computing result is identical to the load token in the pre-load command; executing Step c4 if the load token length in the pre-load command is not 0x80.

14. The method of claim 11, wherein the Step D comprises:

Step d1, receiving the data domain part of the load command to obtain all content of the load command, checking a state of the current first card data management module; determining whether the first card data management module has a proxy right if the state of the current first card data management module is personalized, executing Step d2 if the current first card data management module has the proxy right, otherwise, executing Step d4; executing Step d4 if the current first card data management module is not personalized;

Step d2, determining whether the card meets a security condition, checking a security level of the card if the card meets the security condition; executing Step d3 if the security level is at a first level; determining whether the load command is complete if the security level is at a second level or a third level; executing Step d3 if the load command is complete; executing Step d4 if the load command is not complete; executing Step d4 if the card does not meet the security condition;

Step d3, checking a format of the load command, processing a load file data block in the load command by taking a component as an unit if the format is correct; in a case that the load file data block in the load command is the last load file data block of the load file, submitting and storing the executable load file structure, sending data required for computing a receipt to a second card data management module; receiving the receipt returned by the second card data management module; receiving the receipt returned by the second card data management module, setting the returned data as the receipt, executing Step d4; otherwise, setting the returned data to be 0x00, executing Step d4; executing Step d4 if the format is incorrect; and Step d4, generating a respective state code and returning the set returned data and/or the generated state code.

15. The method of claim 14, wherein the Step d3 comprises:

Step d3-1, checking whether a second parameter in the load command equals to the global block number; determining whether the global block number is 0 if the second parameter in the load command equals to the global block number; verifying data authentication mode block information in the load file if the global block number is 0; executing Step d3-2 if the verifying is successful; executing Step d4 if the verifying is unsuccessful; executing Step d3-2 if the global block number is not 0; executing Step d4 if the second parameter in the load command does not equal to the global block number;

Step d3-2, determining whether a hash value authentication flag exists in the card, storing the load file data block in the load command and executing Step d3-3 if the hash value authentication flag exists in the card; otherwise, executing Step d3-3 directly;

Step d3-3, determining whether a component which is not submitted and stored exists in the executable load file structure; executing Step d3-5 if the component which is not submitted and stored exists in the executable load file structure; otherwise executing Step d3-4;

Step d3-4, checking whether the load command comprises a component number and a component size, reading the component number if the load command comprises the component number and the component size, determining whether the number is legitimate; allocating a respective size of space based on the component size and executing Step d3-5 if the number is legitimate; executing Step d4 if the number is illegitimate; executing Step d4 if the load command does not comprise the component number and the component size;

Step d3-5, starting to process the load file data block in the load command; determining whether the processing of the current component is finished; submitting a processing result of the current component if the processing of the current component is finished; otherwise, executing Step d3-6;

Step d3-6, determining whether an unprocessed load file data block data exists, returning to execute Step d3-5 if the unprocessed load file data block data exists; otherwise, performing self-increment by the global block number; determining whether a first parameter in the load command is 0x80; executing Step d3-7 if the first parameter in the load command is 0x80; setting the returned data to be 0x00 and executing Step d4 if the first parameter in the load command is not 0x80;

Step d3-7, determining whether a hash value authentication flag exists in the card, performing a hash operation on the stored load file data block if the hash value authentication flag exists in the card; determining whether an operation result equals to the load file data block hash value stored in the card; executing Step d3-8 if the operation result equals to the load file data block hash value stored in the card;

executing Step d4 if the operation result does not equal to the load file data block hash value stored in the card; executing Step d3-8 if the hash value authentication flag does not exist in the card; and Step d3-8, submitting and storing the executable load file structure, sending the data required for computing the receipt to the second card data management module; receiving the receipt returned by the second card data management module; setting the returned data as the receipt and executing Step d4.

16. The method of claim 11, wherein the Step E comprises:

Step e1, receiving the data domain part of the install command and obtaining all content of the install command; checking a state of the current first card data management module; determining whether the current first card data management module has a proxy right if the state of the current first card data management module is personalized; executing Step e2 if the current first card data management module has the proxy right; executing Step e4 if the current first card data management module has no proxy right; executing Step e4 if the state of the current first card data management module is not personalized;

Step e2, determining whether the card meets a security condition, checking a security level of the card if the card meets the security condition; executing Step e3 if the security level of the card is at a first level; determining whether the install command is complete if the security level of the card is at a second level or a third level; executing Step e3 if the install command is complete; executing Step e4 if the install command is not complete; executing Step e4 if the card does not meet the security condition;

Step e3, checking a format of the install command, processing an install parameter domain in the install command if the format is correct; registering an application based on the data in the data domain of the install command and setting a state and right of the application corresponding to the application identification in the install command; sending data required for computing a receipt to the second card data management module, receiving the receipt returned by the second card data management module; setting the returned data as the receipt and executing Step e4; executing Step e4 if the format is incorrect; and Step e4, generating a respective state code, and returning the set returned data and/or generated state code.

17. The method of claim 11, wherein the Step G comprises:

Step g1, receiving a data domain part of the extradition command, obtaining all content of the extradition command, checking a state of the current first card data management module; determining whether the current first card data management module has a proxy right if the state of the current first card data management module is personalized; executing Step g2 if the current first card data management module has the proxy right; executing Step g4 if the current first card data management module has no proxy right; executing Step g4 if the state of the current first card data management module is not personalized;

Step g2, determining whether the card meets a security condition; checking a security level of the card if the card meets the security condition; executing Step g3 if the security level is at a first level; determining whether the extradition command is complete if the security level is at a second level or a third level; executing Step g3 if the extradition command is complete; executing Step g4 if the extradition command is not complete; executing Step g4 if the card does not meet the security condition;

Step g3, checking a format of the extradition command, modifying a security domain associated with the application corresponding to the application identification in the extradition command to be the application corresponding to the security domain identification in the extradition command if the format is correct; sending data required for computing a receipt to the second card data management module, receiving the receipt returned by the second card data management module, setting the returned data as the receipt and executing Step g4; executing Step g4 if the format is incorrect; and Step g4, generating a respective state code, and returning the set returned data and/or generated state code.

18. The method of claim 17, wherein the Step g3 comprises:

Step g3-1, determining whether a security domain identification length in the extradition command is in a preset range; determining whether an application corresponding to the security domain identification in the extradition command exists in the card if the security domain identification length in the extradition command exists in the preset range, executing Step g3-2 if the application corresponding to the security domain identification in the extradition command is in the card; executing Step g4 if the application corresponding to the security domain identification in the extradition command does not exist in the card; executing Step g4 if the security domain identification length in the extradition command is not in the preset range;

Step g3-2, determining whether the application corresponding to the security domain identification in the extradition command is a current card provider module; executing Step g4 if the application corresponding to the security domain identification in the extradition command is the current card provider module; otherwise, determining whether one byte data behind the security domain identification in the extradition command is 0x00, executing Step g3-3 if the one byte data is 0x00; executing Step g4 if the one byte data is not 0x00;

Step g3-3, determining whether the state of the application corresponding to the security domain identification in the extradition command is INSTALLED; determining whether the application identification length in the extradition command is in a preset range if the state of the application corresponding to the security domain identification in the extradition command is INSTALLED; executing Step g3-4 if the application identification length in the extradition command is in the preset range; executing Step g4 if the application identification length in the extradition command is not in the preset range; executing Step g4 if the state of the application corresponding to the security domain identification in the extradition command is not INSTALLED;

Step g3-4, determining whether an application corresponding to the application identification in the extradition command exists in the card; determining whether the security domain associated with the application corresponding to the application identification in the extradition command is the current first card data management module if the application corresponding to the application identification in the extradition command exists in the card; executing Step g3-4 if the security domain is the current first card data management module; executing Step g4 if the security domain is not the current first card data management module; executing Step g4 if the application corresponding to the application identification in the extradition command does not exist in the card;

Step g3-5, determining whether the application corresponding to the security domain identification in the extradition command has a security domain right; determining whether the state of the application corresponding to the security domain identification in the extradition command is locked if the application corresponding to the security domain identification in the extradition command has the security domain right; executing Step g4 if the extradition command is locked; executing Step g3-6 if the extradition command is not locked; executing Step g4 if the application corresponding to the security domain identification in the extradition command has no security domain right;

Step g3-6, determining whether the state of the application corresponding to the security domain identification in the extradition command is personalized; determining both of two byte data behind the application identification in the extradition command are 0x00 if the state of the application corresponding to the security domain identification in the extradition command is personalized; executing Step g3-6 if both of the two byte data are 0x00; executing Step g4 if not both of the two byte data are 0x00; executing Step g4 if the state of the application corresponding to the security domain identification in the extradition command is not personalized;

Step g3-7, determining whether an extradition token length in the extradition command is 0x80; if the extradition token length in the extradition command is 0x80, sending data required for computing an extradition token to the second card data management module; receiving a computing result returned by the second card data management module; determining whether the computing result is identical to the extradition token in the extradition command; executing Step g3-8 if the computing result is identical to the extradition token in the extradition command; executing Step g4 if the computing result is not identical to the extradition token in the extradition command; executing Step g4 if the extradition token length in the extradition command is not 0x80; and Step g3-8, determining whether the application corresponding to the application identification in the extradition command has a security domain right; executing Step g4 if the application corresponding to the application identification in the extradition command has the security domain right; otherwise, modifying the security domain associated with the application corresponding to the application identification in the extradition command to be the application corresponding to the security domain identification in the extradition command; sending the data required for computing a receipt to the second card data management module; receiving the receipt returned by the second card data management module, setting the returned data as the receipt and executing Step g4.

19. The method of claim 11, wherein the Step H comprises:

Step h1, receiving the data domain part of the personalized command to obtain all content of the personalized command; determining the state of the current first card data management module, executing Step h2 if the state of the current first card data management module is personalized; executing Step h4 if the state of the current first card data management module is not personalized;

Step h2, determining whether the card meets a security condition; checking a security level of the card if the card meets the security condition; executing Step h3 if the security level is at a first level, determining whether the personalized command is complete if the security level is at a second level or a third level; executing Step h3 if the personalized command is complete; executing Step h4 if the personalized command is not complete; executing Step h4 if the card does not meet the security condition;

Step h3, checking a format of the selectable command; if the format is correct, setting the state of the application corresponding to the application identification in the personalized command to be personalized, setting the returned data to be 0x00, and executing Step h4; executing Step h4 if the format is incorrect; and Step h4, generating a respective state code, and returning the set returned data and/or generated state code.

20. The method of claim 11, wherein the Step I comprises:

Step i1, receiving a data domain part of a Delete command to obtain all content of the Delete command, checking a state of the current first card data management module; determining whether the current first card data management module has a proxy right if the state of the current first card data management module is personalized; executing Step i2 if the current first card data management module has the proxy right; executing Step i4 if the current first card data management module has no proxy right; executing Step i4 if the state of the current first card data management module is not personalized;

Step i2, determining whether the card meets a security condition, checking a security level of the cart if the card meets the security condition; executing Step i3 if the security level is at a first level; determining whether the Delete command is complete if the security level is at a second level or a third level; executing Step i3 if the Delete command is complete; executing Step i4 if the Delete command is not complete; executing Step i4 if the card does not meet the security condition;

Step i3, checking a format of the Delete command; if the format is correct, deleting a respective executable file and/or a respective application based on a data domain identification in the Delete command, sending data required for computing a receipt to the second card data management module; receiving the receipt returned by the second card data management module; setting the returned data as the receipt and executing Step i4; executing Step i4 if the format is incorrect; and Step i4, generating a respective state code, and returning the set returned data and/or generated state code.

* * * * *